(12) United States Patent
Shibata

(10) Patent No.: US 12,328,133 B2
(45) Date of Patent: Jun. 10, 2025

(54) HIGH-FREQUENCY SIGNAL PROCESSING CIRCUITRY AND WIRELESS COMMUNICATION DEVICE

(71) Applicant: Renesas Electronics Corporation, Tokyo (JP)

(72) Inventor: Kenichi Shibata, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 221 days.

(21) Appl. No.: 18/165,449

(22) Filed: Feb. 7, 2023

(65) Prior Publication Data

US 2023/0253996 A1 Aug. 10, 2023

(30) Foreign Application Priority Data

Feb. 7, 2022 (JP) ................................. 2022-017073

(51) Int. Cl.
*H04B 1/04* (2006.01)

(52) U.S. Cl.
CPC ... *H04B 1/0483* (2013.01); *H04B 2001/0491* (2013.01)

(58) Field of Classification Search
CPC ...... H04B 17/14; H04B 17/19; H04B 17/104; H04B 1/40; H04B 1/30; H04B 2001/0433; H04B 1/707; H04B 1/713; H04B 17/101; H04B 17/20; H04B 1/0003; H04B 1/28; H04B 1/406; H04B 1/10; H04B 15/005; H04B 15/02; H04B 15/04;

(Continued)

(56) References Cited

U.S. PATENT DOCUMENTS 8,050,376 B2 * 11/2011 Liu .................... H03L 7/093
                                                                        375/376
8,618,884 B2   12/2013 Yagasaki
(Continued)

FOREIGN PATENT DOCUMENTS

JP          2012090134 A      5/2012

OTHER PUBLICATIONS

"High-Speed Low-Power Frequency Divider with Intrinsic Phase Rotator", Stephan Henzler, Proceedings of the 2006 International Symposium on Low Power Electronics and Design, Oct. 4-6, 2006, pp. 287-291.

(Continued)

*Primary Examiner* — Golam Sorowar
(74) *Attorney, Agent, or Firm* — SCULLY, SCOTT, MURPHY & PRESSER, P.C.

(57) ABSTRACT

A circuitry includes a first to fourth waveform synthesizers, each waveform synthesizer includes a first terminal and a second terminal to which input signals are input and a third terminal from which an output signal obtained by synthesizing the input signals is output. Frequencies of first to fourth input signals input to each waveform synthesizer are equal to each other, and phases of the second to fourth input signals are values delayed by approximately 180 degrees, delayed by approximately 90 degrees, and delayed by approximately 270 degrees, with respect to a phase of the first input signal. The output signal of each waveform synthesizer transitions from one state to the other state and transitions from the other state to the one state.

20 Claims, 50 Drawing Sheets

(58) Field of Classification Search
CPC ............ H04B 2215/064; H04B 1/0007; H04B 1/0032; H03H 11/1291; H03H 2011/0494; H03H 21/0001; H03H 21/0012; H03H 11/126; H03H 11/22; H03H 11/344; H03H 2210/025; H03H 2210/036; H03H 7/42; H03H 11/265; H03H 7/21; H03H 11/18; H03J 2200/10; H03J 2200/04; H03J 2200/08; H03J 3/18; H03J 1/0075; H03J 3/04; H03J 3/08; H03J 3/185; H03J 3/07; H03J 5/028; H03B 27/00; H03B 21/01; H03B 5/1228; H03B 5/1265; H03B 5/1215; H03B 19/00; H03B 19/14; H03B 2200/0078; H03B 5/1212; H03B 2200/0034; H03B 2200/0038; H03B 2200/0074; H03B 2201/025; H03B 2201/0266; H03B 25/00
See application file for complete search history.

(56) References Cited

U.S. PATENT DOCUMENTS

| | | | |
|---|---|---|---|
| 9,680,461 B1* | 6/2017 | Singh | H03K 5/1565 |
| 9,698,798 B1* | 7/2017 | Fredenburg | G06F 1/08 |
| 11,368,143 B1* | 6/2022 | Chakraborty | G06F 1/08 |
| 2015/0180643 A1 | 6/2015 | Shi et al. | |
| 2019/0149141 A1* | 5/2019 | Hsieh | H03B 5/1228 |
| | | | 327/116 |
| 2021/0126597 A1* | 4/2021 | de Jong | H03F 1/565 |

OTHER PUBLICATIONS

"Notice of Reasons for Refusal" dated Mar. 27, 2025 issued in JP Application No. 2022-017073.

* cited by examiner

Note: [rise-fall]
1 fall = 1 rise − 360deg × Duty Cycle (0.25)
      = − 90deg

FIG. 13A

| | | phase | error | rise phase | error | error average |
|---|---|---|---|---|---|---|
| I | rise | 0 | 0 | 0 | 0 | 0 |
| | fall | 90 | 0 | | | |
| IB | rise | 180 | 0 | 180 | 0 | |
| | fall | 270 | 0 | | | |
| Q | rise | 90 | 0 | 90 | 0 | 0 |
| | fall | 180 | 0 | | | |
| QB | rise | 270 | 0 | 270 | 0 | |
| | fall | 360=0 | 0 | | | |
| | | | | Q−I | 0 | 0 |
| | | | | QB−IB | 0 | |

1st Input (table title above)

FIG. 13B

Output

| | | phase | error | rise phase | error | error average |
|---|---|---|---|---|---|---|
| I' | rise | 0 | 0 | 0 | 0 | 0 |
| | fall | 90 | 0 | | | |
| IB' | rise | 180 | 0 | 180 | 0 | |
| | fall | 270 | 0 | | | |
| Q' | rise | 90 | 0 | 90 | 0 | 0 |
| | fall | 180 | 0 | | | |
| QB' | rise | 270 | 0 | 270 | 0 | |
| | fall | 360=0 | 0 | | | |
| | | | | Q'−I' | 0 | 0 |
| | | | | QB'−IB' | 0 | |

FIG. 15A

| | | phase | error | rise phase | error | error average |
|---|---|---|---|---|---|---|
| I | rise | 0 | 0 | 0 | 0 | 0 |
| | fall | 90 | 0 | | | |
| IB | rise | 180 | 0 | 180 | 0 | |
| | fall | 270 | 0 | | | |
| Q | rise | 90 | 1 | 90 | 1 | 1 |
| | fall | 180 | 1 | | | |
| QB | rise | 270 | 1 | 270 | 1 | |
| | fall | 360=0 | 1 | | | |
| | | | | Q-I | 1 | 1 |
| | | | | QB-IB | 1 | |

1st Input

FIG. 15B

| | | phase | error | rise phase | error | error average |
|---|---|---|---|---|---|---|
| I' | rise | 0 | 1 | 0 | 1 | 1 |
| | fall | 90 | 0 | | | |
| IB' | rise | 180 | 1 | 180 | 1 | |
| | fall | 270 | 0 | | | |
| Q' | rise | 90 | 1 | 90 | 1 | 1 |
| | fall | 180 | 1 | | | |
| QB' | rise | 270 | 1 | 270 | 1 | |
| | fall | 360=0 | 1 | | | |
| | | | | Q'-I' | 0 | 0 |
| | | | | QB'-IB' | 0 | |

Output w/ retiming (25% Duty Cycle)

FIG. 18A $I = 0\text{deg}$ → $I_{ave} = \text{average}(I, IB)$
$Q = I - (90\text{deg} + a)$   $= -(90\text{deg} + b/2)$
   $= -(90\text{deg} + a)\text{deg}$
$IB = I - (180\text{deg} + b)$ → $Q_{ave} = \text{average}(Q, QB)$
   $= -(180\text{deg} + b)\text{deg}$   $= -(180\text{deg} + (a+c)/2)$
$QB = I - (270\text{deg} + c)$
   $= -(270\text{deg} + c)\text{deg}$

⇩

IQ Phase error $= Q_{ave} - I_{ave} - (-90)$
$= -(a + c - b)/2$

FIG. 18B $V = A \sin(\omega t + \theta)$

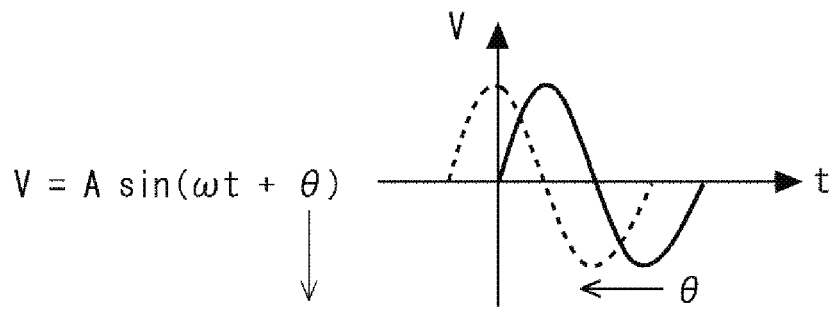

↓

$I = 0\text{deg}$
$Q = I - 90\text{deg} = -90\text{deg}$
$IB = I - 180\text{deg} = -180\text{deg}$
$QB = I - 270\text{deg} = -270\text{deg}$ (i) c > 0

(ii) c <= 0

(i) a > b (ii) a <= b (i) a < 0

(ii) a >= 0

(i) b > c (ii) b <= c $$Iave = \begin{cases} -(90 + b/2) & (0 \geq c, \ b \geq a) \\ -(90 + a/2) & (0 \geq c, \ b < a) \\ -(90 + (c+b)/2) & (0 < c, \ b \geq a) \\ -(90 + (a+c)/2) & (0 < c, \ b < a) \end{cases}$$

$$Qave = \begin{cases} -(180 + (a+c)/2) & (a \geq 0, \ c \geq b) \\ -(180 + (a+b)/2) & (a \geq c, \ c < b) \\ -(180 + c/2) & (a < 0, \ c \geq b) \\ -(180 + b/2) & (a < 0, \ c < b) \end{cases}$$

IQ Phase error = Qave − Iave − (−90)

(4x4 case)

FIG. 24

| 1st Input | | | | | Output | | | | |
|---|---|---|---|---|---|---|---|---|---|
| | phase | phase error | rise phase | error average | | phase | error | rise phase | error average |
| | | | | | | | | error | |
| I rise | 0 | 0 | 0 | b/2 | I' rise | 0 | I rise=0(I' rise≥QB fal)<br>QB fall=c(I' rise<QB fal) | 0 | 0 (0≥c)<br>c (0<c) | b/2 (0≥c, b≥a)<br>a/2 (0≥c, b<a)<br>(c+b)/2 (0<c, b≥a)<br>(a+c)/2 (0<c, b<a) |
| I fall | 90 | 0 | | | I' fall | 90 | I fall=0 | | | |
| IB rise | 180 | b | 180 | | IB' rise | 180 | IB rise=b(IB' rise≥Q fall)<br>Q fall=a(IB' rise<Q fall) | 180 | b (b≥a)<br>a (b<a) | |
| IB fall | 270 | b | | | IB' fall | 270 | IB fall=b | | | |
| Q rise | 90 | a | 90 | (a+c)/2 | Q' rise | 90 | Q rise=a(Q' rise≥I fall)<br>I fall=0(Q' rise<I fall) | 90 | a (a≥0)<br>0 (a<0) | (a+c)/2 (a≥0, c≥b)<br>(a+b)/2 (a≥0, c<b)<br>c/2 (a<0, c≥b)<br>b/2 (a<0, c<b) |
| Q fall | 180 | a | | | Q' fall | 180 | Q fall=a | | | |
| QB rise | 270 | c | 270 | | QB' rise | 270 | QB rise=c(QB' rise≥IB fall)<br>IB fall=b(QB' rise<IB fall) | 270 | c (c≥b)<br>b (c<b) | |
| QB fall | 360=0 | c | | | QB' fall | 360=0 | QB fall=c | | | |
| Q−I | | a | Q−I | (a+c−b)/2 | Q'−I' | | | Q'−I' | | Q' ave−I' ave |
| QB'−IB' | | c−b | QB'−IB' | | QB'−IB' | | | QB'−IB' | | |

FIG. 26

| | | 1st Input | | | | | | Output | | | |
|---|---|---|---|---|---|---|---|---|---|---|---|
| | | phase | error | rise phase | error | error average | | phase | error | rise phase | error | error average |
| I | rise | 0 | 0 | 0 | 0 | 0 | I' | rise | 0 | 0 | 1 | 1 |
| IB | fall | 90 | 0 | 180 | 0 | | IB' | fall | 90 | 0 | 180 | 1 |
| | rise | 180 | 0 | | | 1 | Q' | rise | 180 | 1 | 90 | 1 |
| | fall | 270 | 0 | | | | QB' | fall | 270 | 0 | 270 | 1 |
| Q | rise | 90 | 1 | 90 | 1 | | | rise | 90 | 1 | | |
| | fall | 180 | 1 | | | 1 | | fall | 180 | 1 | | |
| QB | rise | 270 | 1 | 270 | 1 | | | rise | 270 | 1 | Q'-I' | 0 | 0 |
| | fall | 360=0 | 1 | Q-I QB'-IB' | | | | fall | 360=0 | 1 | QB'-IB' | 0 |

Cancelled!!

FIG. 27

| | | 1st Input | | | | | |
|---|---|---|---|---|---|---|---|
| | | phase | error | | rise phase | error | error average |
| I | rise | 0 | 0 | I' | 0 | 0 | 0 |
| | fall | 90 | 0 | | | | |
| IB | rise | 180 | 0 | IB' | 180 | 0 | |
| | fall | 270 | 0 | | | | |
| Q | rise | 90 | -1 | Q' | 90 | -1 | -1 |
| | fall | 180 | -1 | | | | |
| QB | rise | 270 | -1 | QB' | 270 | -1 | -1 |
| | fall | 360=0 | -1 | Q→I QB'→IB' | | | |

| | | Output | | | | | |
|---|---|---|---|---|---|---|---|
| | | phase | error | | rise phase | error | error average |
| I' | rise | 0 | 0 | | 0 | 0 | 0 |
| IB' | fall | 90 | 0 | | 180 | 0 | |
| Q' | rise | 180 | 0 | | 90 | 0 | 0 |
| QB' | fall | 270 | 0 | | 270 | 0 | |
| | rise | 90 | 0 | Q'→I' | | 0 | 0 |
| | fall | 180 | -1 | QB'→IB' | | 0 | |
| | rise | 270 | 0 | | | | |
| | fall | 360=0 | -1 | | | | |

Cancelled!!

FIG. 36

| | | 1st Input | | | | | | Output | | | | |
|---|---|---|---|---|---|---|---|---|---|---|---|---|
| | | phase | error | rise phase | error | error average | | | phase | error | rise phase | error | error average |
| I | rise | 0 | 0 | 0 | 0 | 0 | I' | rise | 0 | 0 | 0 | 0 | 0.5 |
|   | fall | 90 | 0 | | | |    | fall | 90 | 0 | | 1 | |
| IB | rise | 180 | b=0 | 180 | 0 | 0.5 | IB' | rise | 180 | 1 | 180 | 1 | 0.5 |
|    | fall | 270 | b=0 | | | |     | fall | 270 | 0 | | | |
| Q  | rise | 90  | a=1 | 90  | 1 | 0.5 | Q'  | rise | 90  | 1 | 90 | 1 | 0 (Cancelled!!) |
|    | fall | 180 | a=1 | | | |     | fall | 180 | 1 | | | |
| QB | rise | 270 | c=0 | 270 | 0 | | QB' | rise | 270 | 0 | 270 | 0 | |
|    | fall | 360=0 | c=0 | Q'−I' | | |    | fall | 360=0 | 0 | Q'−I' | 1 | |
|    |      |      |     | QB'−IB' | 0 | |    |      |       |   | QB'−IB' | 1 | |

FIG. 37

| Case Examples | Condition | mean IQ error (Input) | mean IQ error (output) | |
|---|---|---|---|---|
| +1 is gererated in only 1 phase (Q) out of 4 phases. | a=1, b=c=0 | 0.5 | 0 | improvement |
| -1 is gererated in only 1 phase (Q) out of 4 phases. | a=-1, b=c=0 | -0.5 | 0 | improvement |
| +1 is generated in 2 adjacent phases (Q, QB) of 4 phases. | a=c=1, b=0 | 1 | 0 | improvement |
| +1 and + -1 are generated in 2 adjacent phases (Q, QB) of 4 phases. | a=1, c=-1, b=0 | 0 | 0 | Equivalent |
| +1 is generated in 2 nonadjacent phases (IB, QB) of 4 phase. | b=c=1, a=0 | 0 | -0.5 | Deterioration (However, the amount of half of the maximum error of input) |
| +1 and -1 are generated in 2 nonadjacent phases (IB, QB) of 4 phase. | b=1, c=-1, a=0 | -1 | 0 | improvement |

HIGH-FREQUENCY SIGNAL PROCESSING CIRCUITRY AND WIRELESS COMMUNICATION DEVICE

CROSS-REFERENCE TO RELATED APPLICATION

The subject application claims priority under 35 U.S.C. § 119 to Japanese Patent Application No. 2022-017073 filed on Feb. 7, 2022. The disclosure of Japanese Patent Application No. 2022-017073 including the specification, drawings and abstract is incorporated herein by reference in its entirety.

BACKGROUND

The present invention relates to a high-frequency signal processing circuitry and a wireless communication device.

In the recent digital wireless communication, an IQ quadrature modulation/demodulation system is adopted in transceivers.

There are disclosed techniques listed below.
[Patent Document 1] Japanese Unexamined Patent Application Publication No. 2012-090134
[Non-Patent Document 1] S. Henzler et al., "High-Speed Low-Power Frequency Divider with Intrinsic Phase Rotator," ISLPED'06 Proceedings of the 2006 International Symposium on Low Power Electronics and Design.

SUMMARY

In the system of Patent Document 1, it is known that the phase/amplitude error between IQ signals in the intermediate frequency band (IF frequency band) of the mixer (MIXER) output adversely affects the quality of wireless communication.

Other problems and novel features will become apparent from the description of this specification and the accompanying drawings.

According to an embodiment, a high-frequency signal processing circuitry includes: a first input terminal, a second input terminal, a third input terminal, and a fourth input terminal; a first output terminal, a second output terminal, a third output terminal, and a fourth output terminal; and a first waveform synthesizer, a second waveform synthesizer, a third waveform synthesizer, and a fourth waveform synthesizer. Each waveform synthesizer includes: a first terminal and a second terminal to which input signals are input; and a third terminal from which an output signal obtained by synthesizing the plurality of input signals is output. A first input signal, a second input signal, a third input signal, and a fourth input signal are input to the first input terminal, the second input terminal, the third input terminal, and the fourth input terminal, respectively, a frequency of each input signal is equal to each other, and a phase of the second input signal, a phase of the third input signal, and a phase of the fourth input signal are a value delayed by 180 degrees or approximately 180 degrees, a value delayed by 90 degrees or approximately 90 degrees, and a value delayed by 270 degrees or approximately 270 degrees, respectively, with respect to a phase of the first input signal. A state of the output signal output from the third terminal of each waveform synthesizer transitions from one state to the other state in conjunction with the input signal input to the first terminal of each waveform synthesizer or the input signal input to the second terminal of each waveform synthesizer, and transitions from the other state to the one state in conjunction with the input signal input to the first terminal of each waveform synthesizer.

According to an embodiment, a wireless communication device includes: an antenna impedance matching network; a receiver; a transmitter; a digital circuit; a PLL; and an LO divider. The LO divider includes a frequency divider and the above-mentioned high-frequency signal processing circuitry connected between the frequency divider and a mixer.

According to the embodiment above, it is possible to provide the high-frequency signal processing circuitry and the wireless communication device capable of improving the quality of wireless communication.

BRIEF DESCRIPTION OF THE DRAWINGS

FIG. 13A and FIG. 13B are diagrams illustrating the relationship between phases of input and output of an RT circuit and phase errors in the high-frequency signal processing circuitry according to the first embodiment.

FIG. 15A and FIG. 15B are diagrams illustrating the relationship between phases of input and output of the RT circuit and phase errors in the high-frequency signal processing circuitry according to the first embodiment.

FIG. 18A and FIG. 18B are diagrams for describing the reduction of IQ phase error by the RT circuit in the high-frequency signal processing circuitry according to the first embodiment.

FIG. 24 is a diagram illustrating the relationship of phase errors of input and output of the RT circuit in the high-frequency signal processing circuitry according to the first embodiment.

FIG. 26 is a diagram illustrating calculation results in the case of the phase delayed by more than 90 degrees in the high-frequency signal processing circuitry according to the first embodiment.

FIG. 27 is a diagram illustrating calculation results in the case of the phase leading by more than 90 degrees in the high-frequency signal processing circuitry according to the first embodiment.

FIG. 36 is a diagram illustrating the relationship of phase errors of input and output of the RT circuit in the high-frequency signal processing circuitry according to the first embodiment.

FIG. 37 is a diagram illustrating calculation examples of combinations of phase errors in the high-frequency signal processing circuitry according to the first embodiment.

DETAILED DESCRIPTION

Figure 1:
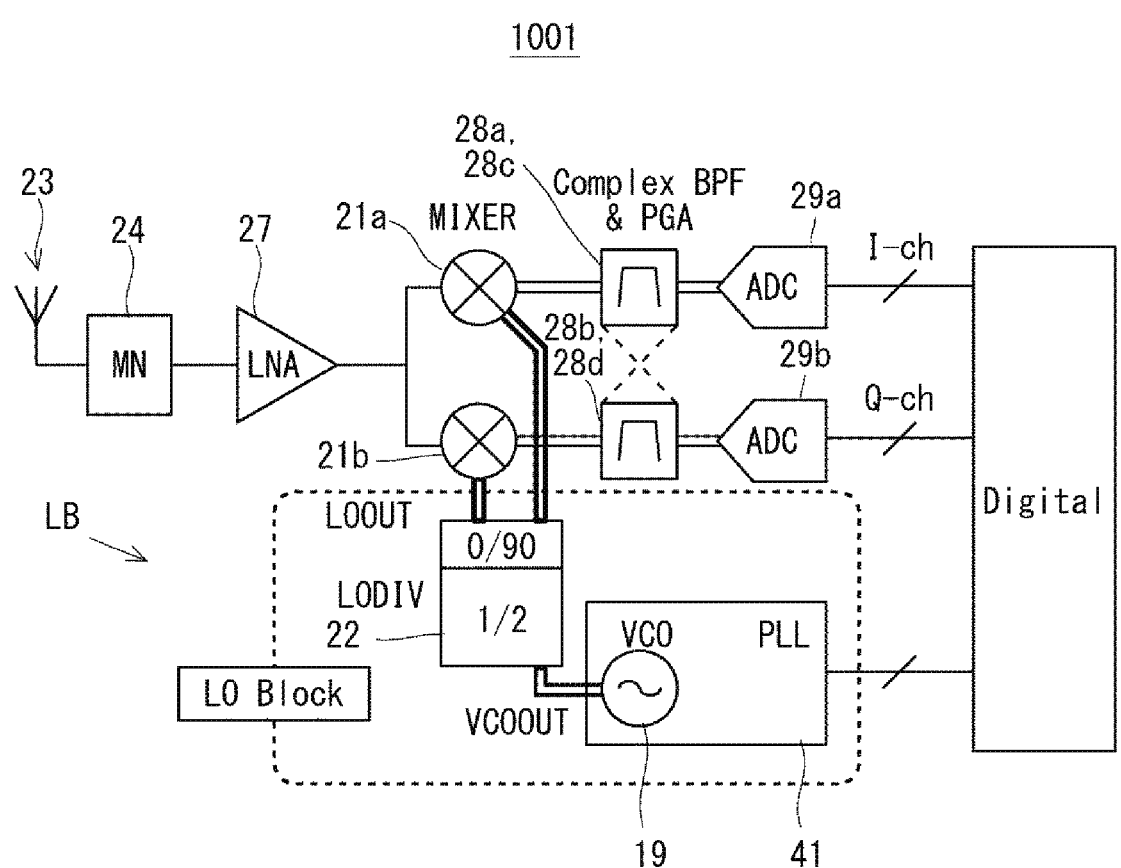
FIG. 1 is a circuit diagram illustrating a high-frequency signal processing circuitry according to a comparative example.

For the sake of clarity, the following descriptions and drawings are omitted and simplified as appropriate. Moreover, in each drawing, the same elements are denoted by the same reference characters and redundant description is omitted as necessary.

Comparative Example

First, a high-frequency signal processing circuitry according to a comparative example and problems thereof found by the inventor will be described. Note that the high-frequency signal processing circuitry according to the comparative example and the problems thereof are also included in the scope of the technical idea of the embodiment.

For example, in a receiver of the IQ quadrature modulation/demodulation system, the phase error between IQ signals (referred to as IQ phase error) in the IF frequency band of the mixer output may impair the image rejection ratio (IRR) in the case of the Low-IF system and impair the IQ orthogonality in the Zero-IF system. Thus, the phase error between IQ signals affects the image CH interference wave and modulation accuracy (EVM, Error Vector Magnitude). If the IQ orthogonality of the LO (Local Oscillator) signal is incomplete and there is an IQ phase error, the IQ orthogonality in the IF frequency band is also incomplete. The embodiments described later are, as an example, techniques for improving the IQ orthogonality of LO signals, that is, for reducing the IQ phase error.

FIG. 1 is a circuit diagram illustrating a high-frequency signal processing circuitry according to the comparative example. As shown in FIG. 1, a high-frequency signal processing circuitry 1001 according to the comparative example has a circuit configuration of a Low-IF receiver as an example of the IQ quadrature modulation/demodulation system. The high-frequency signal processing circuitry 1001 includes an antenna 23, an antenna impedance matching network (referred to also as MN) 24, a low noise amplifier (referred to also as LNA) 27, mixers (referred to also as MIXER) 21*a* and 21*b*, band pass filters (referred to also as BPF) 28*a* and 28*b*, programmable gain amplifiers (referred to also as PGA) 28*c* and 28*d*, analog to digital converters (referred to also as ADC) 29*a* and 29*b*, an LODIV (frequency divider for local oscillator, referred to also as LO divider) 22, a voltage controlled oscillator (referred to also as VCO) 19, and a phase locked loop (referred to also as PLL) 41. Note that the mixers 21*a* and 21*b*, the bandpass filters 28*a* and 28*b*, and the analog to digital converters 29*a* and 29*b* are collectively referred to as a mixer 21, a bandpass filter 28, and an analog to digital converter 29, respectively.

The antenna 23 is connected to the antenna impedance matching network 24. The antenna impedance matching network 24 is connected to the low noise amplifier 27. The low noise amplifier 27 is connected to the mixers 21*a* and 21*b*. The mixer 21*a* is connected to the analog to digital converter 29*a* via the bandpass filter 28*a* and the programmable gain amplifier 28*c*. The mixer 21*b* is connected to the analog to digital converter 29*b* via the bandpass filter 28*b* and the programmable gain amplifier 28*d*. The analog to digital converters 29*a* and 29*b* are connected to a digital circuit.

Also, the mixers 21*a* and 21*b* are connected to the LODIV 22. Further, the LODIV 22 is connected to the VCO 19 and the PLL 41. The PLL 41 is connected to the digital circuit. The block including the LODIV 22, the VCO 19, and the PLL 41 is referred to as an LO block (referred to also as local oscillator block) LB. Namely, the LO block LB includes the LODIV 22, the VCO 19, and the PLL 41. The output of the VCO 19 is referred to as an output VCOOUT. The VCO 19 provides the output VCOOUT to the LODIV 22. The output of the LODIV 22 is referred to as an output LOOUT. The LODIV 22 provides the output LOOUT to the mixer 21. Therefore, the LO block LB provides the output LOOUT to the mixer 21. The embodiment, which will be described later, is characterized by the LO block LB in the drawing.

Note that the IQ quadrature modulation/demodulation system is not limited to the Low-IF system, and may be the Zero-IF system. Moreover, the high-frequency signal processing circuitry 1001 may be applied not only to a receiver with the IQ quadrature modulation/demodulation system, but also to a transmitter with the IQ quadrature modulation system.

<Cause of IQ Phase Error>

Figure 2:
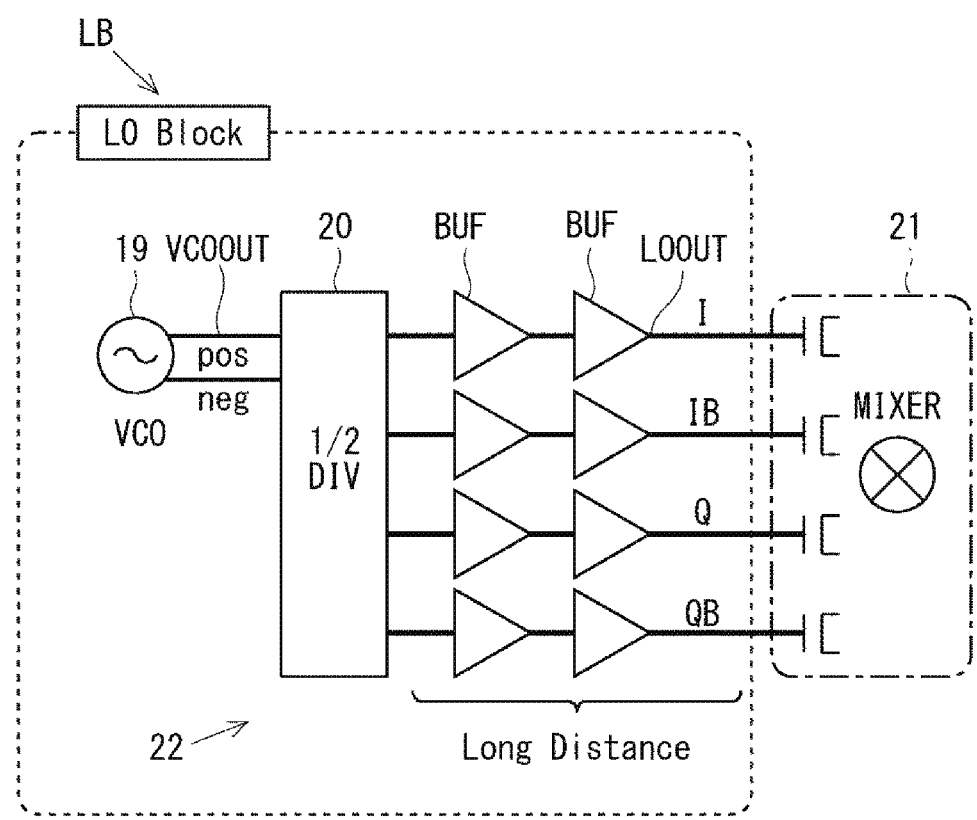
FIG. 2 is a block diagram illustrating a connection between an LO block and a mixer without measures for reducing the IQ phase error in the high-frequency signal processing circuitry according to the comparative example.

Next, the cause of the IQ phase error will be described. FIG. 2 is a block diagram illustrating a connection between the LO block LB and the mixer 21 without measures for reducing the IQ phase error in the high-frequency signal processing circuitry 1001 according to the comparative example. As shown in FIG. 2, the LO block LB includes the VCO 19, the DIV (frequency divider) 20, and a plurality of buffers BUF. Thus, the LODIV 22 includes the DIV 20 and the plurality of buffers BUF. Note that some reference characters are omitted so as not to complicate the drawing.

The high-frequency signal processing circuitry 1001 normally needs to minimize the signal path with the highest frequency before the DIV 20 in order to suppress the increase in current consumption. Therefore, since the DIV 20 is laid out at a position close to the VCO 19, the signal transmission distance between the DIV 20 and the mixer 21 is extended. Thus, it is necessary to arrange the relay buffer BUF. For example, in FIG. 2, the relay buffers BUF on two stages in total are arranged near the DIV 20 and near the mixer 21.

Specifically, the VCO 19 is connected to the DIV 20. The VCO 19 provides the output VCOOUT including pos signals and neg signals to the DIV 20. The DIV 20 is connected to the mixer 21 via the plurality of buffers BUF. The LODIV 22 including the DIV 20 and the plurality of buffers BUF provides the output LOOUT including I signals, IB signals, Q signals, and QB signals to the mixer 21.

Figure 3:
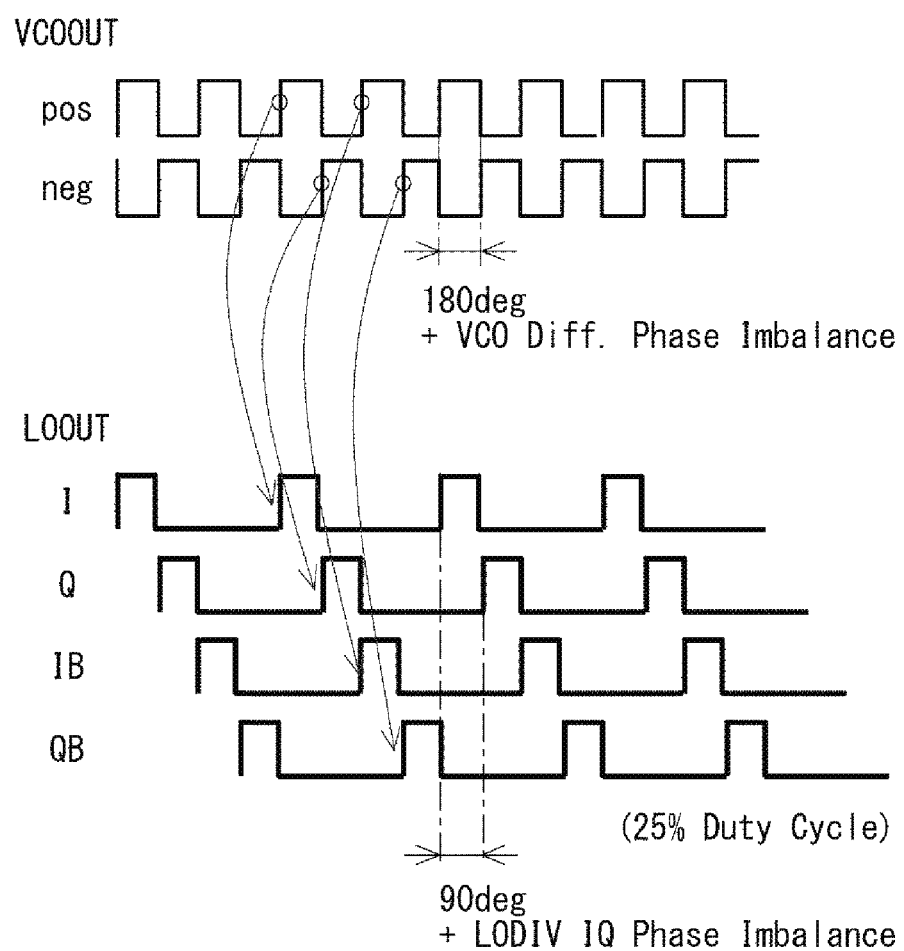
FIG. 3 is a diagram illustrating waveforms of an output VCOOUT of a VCO and an output LOOUT of an LODIV in the high-frequency signal processing circuitry according to the comparative example, in which the horizontal axis represents time and the vertical axis represents intensity.

FIG. 3 is a diagram illustrating waveforms of the output VCOOUT of the VCO 19 and the output LOOUT of the LODIV 22 in the high-frequency signal processing circuitry 1001 according to the comparative example, in which the horizontal axis represents time and the vertical axis represents intensity. As shown in FIG. 3, the IQ signal of the output LOOUT is generated from the rise edge of the differential signal of the output VCOOUT of the VCO 19. Therefore, the IQ phase error is generated randomly due to the differential imbalance of the VCO 19 and the IQ imbalance of the relay buffer BUF.

Figure 4A:
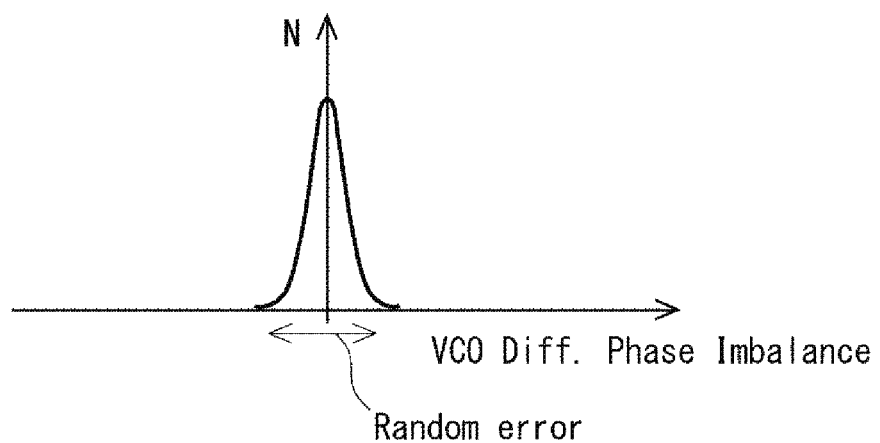
FIG. 4A and FIG. 4B are diagrams illustrating the cause of IQ phase error variation in the high-frequency signal processing circuitry according to the comparative example.
Figure 4B:
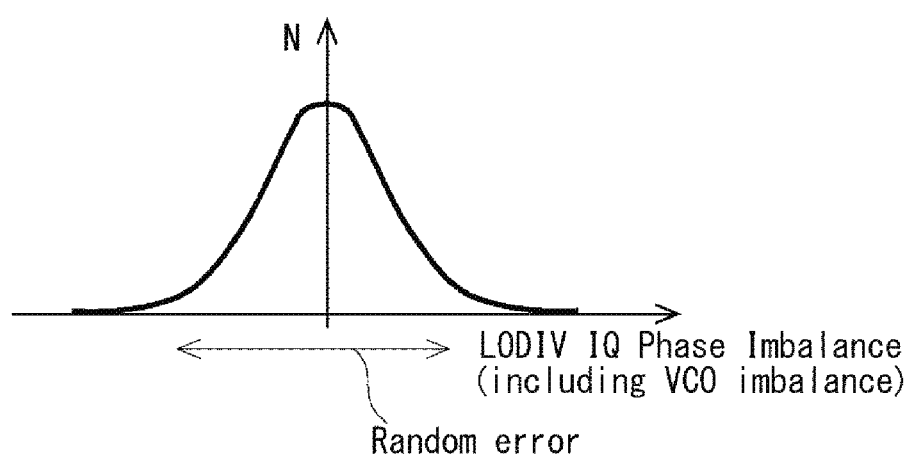

FIG. 4A and FIG. 4B are diagrams illustrating the cause of IQ phase error variation in the high-frequency signal processing circuitry 1001 according to the comparative example. As shown in FIG. 4A, the phase error of the output VCOOUT of the VCO 19 is caused by, for example, the error due to the differential imbalance of the VCO 19, and spreads in a normal distribution. As shown in FIG. 4B, the phase error of the output LOOUT of the LODIV 22 is caused by the phase error of the VCO 19 and the IQ signal imbalance of the relay buffer BUF, and spreads in a normal distribution. There is a demand for measures to reduce such an IQ phase error.

<Problems Found by Inventor>

FIG. 5A to FIG. 5E are diagrams illustrating general measures for reducing the IQ phase error in the high-frequency signal processing circuitry 1001 according to the comparative example. As shown in FIG. 5A to FIG. 5E, the following measures are conceivable as general measures for reducing the IQ phase error. However, each measure has problems.

Figure 5A:
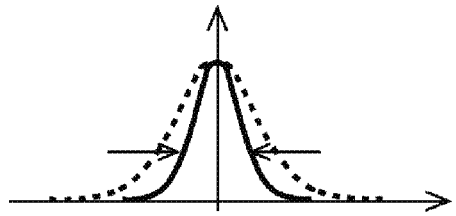
FIG. 5A to FIG. 5E are diagrams illustrating general measures for reducing the IQ phase error in the high-frequency signal processing circuitry according to the comparative example.

Measure (1): To reduce element mismatch. By this means, as shown in FIG. 5A, the distribution width of the phase error can be narrowed. However, this causes the increase in element size and the increase in parasitic capacitance due to common centroid arrangement, resulting in the increase in area and current, so there is a limit to the reduction of element mismatch.

Figure 5B:
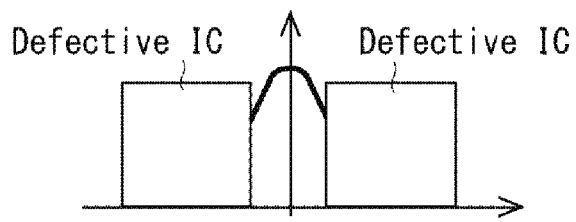

Measure (2): To reduce those with large errors based on test sorting as shown in FIG. 5B. However, the sorting cost is required and defective products are produced, resulting in the increase in product cost.

Figure 5C:
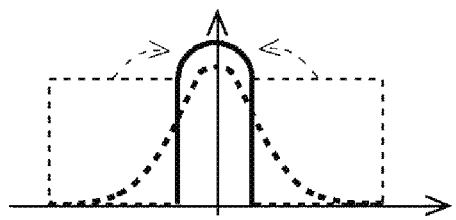

Measure (3): To install a calibration mechanism (adjustment mechanism, detection mechanism, and algorithm) as shown in FIG. 5C. However, installation of such a mechanism causes the increase in area and the increase in current. For example, as a measure (3-1), it is conceivable to perform calibration at the time of IC shipment, but a memory to store the calibration results is required, resulting in the increase in product cost. Also, as a measure (3-2), it is conceivable to perform calibration when the receiving operation is not performed. However, in the first place, the current increases by the amount corresponding to the time for performing the calibration. In addition, the control becomes complicated. As a measure (3-3), it is conceivable to perform calibration on the customer side, but this increases the burden on the customer side and increases the cost of the final product.

Figure 5D:
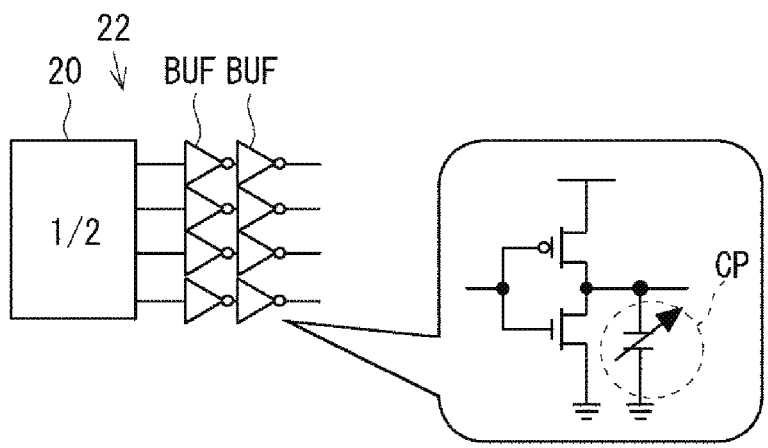
Figure 5E:
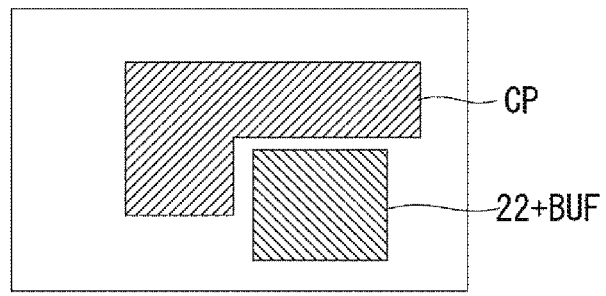

For example, as shown in FIG. 5D, the adjustment mechanism in the calibration mechanism enables the phase adjustment by adding the adjustment capacitor CP independently variable for the I signal and the Q signal to the part of the buffer BUF. In order to correct all the error in FIG. 4B, the adjustment capacitor CP is required to have a sufficiently wide variable range and correction accuracy according to the target image rejection ratio (IRR). Therefore, as shown in FIG. 5E, the adjustment capacitor CP has an area larger than the total area of the main body of the LODIV 22 and the buffer BUF. Also, the addition of the variable capacitor to be the adjustment capacitor CP increases the parasitic capacitance and reduces the amplitude. Therefore, it is necessary to increase the size of the buffer BUF, and this causes the current increase.

As described above, all the measures cause the increase in current consumption and the increase in product cost (due to chip area and testing). For example, in BLE (2.4 GHz), the current in the LO block accounts for half or more of the total current in transmission/reception mode, so the influence is large.

First Embodiment

Next, a high-frequency signal processing circuitry according to the embodiment will be described. The present embodiment is a novel measure approach that does not belong to any of the measures (1) to (3) in FIG. 5A to FIG. 5E described above.

<Feature (1)>

Figure 6:
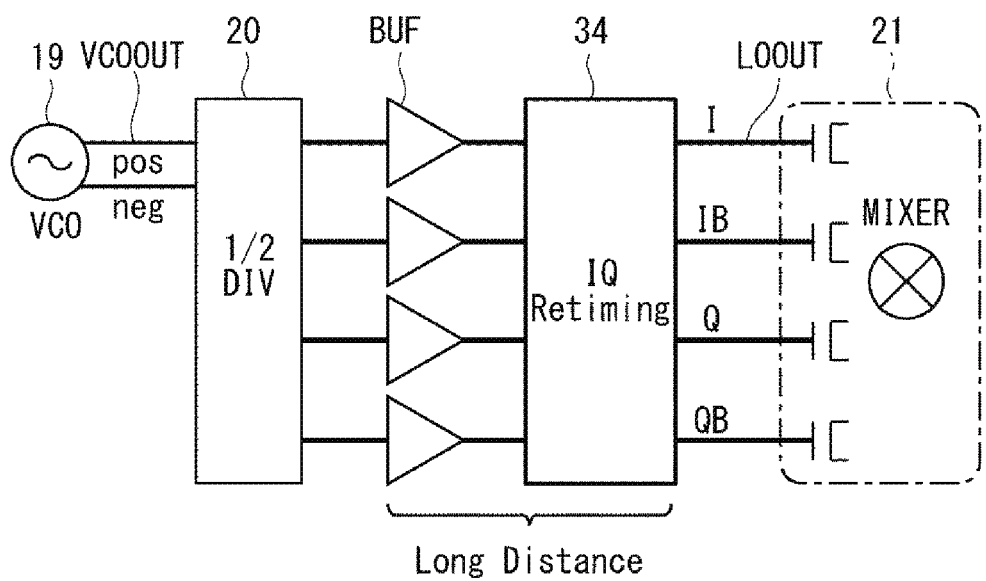
FIG. 6 is a block diagram illustrating a high-frequency signal processing circuitry according to the first embodiment.

FIG. 6 is a block diagram illustrating the high frequency signal processing circuitry according to the first embodiment. As shown in FIG. 6, the feature (1) of the present embodiment is that a retiming circuit (referred to also as IQ Retiming circuit) 34 is arranged near the mixer 21. Specifically, the retiming circuit 34 is arranged between the DIV 20 and the mixer 21. In this way, the area/current penalty can be reduced and the error factors can be reduced as compared with the comparative example. The retiming circuit 34 has, for example, an analog automatic correction function. In addition, the retiming circuit 34 can reduce the area occupied with respect to the entire circuit and can reduce the current penalty. Also, a phase calibration mechanism can be made unnecessary. Description will be given below with reference to the drawings. Strictly speaking, the phase error caused by the retiming circuit 34 remains in the LO signal of the output LOOUT, but calibration of such phase error may be unnecessary depending on the required specifications.

<Feature (2)>

Figure 7A:
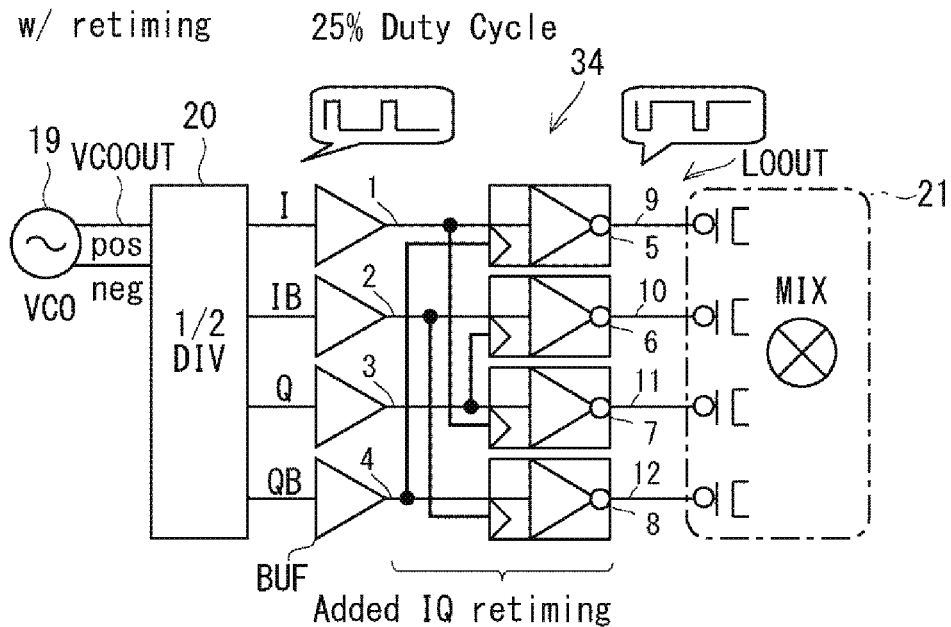
FIG. 7A to FIG. 7D are circuit diagrams illustrating the configuration of the high-frequency signal processing circuitry according to the first embodiment.

FIG. 7A to FIG. 7D are circuit diagrams illustrating the configuration of the high-frequency signal processing circuitry according to the first embodiment. As shown in FIG. 7A, the retiming circuit 34 is arranged between the DIV 20 and the mixer 21. The retiming circuit 34 has the function of combining the edges between the IQ signals to generate the LO signal. However, any configuration may be used as long as the circuit performs desired edge combining. Also, as a precondition for using the retiming circuit 34, the input waveform of the retiming circuit 34 preferably has an approximately 25% or approximately 75% duty cycle or a duty cycle close thereto. The operating frequencies of the I signal, the IB signal, the Q signal, and the QB signal are equal to each other.

In actual implementation, in order to suppress the phase error after the retiming circuit 34, the retiming circuit 34 and the mixer 21 are arranged at positions close to each other in terms of layout (see FIG. 8). Further, another feature is that the mixer 21 is designed to have a P-type MOS configuration so as not to interpose an inverter after the retiming circuit 34 as shown in FIG. 7A. If the output of the retiming circuit 34 is 25%, the mixer 21 is preferably designed to have an N-type MOS configuration.

Specifically, the retiming circuit 34 includes an input terminal 1, an input terminal 2, an input terminal 3, an input terminal 4, an output terminal 9, an output terminal 10, an output terminal 11, an output terminal 12, an RT circuit 5, an RT circuit 6, an RT circuit 7, and an RT circuit 8. The RT circuits 5, 6, 7, and 8 are collectively referred to as the RT circuit 30. The RT circuit 30 functions as a waveform synthesizer that synthesizes waveforms.

The I signal, the IB signal, the Q signal, and the QB signal are input as input signals to the input terminal 1, the input terminal 2, the input terminal 3, and the input terminal 4, respectively. The frequencies of each input signal are equal to each other.

Figure 7B:
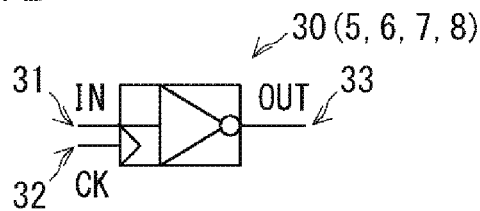

As shown in FIG. 7B, each RT circuit 30 (RT circuits 5 to 8) has terminals 31 and 32 to which the input signals are input and an output terminal 33 from which the output signal obtained by synthesizing the plurality of input signals is output.

As shown in FIG. 7A, the terminal 31 of the RT circuit 5 is connected to the input terminal 1. The terminal 32 of the RT circuit 5 is connected to the input terminal 4. The terminal 33 of the RT circuit 5 is connected to the output terminal 9. The terminal 31 of the RT circuit 6 is connected to the input terminal 2. The terminal 32 of the RT circuit 6 is connected to the input terminal 3. The terminal 33 of the RT circuit 6 is connected to the output terminal 10.

The terminal 31 of the RT circuit 7 is connected to the input terminal 3. The terminal 32 of the RT circuit 7 is connected to the input terminal 1. The terminal 33 of the RT circuit 7 is connected to the output terminal 11. The terminal 31 of the RT circuit 8 is connected to the input terminal 4. The terminal 32 of the RT circuit 8 is connected to the input terminal 2. The terminal 33 of the RT circuit 8 is connected to the output terminal 12.

Figure 7C:
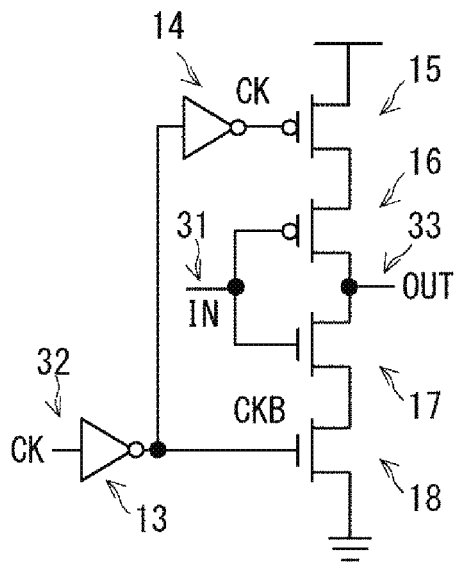
Figure 7D:
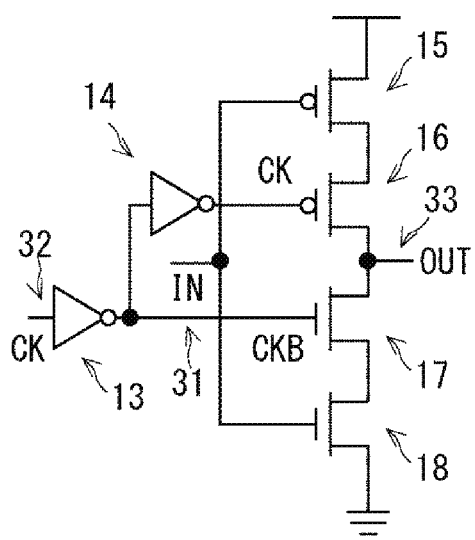

As shown in FIG. 7C and FIG. 7D, the RT circuit 30 having the retiming buffer may include a plurality of inverter circuits 13 and 14, a plurality of PMOS transistors 15 and 16, and a plurality of NMOS transistors 17 and 18.

For example, as shown in FIG. 7C, in the RT circuit 30, the terminal 31 is connected to the gate of the PMOS transistor 16 and the gate of the NMOS transistor 17. The terminal 32 is connected to the inverter circuit 13. The inverter circuit 13 is connected to the inverter circuit 14 and the gate of the NMOS transistor 18. The inverter circuit 14 is connected to the gate of the PMOS transistor 15. The drain of PMOS transistor 15 is connected to the source of the PMOS transistor 16. The drain of the NMOS transistor 18 is connected to the source of the NMOS transistor 17. The drain of the PMOS transistor 16 and the drain of the NMOS transistor 17 are connected to the terminal 33.

Further, for example, as shown in FIG. 7D, in the RT circuit 30, the terminal 31 is connected to the gate of the PMOS transistor and the gate of the NMOS transistor 18. The terminal 32 is connected to the inverter circuit 13. The inverter circuit 13 is connected to the inverter circuit 14 and the gate of the NMOS transistor 17. The inverter circuit 14 is connected to the gate of the PMOS transistor 16. The drain of the PMOS transistor 15 is connected to the source of the PMOS transistor 16. The drain of the NMOS transistor 18 is connected to the source of the NMOS transistor 17. The drain of the PMOS transistor 16 and the drain of the NMOS transistor 17 are connected to the terminal 33.

<Layout Example of LODIV>

Figure 8A:
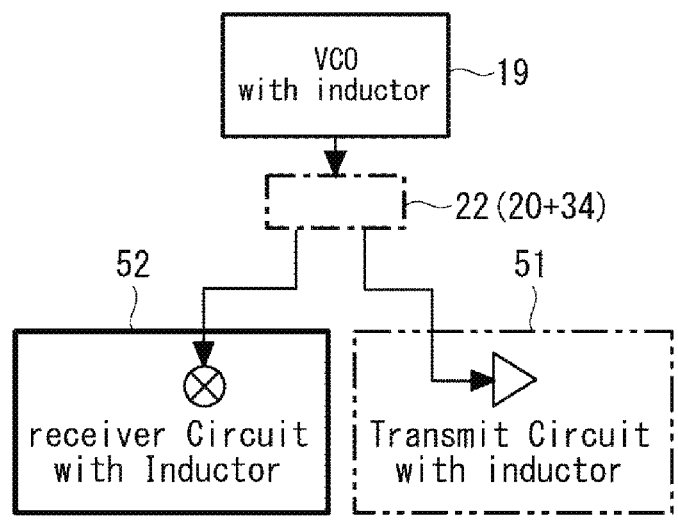
FIG. 8A to FIG. 8C are diagrams illustrating the arrangement of the LODIV in the high-frequency signal processing circuitry according to the first embodiment.
Figure 8B:
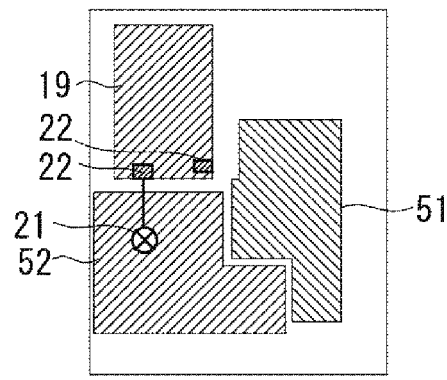
Figure 8C:
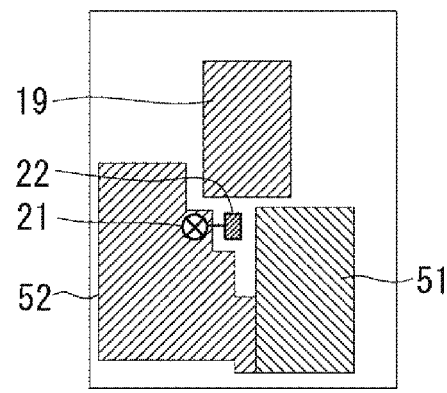

FIG. 8A to FIG. 8C are diagrams illustrating the arrangement of the LODIV 22 in the high-frequency signal processing circuitry according to the first embodiment. First, the basic idea of the arrangement of the LODIV 22 including the DIV 20 and the retiming circuit 34 will be described. As shown in FIG. 8A, the LODIV 22 needs to supply signals to both a transmit circuit 51 and a receiver circuit 52. In order to balance the transmission and reception, a design in which the LODIV 22 is placed near either the transmit circuit or the receiver circuit is usually inconceivable. In addition, as compared with the LODIV 22, the VCO 19, the transmit circuit 51, and the receiver circuit 52 are large in size because they include inductors, and the transmission wiring from the LODIV 22 to the transmit circuit 51 and the receiver circuit 52 is long.

For example, as shown in FIG. 8B, in the comparative example, the distance between the LODIV 22 and the receiver circuit 52 is equivalent to the distance between the LODIV 22 and the transmit circuit 51.

On the other hand, as shown in FIG. 8C, in this embodiment, both the distance between the LODIV 22 and the receiver circuit 52 and the distance between the LODIV 22 and the transmit circuit 51 are shorter than the distances in the comparative example. Also, the distance between the LODIV 22 and the receiver circuit 52 is shorter than the distance between the LODIV 22 and the transmit circuit 51. In this way, in this embodiment, the floor plan of the VCO 19, the transmit circuit 51, and the receiver circuit 52 is devised such that the wiring of the LODIV 22 is shortened. Moreover, in order to maximize the retiming effect, the mixer 21 of the receiver circuit 52 and the LODIV 22 are arranged close to each other such that the distance therebetween is shortened.

<Effect: Conclusion of Effect>

Figure 9:
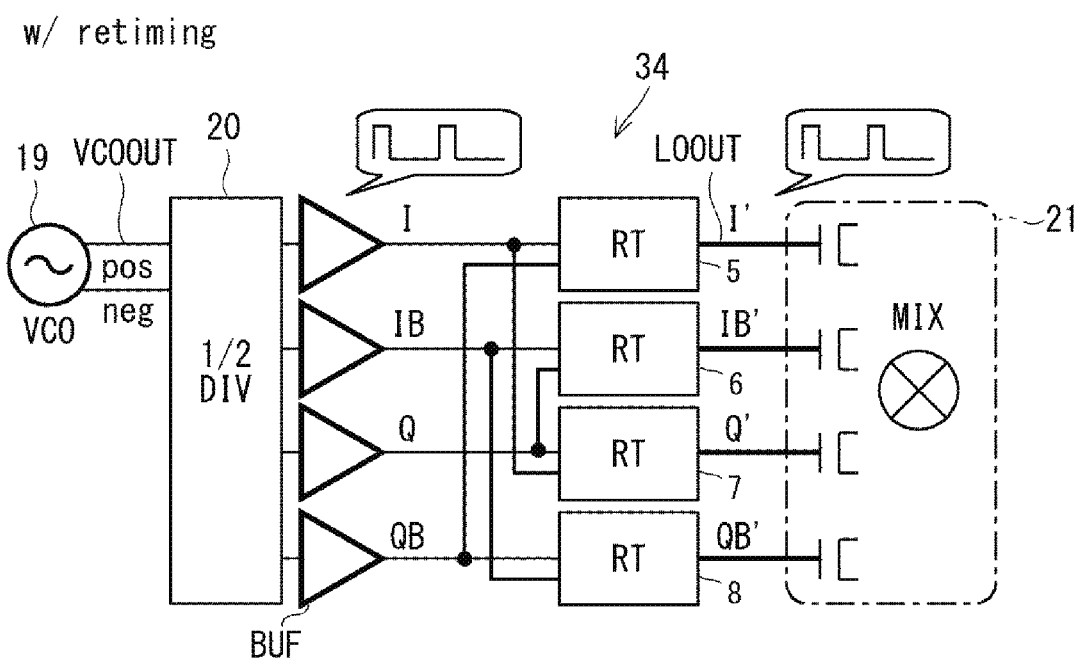
FIG. 9 is a block diagram for describing the reduction of IQ phase error by a retiming circuit in the high-frequency signal processing circuitry according to the first embodiment.

Next, the effect of reducing the IQ phase error by the retiming circuit 34 according to the first embodiment will be described. FIG. 9 is a block diagram for describing the reduction of IQ phase error by the retiming circuit 34 according to the first embodiment. As shown in FIG. 9, in order to simplify the description of the reduction of the IQ phase error by the retiming circuit 34, the mixer 21 has an NMOS configuration and the input and output of the retiming circuit 34 are non-inverted.

Figures 10A, 10B:
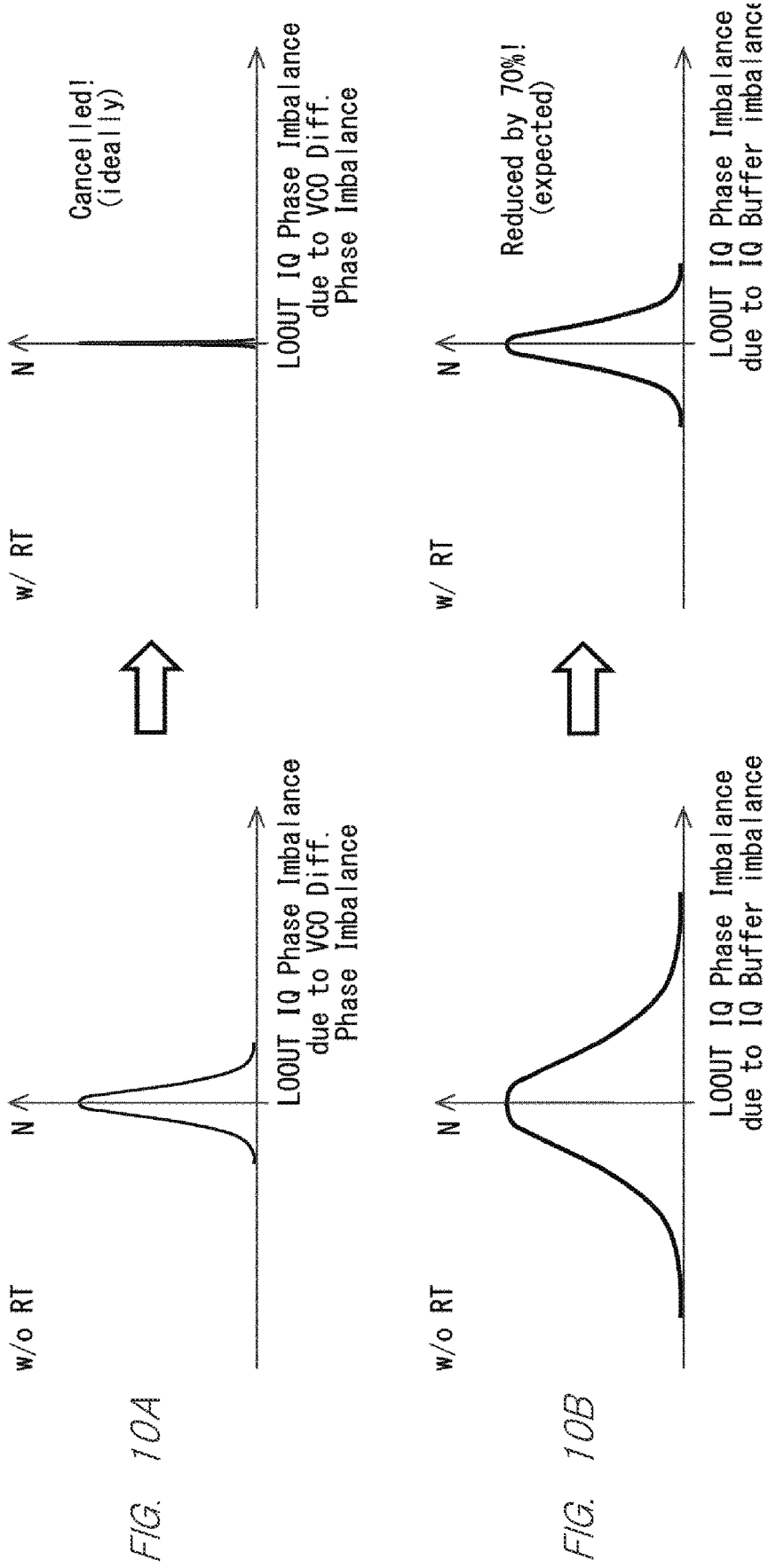
FIG. 10A and FIG. 10B are image diagrams illustrating the reduction of IQ phase error by a retiming circuit in the high-frequency signal processing circuitry according to the first embodiment.

FIG. 10A and FIG. 10B are image diagrams illustrating the reduction of IQ phase error by the retiming circuit 34 according to the first embodiment. As shown in FIG. 10A and FIG. 10B, the present embodiment has two types of IQ phase error reduction effects. The first is the effect that the IQ phase error component due to the differential imbalance of the VCO 19 is cancelled in the output LOOUT as shown by the change in FIG. 10A. The second is the effect that the IQ phase error due to the IQ imbalance of the relay buffer BUF can be reduced in the output LOOUT as shown by the change in FIG. 10B. For example, according to theoretical calculations, the reduction of about 70% is calculated as an expected value. Hereinafter, each effect will be described using a timing chart and others.

<Effect: Outline of Effect (without IQ Phase Error)>

Figure 11A:
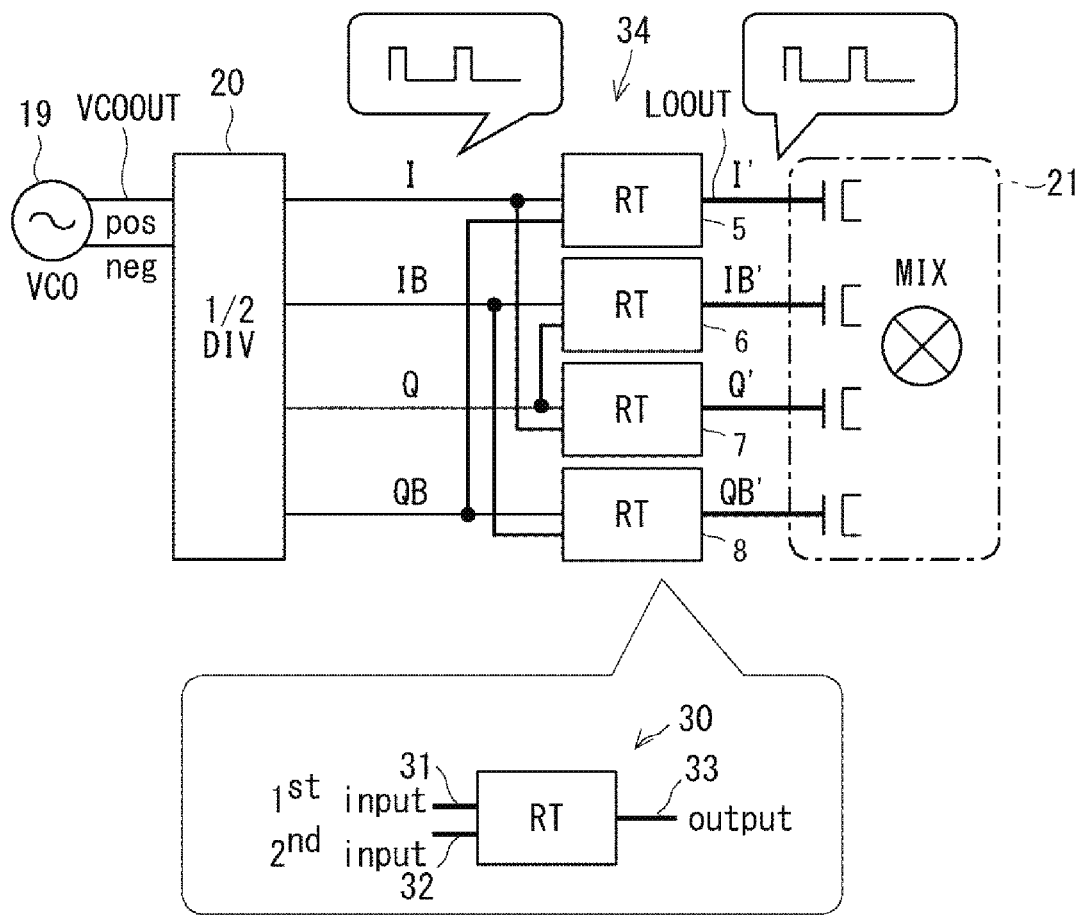
FIG. 11A and FIG. 11B are block diagrams for describing timings of input/output signals of an RT circuit under the condition without IQ phase error in the high-frequency signal processing circuitry according to the first embodiment.
Figure 11B:
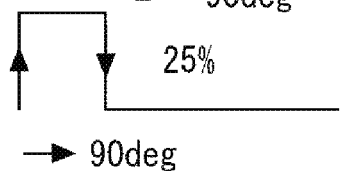

FIG. 11A and FIG. 11B are diagrams for describing timings of input/output signals of the RT circuit 30 under the condition without IQ phase error in the high-frequency signal processing circuitry according to the first embodiment. As shown in FIG. 11A, the RT circuit 30 has two inputs and one output. The output signal output from the terminal 33 of the RT circuit 30 is a digital signal that takes two states, a first state and a second state. In conjunction with the first input signal input to the terminal 31 or the second input signal input to the terminal 32, the output signal transitions from the first state to the second state. Also, in conjunction with the first input signal input to the terminal 31, the output signal transitions from the second state to the first state.

Specifically, for example, of the rise edge of the first input signal and the fall edge of the second input signal, the edge with the larger phase delay is propagated to the rise edge of the output signal. The fall edge of the first input signal is propagated to the fall edge of the output signal. As shown in FIG. 11B, the rise and fall have a relationship of 90-degree delay in the signal with a 25% duty ratio.

Figure 12:
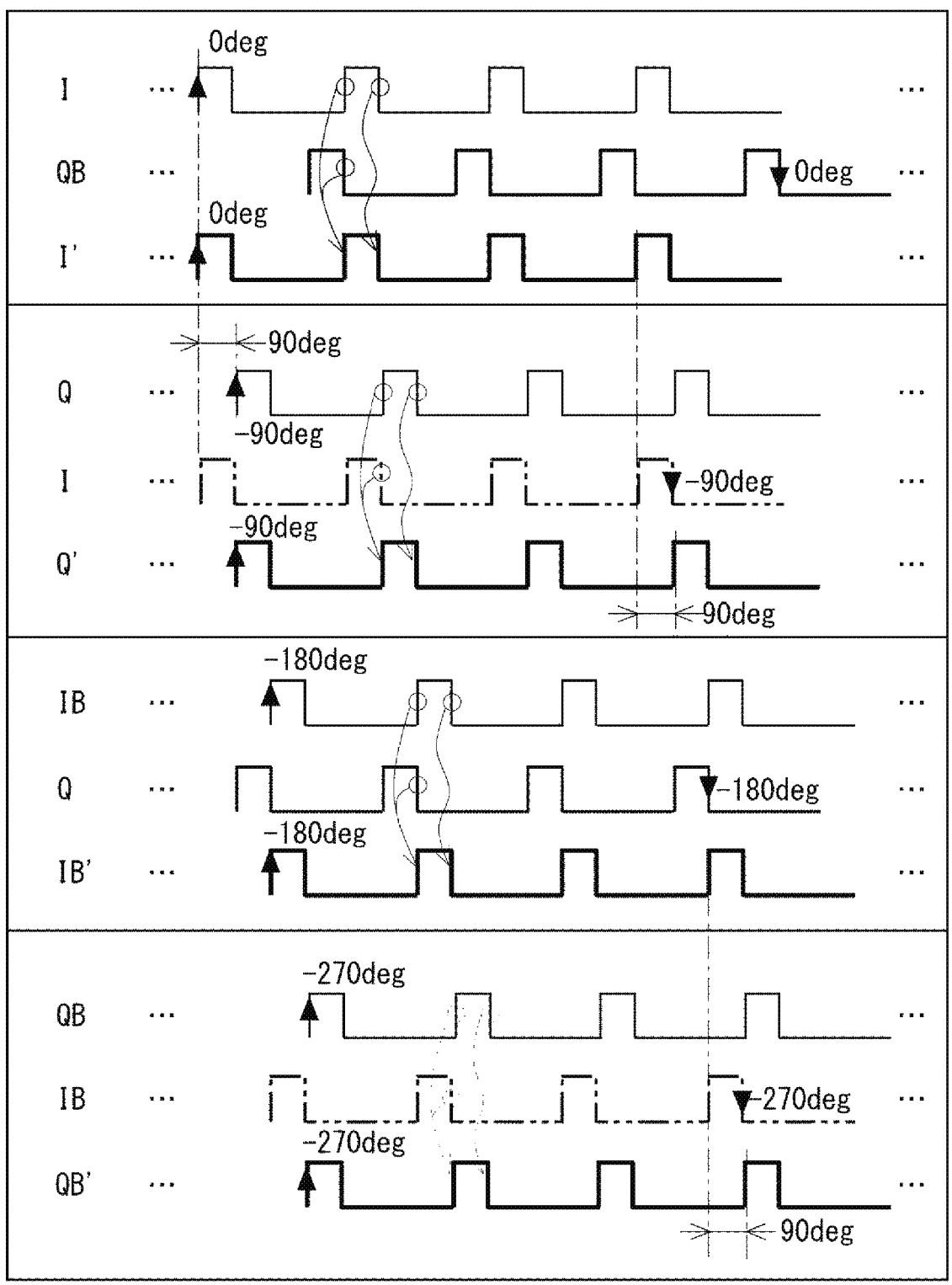
FIG. 12 is a timing chart illustrating input/output signals of the RT circuit under the condition without IQ phase error in the high-frequency signal processing circuitry according to the first embodiment.

FIG. 12 is a timing chart illustrating input/output signals of the RT circuit 30 under the condition without IQ phase error in the high-frequency signal processing circuitry according to the first embodiment. As shown in FIG. 12, under the condition without phase error, both the rise edge of the I signal and the fall edge of the QB signal are propagated to the rise edge of the I' signal. The fall edge of the I signal is propagated to the fall edge of the I' signal. Then, on the second to fourth stages, the same thing as that on the first stage occurs.

Namely, both the rise edge of the Q signal and the fall edge of the I signal are propagated to the rise edge of the Q' signal. The fall edge of the Q signal is propagated to the fall edge of the Q' signal. Both the rise edge of the IB signal and the fall edge of the Q signal are propagated to the rise edge of the IB' signal. The fall edge of the IB signal is propagated to the fall edge of the IB' signal. Both the rise edge of the QB signal and the fall edge of the IB signal are propagated to the rise edge of the QB' signal. The fall edge of the QB signal is propagated to the fall edge of the QB' signal.

In this way, the state of the output signal output from the terminal 33 of each RT circuit 30 transitions from one of the first and second states to the other of the first and second states in conjunction with the input signal input to the terminal 31 of each RT circuit 30 or the input signal input to the terminal 32 of each RT circuit 30. Then, in conjunction with the input signal input to the terminal 31 of each RT circuit 30, the state transitions from the other state to the one state.

FIG. 13A and FIG. 13B are diagrams illustrating the relationship between phases of input and output of the RT circuit and phase errors in the high-frequency signal processing circuitry according to the first embodiment. As shown in FIG. 13A and FIG. 13B, regarding the relationship of phases of the input and output of the RT circuit 30, the phase of the IB signal, the phase of the Q signal, and the phase of the QB signal are a value delayed by 180 degrees, a value delayed by 90 degrees, and a value delayed by 270 degrees, respectively, with respect to the phase of the I signal which is the input signal. All the phase errors are 0 under the condition that the rise and fall have the relationship of 90-degree delay in the signal with a 25% duty ratio.

<Effect: Outline (with IQ Phase Error)>

Next, the case with the IQ phase error will be described. Specifically, the phase of the second input signal, the phase of the third input signal, and the phase of the fourth input signal are a value delayed by 180 degrees or approximately 180 degrees, a value delayed by 90 degrees or approximately 90 degrees, and a value delayed by 270 degrees or approximately 270 degrees, respectively, with respect to the phase of the first input signal. Here, the value delayed by approximately 180 degrees, the value delayed by approximately 90 degrees, and the value delayed by approximately 270 degrees are a value including the phase error at the 180 degrees, a value including the phase error at the 90 degrees, and a value including the phase error at the 270 degrees, respectively. Then, at least one of the second input signal, the third input signal, and the fourth input signal is the value including a phase error.

Figure 14:
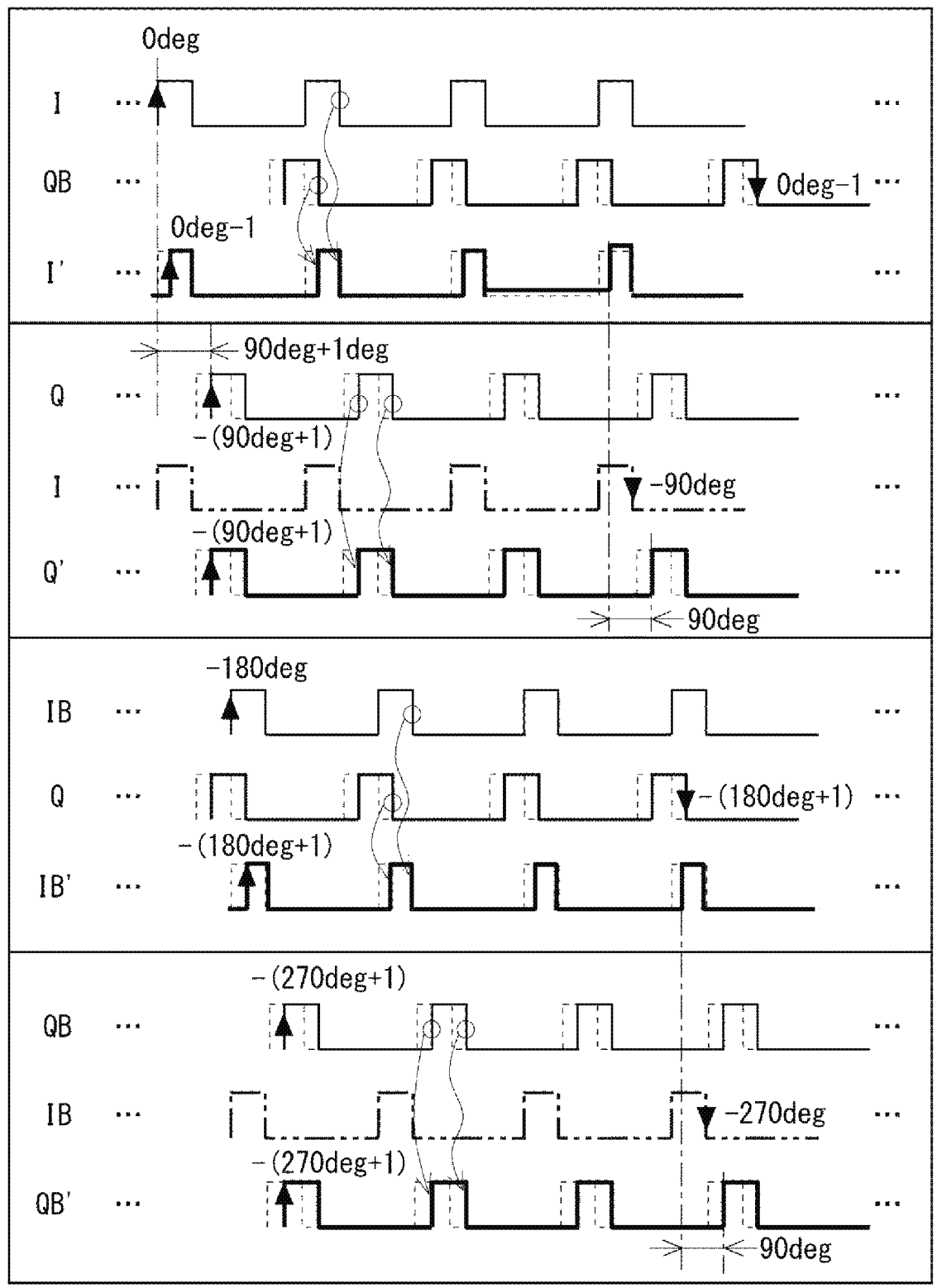
FIG. 14 is a timing chart illustrating input/output signals of the RT circuit under the condition with IQ phase error in the high-frequency signal processing circuitry according to the first embodiment.

FIG. 14 is a timing chart illustrating input/output signals of the RT circuit 30 under the condition with IQ phase error in the high-frequency signal processing circuitry according to the first embodiment. As an example, it is assumed that the Q signal and the QB signal are delayed by 90+1 degrees from the I signal and the IB signal, respectively, as shown in FIG. 14.

On the first stage, the fall edge of the QB signal is delayed from the rise edge of the I signal, and thus the rise edge of the I' signal is propagated from the fall edge of the QB signal. On the second stage, the rise edge of the Q signal is delayed from the fall edge of the I signal, and thus the rise edge of the Q' signal is propagated from the rise edge of the Q signal. Thereafter, the same thing as that on the uppermost stage occurs on the third stage. Also, the same thing as that on the second stage occurs on the fourth stage.

Namely, on the third stage, the fall edge of the Q signal is delayed from the rise edge of the IB signal, and thus the rise edge of the IB' signal is propagated from the fall edge of the Q signal. On the fourth stage, the rise edge of the QB signal is delayed from the fall edge of the IB signal, and thus the rise edge of the QB' signal is propagated from the rise edge of the QB signal.

FIG. 15A and FIG. 15B are diagrams illustrating the relationship between phases of input and output of the RT circuit and phase errors in the high-frequency signal processing circuitry according to the first embodiment. As shown in FIG. 15A and FIG. 15B, in the first input signal, one error is generated at the rise edge and fall edge of the Q signal and the QB signal, and the average phase error between the Q signal and the QB signal is 1 degree. On the other hand, the average phase error between the I signal and the IB signal is 0 degrees. Therefore, the phase error between the I signal and the Q signal is 1 degree. The reason for using the average value at this time will be described.

Figure 16:
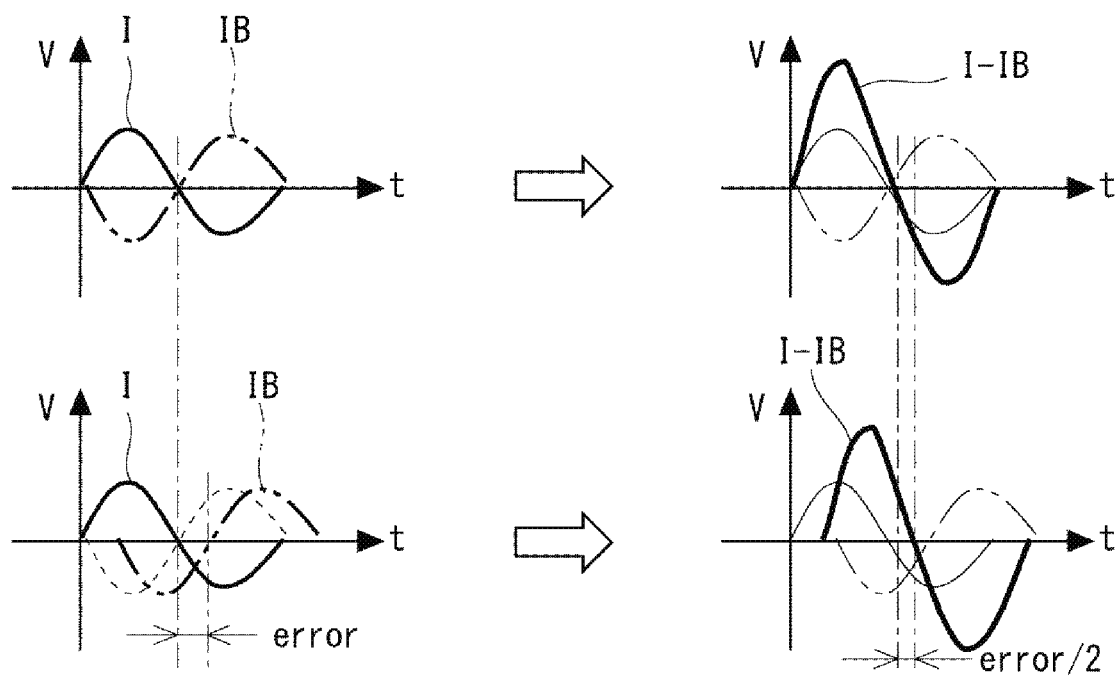
FIG. 16 is a diagram illustrating the influence of differential phase error of differential signals in the high-frequency signal processing circuitry according to the first embodiment.

FIG. 16 is a diagram illustrating the influence of differential phase error of differential signals in the high-frequency signal processing circuitry according to the first embodiment. As shown in FIG. 16, for the differential transmission signals, subtraction processing between the two signals is finally performed, thereby averaging phase errors between the differential signals. Therefore, average values are used in the above description.

On the other hand, in the output of the RT circuit 30, the error of 1 degree is propagated not only to the Q' signal and the QB' signal but also to the I' signal and the IB' signal. The average phase errors of the I signal and the Q signal are both 1. The phase error between the I signal and the Q signal is deducted to be 0.

<Effect: Preparation for Detailed Description (Input Side)>

In the previous section, the outline of the effects has been described. In practice, a large number of combinatorial random errors are treated. Therefore, the expression is generalized and detailed description is given below.

Figure 17A:
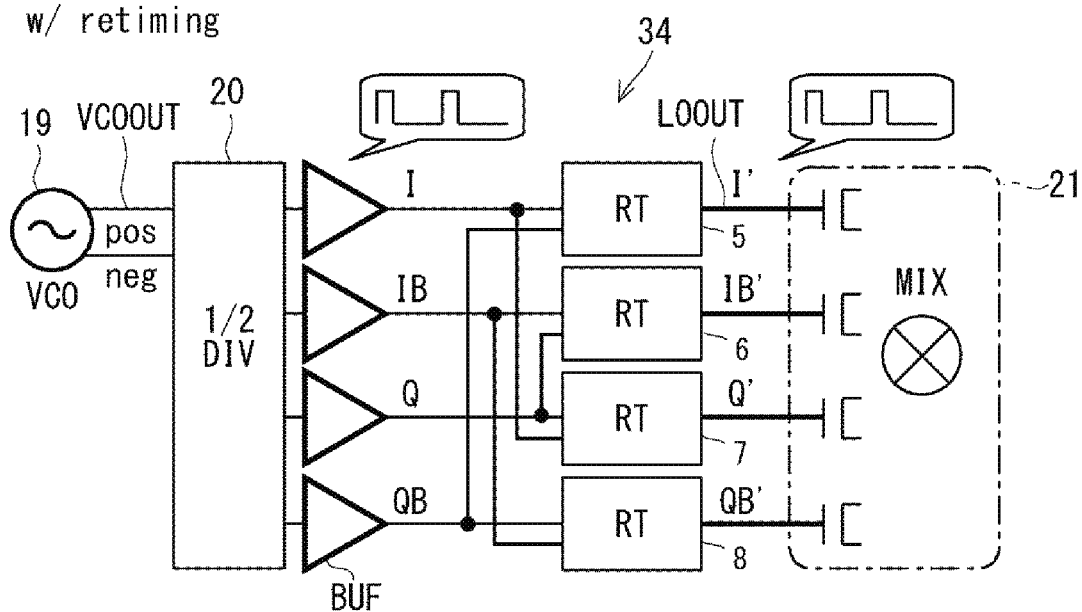
FIG. 17A and FIG. 17B are diagrams for describing the reduction of IQ phase error by the RT circuit in the high-frequency signal processing circuitry according to the first embodiment.
Figure 17B:
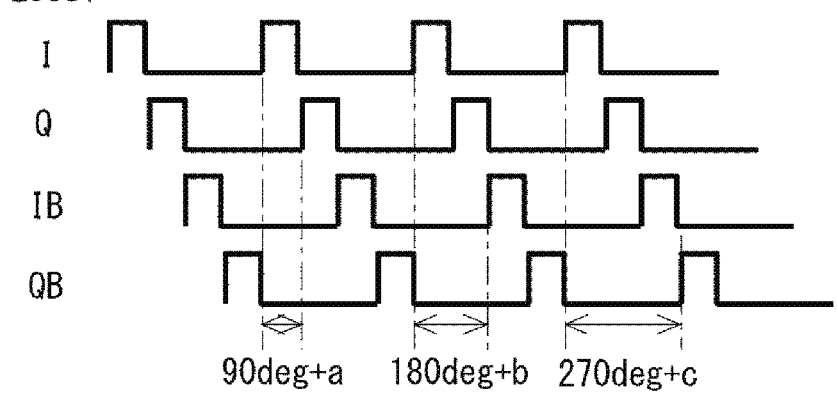

FIGS. 17A and 17B and FIGS. 18A and 18B are diagrams for describing the reduction of IQ phase error by the RT circuit 30 in the high-frequency signal processing circuitry according to the first embodiment. The reduction of the IQ phase error in the case of the high-frequency signal processing circuitry shown in FIG. 17A will be described. Before the detailed description, the phase (rise) in the input of the RT circuit 30 and the IQ phase error are defined as shown in FIG. 17B. Based on the rise edge of the phase of the I signal as a reference, the Q signal, the IB signal, and the QB signal have phase delays of 90 degrees, 180 degrees, and 270 degrees, respectively, and further include phase errors a, b, and c, respectively. As shown in FIG. 18A, the phase error between the I signal and the Q signal can be calculated from the phase error average Iave between the I signal and the IB signal and the phase error average Qave between the Q signal and the QB signal. The phase error between the I signal and the Q signal in the input of the RT circuit 30 is generated by (a+c−b)/2. Here, as shown in FIG. 18B, the phases of the respective signals are defined as follows: that is, the phase of I signal=0 degrees, the phase of Q signal=−90 degrees, the phase of IB signal=−180 degrees, and the phase of QB signal=−270 degrees.

<Effect: Preparation for Detailed Description (Output Side)>

As described above, the RT circuit 30 has two input terminals, that is, the terminals 31 and 32. The rise edge of the output signal takes the rise edge or the fall edge having a larger phase delay in the input signal of the terminal 31 or the terminal 32. The fall edge of the output signal takes the fall edge of the input signal input to the terminal 31. The phase error in the output signal of the RT circuit 30 needs to be classified according to the magnitude relationship of the phase errors a, b, and c.

FIGS. 19A to 19C, FIGS. 20A to 20C, FIGS. 21A to 21C, FIGS. 22A to 22C, and FIG. 23 are diagrams illustrating case classification of phase error in the output of the RT circuit 30 in the high-frequency signal processing circuitry according to the first embodiment.

Figure 19A:
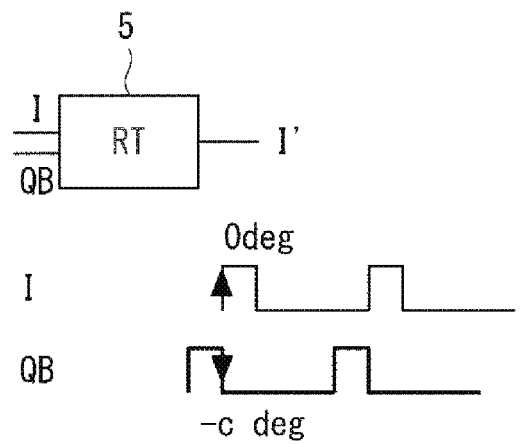
FIG. 19A to FIG. 19C are diagrams illustrating case classification of phase error in the output of the RT circuit in the high-frequency signal processing circuitry according to the first embodiment.
Figure 19B:
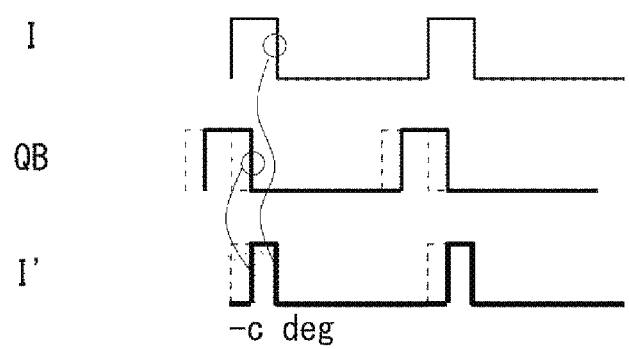
Figure 19C:
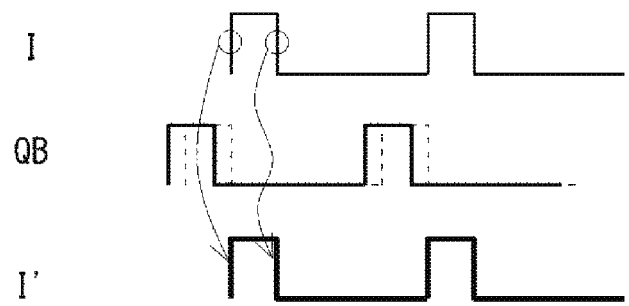

In the case of an RT circuit 5 in which the I signal is input to the first terminal and the QB signal is input to the second terminal as shown in FIG. 19A, the cases are classified according to "the phase error c>0" and "0≥the phase error c" as shown in FIG. 19B and FIG. 19C.

Figure 20A:
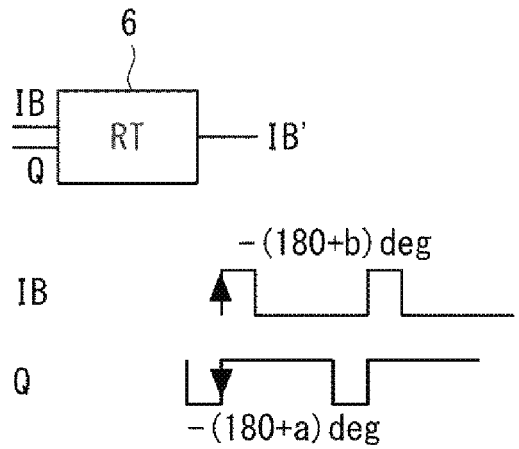
FIG. 20A to FIG. 20C are diagrams illustrating case classification of phase error in the output of the RT circuit in the high-frequency signal processing circuitry according to the first embodiment.
Figure 20B:
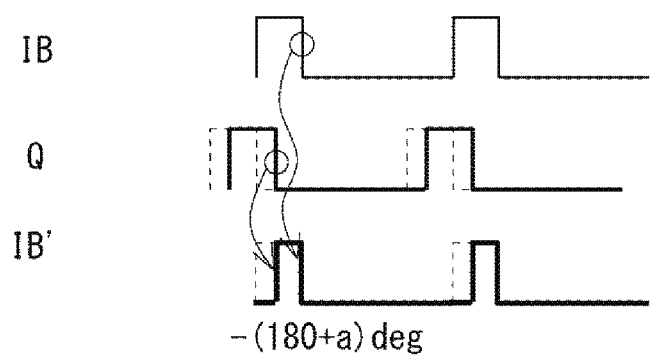
Figure 20C:
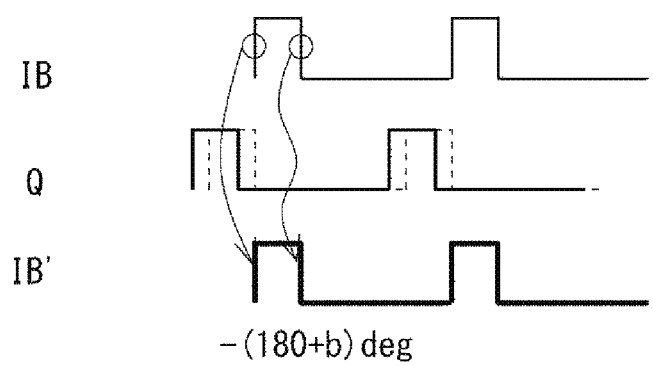

In the case of an RT circuit 6 in which the IB signal is input to the first terminal and the Q signal is input to the second terminal as shown in FIG. 20A, the cases are classified according to "the phase error a>the phase error b" and "the phase error b≥the phase error a" as shown in FIG. 20B and FIG. 20C.

Figure 21A:
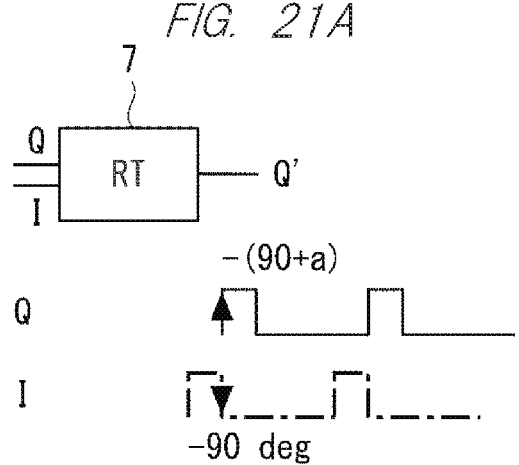
FIG. 21A to FIG. 21C are diagrams illustrating case classification of phase error in the output of the RT circuit in the high-frequency signal processing circuitry according to the first embodiment.
Figure 21B:
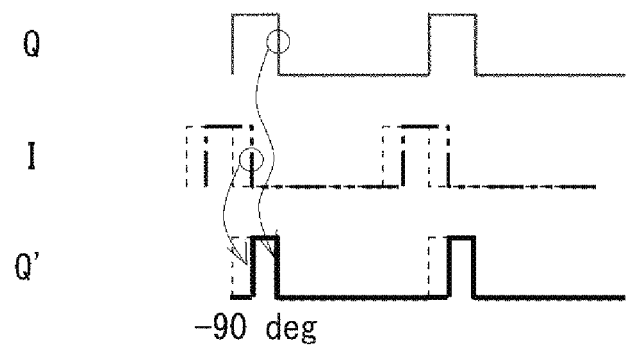
Figure 21C:
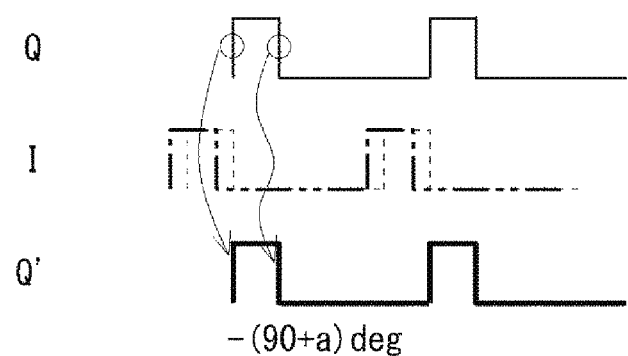

In the case of an RT circuit 7 in which the Q signal is input to the first terminal and the I signal is input to the second terminal as shown in FIG. 21A, the cases are classified according to "the phase error a<0" and "the phase error a≥0" as shown in FIG. 21B and FIG. 21C.

Figure 22A:
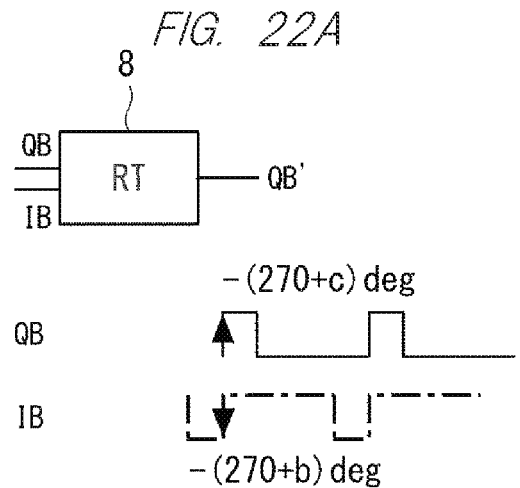
FIG. 22A to FIG. 22C are diagrams illustrating case classification of phase error in the output of the RT circuit in the high-frequency signal processing circuitry according to the first embodiment.
Figure 22B:
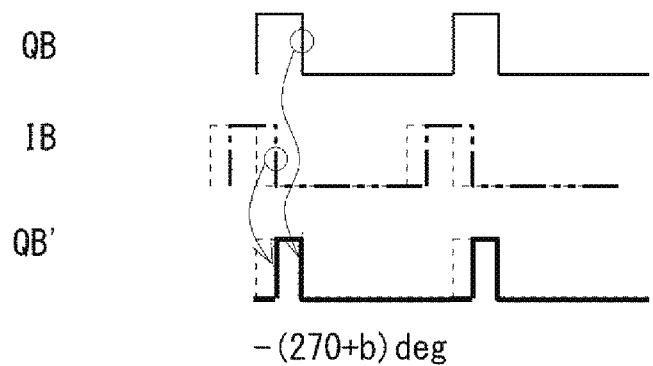
Figure 22C:
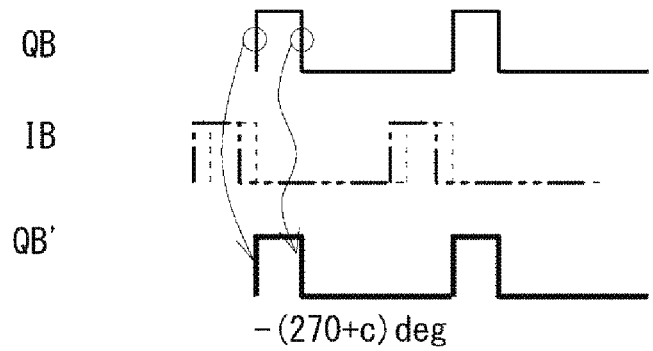

In the case of an RT circuit 8 in which the QB signal is input to the first terminal and the IB signal is input to the second terminal as shown in FIG. 22A, the cases are classified according to "the phase error b>the phase error c" and "the phase error c≥the phase error b" as shown in FIG. 22B and FIG. 22C.

Figure 23:
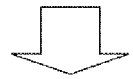
FIG. 23 is a diagram illustrating case classification of phase error in the output of the RT circuit in the high-frequency signal processing circuitry according to the first embodiment.

Therefore, the average phases Iave and Qave of the I signal and the Q signal and the phase error between the I signal and the Q signal (IQ Phase error) can be expressed by the expressions shown in FIG. 23. There are 4×4 combinations of the IQ phase errors. It is meant that, of the average phase error Iave of the I signal and the average phase error Qave of the Q signal, the IQ phase error becomes 0 and is cancelled in the combination having the same error term.

<Effect: Preparation for Detailed Description (Summary of Input and Output of Retiming Circuit)>

FIG. 24 is a diagram illustrating the relationship of phase errors of input and output of the RT circuit 30 in the high-frequency signal processing circuitry according to the first embodiment. The relationship of phase errors of input and output of the RT circuit 30 derived in FIG. 18A and FIG. 23 is summarized in FIG. 24. Here, the delay phase (shifted to the right in the timing chart) is assumed to be positive. Effect #1 and Effect #2 will be described with reference to FIG. 24 and a timing chart corresponding to FIG. 24.

<Effect #1: Preconditions for Error>

Figure 25A:
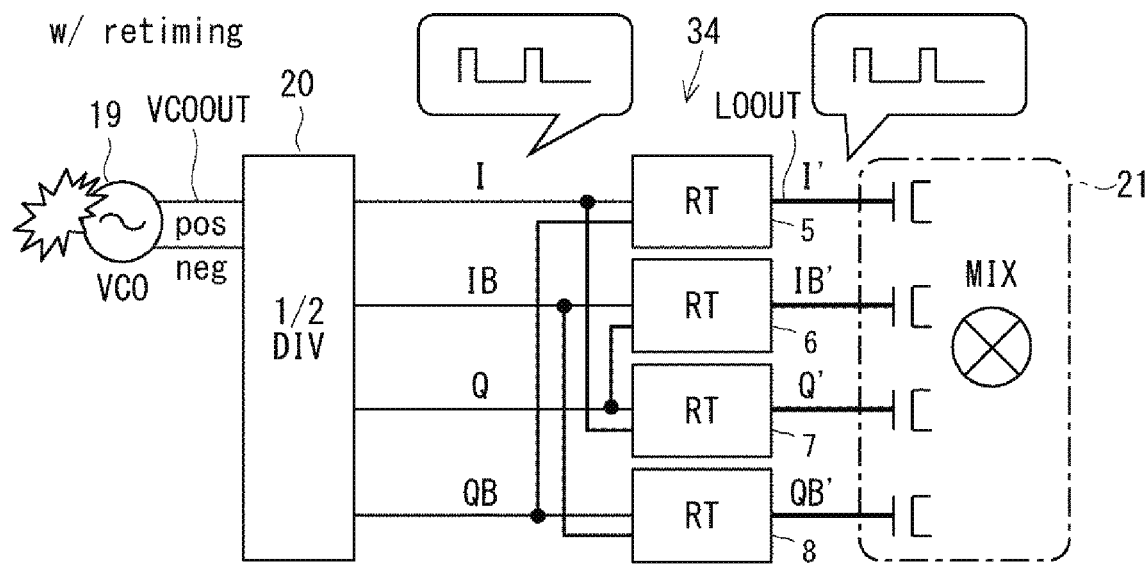
FIG. 25A and FIG. 25B are diagrams illustrating the cancelling effect to VCO differential phase error in the high-frequency signal processing circuitry according to the first embodiment.
Figure 25B:
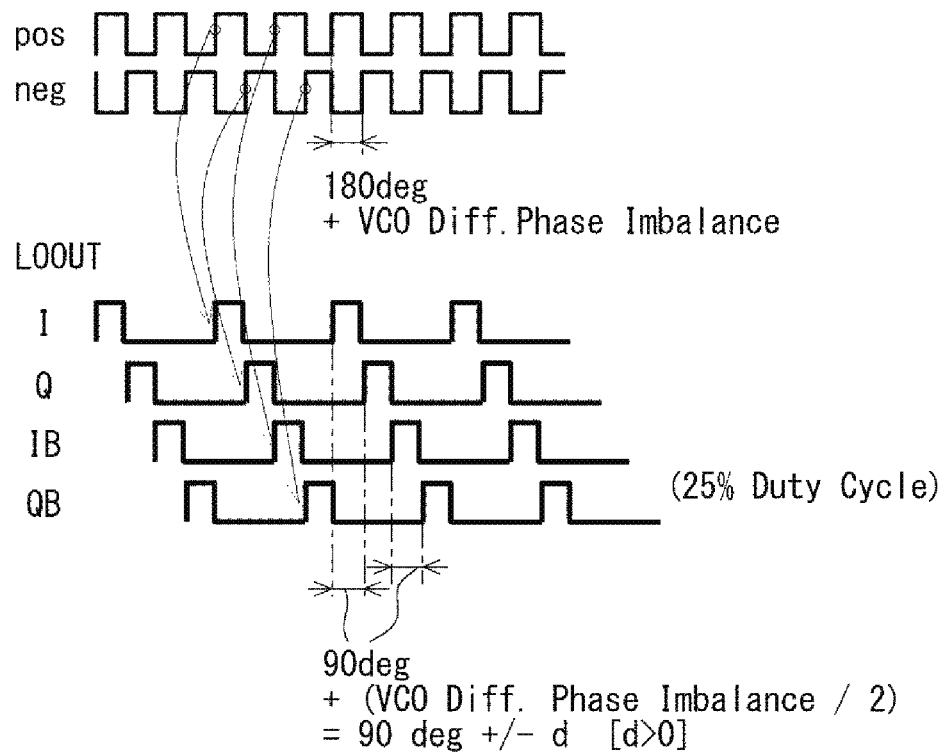

FIG. 25A and FIG. 25B are diagrams illustrating the cancelling effect with respect to VCO differential phase error in the high-frequency signal processing circuitry according to the first embodiment. As shown in FIG. 25A, it is assumed that there is no imbalance of the buffer BUF in this case. As described above, the four phases of the output LOOUT of the retiming circuit 34 are generated from the rise edge of the output VCOOUT.

As shown in FIG. 25B, the I signal and the IB signal of the output LOOUT are generated from the pos signal of the output VCOOUT. The Q signal and the QB signal of the output LOOUT are generated from the neg signal of the output VCOOUT. Therefore, ideally, no phase error is generated between the I signal and the IB signal or between the Q signal and the QB signal. What matters in this case is the component of the phase error d between the I signal and the Q signal or between the IB signal and the QB signal. This phase error d is determined by ½ times the amount of VCO differential phase error. The reason is that the delay time is the same and the signal cycle is doubled. In the following, it is shown that, with respect to the phase error d in the input of the RT circuit 30, the phase error between the I' signal and the Q' signal or between the IB' signal and the QB' signal becomes 0 in the output of the RT circuit 30. Note that this case corresponds to the conditions of a=c=d and b=0 in FIG. 17B.

<Effect #1: Calculation Result of Errors of Input and Output Error of RT Circuit when Error is Generated>

The errors of input and output of the RT circuit 30 in the case where there is a phase error d with respect to the 90-degree delay on the Q signal side based on the I signal as a reference are calculated by using the relational expressions in FIG. 24. FIG. 26 is a diagram illustrating calculation results in the case of the phase delayed by more than 90 degrees (d=1 degree) in the high-frequency signal processing circuitry according to the first embodiment. FIG. 27 is a diagram illustrating calculation results in the case of the phase leading by more than 90 degrees (d=−1 degree) in the high-frequency signal processing circuitry according to the first embodiment. As shown in FIG. 26 and FIG. 27, in both cases, the phase error+/−1 contained in the input signal of the RT circuit 30 becomes 0 in the output signal. Thus, it is shown that the phase error d is cancelled by the RT circuit 30.

<Effect #1: Timing Chart>

Figure 28:
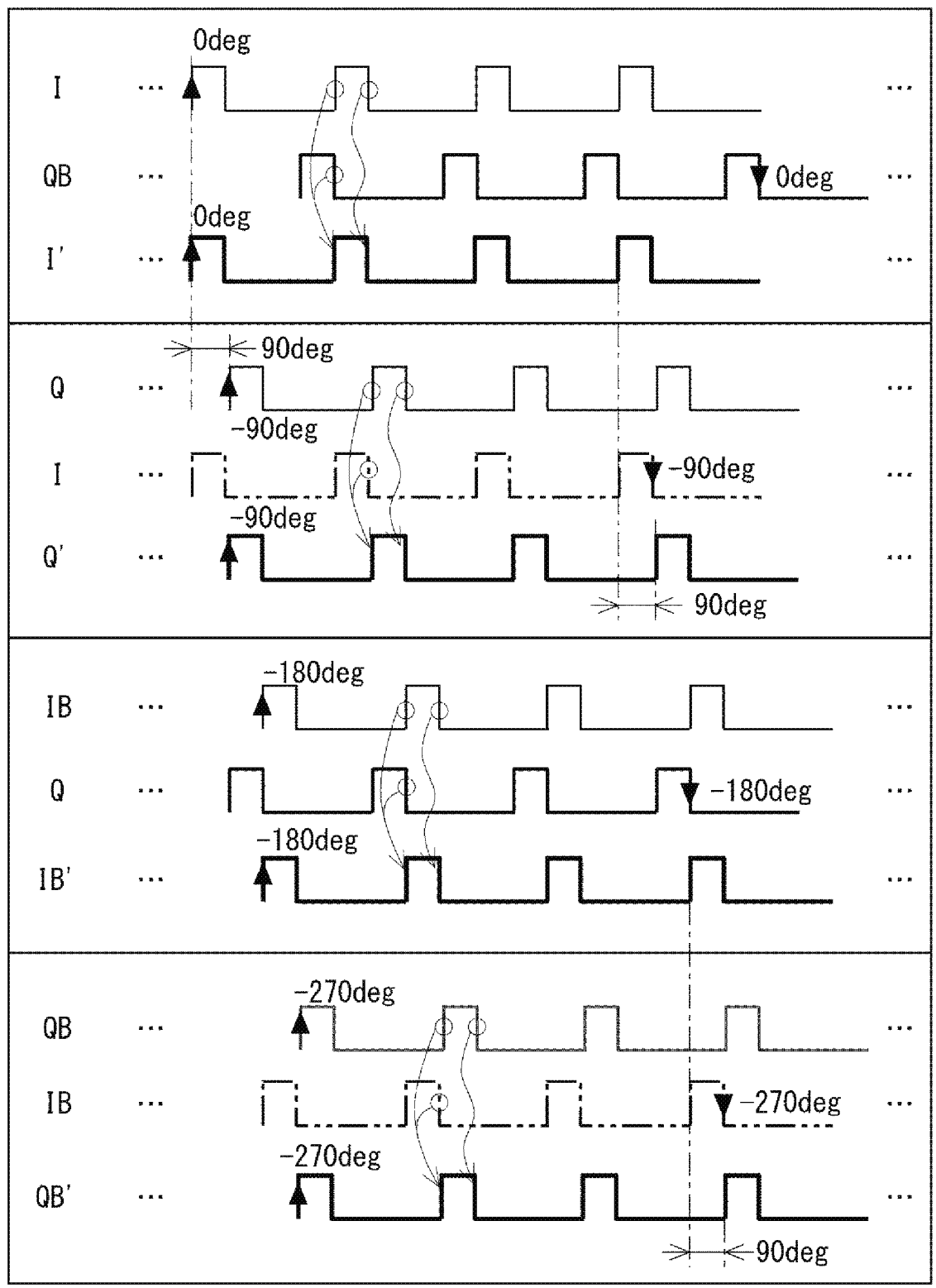
FIG. 28 is a timing chart illustrating input/output signals of the RT circuit in the high-frequency signal processing circuitry according to the first embodiment.
Figure 29:
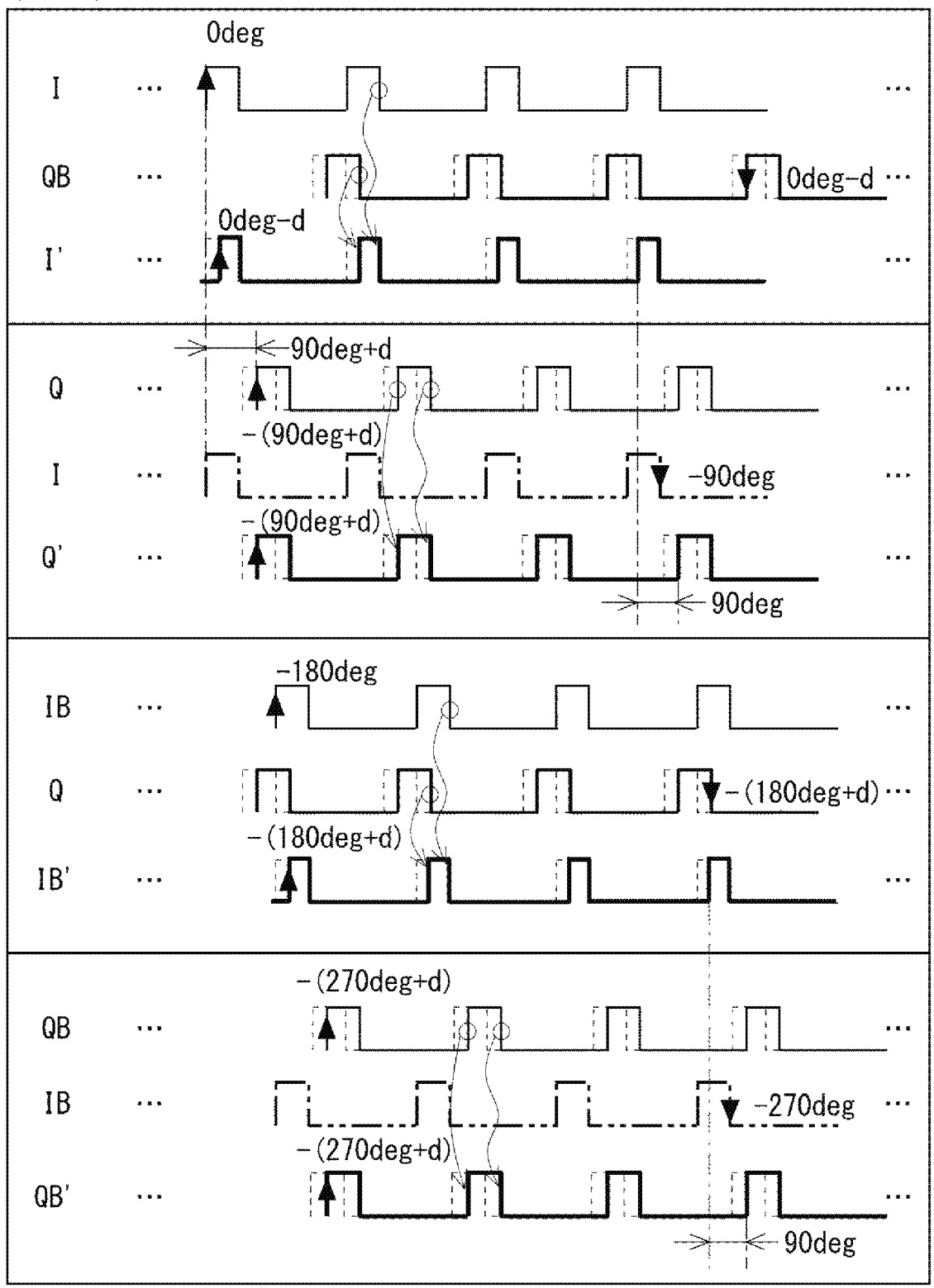
FIG. 29 is a timing chart illustrating input/output signals of the RT circuit in the high-frequency signal processing circuitry according to the first embodiment.
Figure 30:
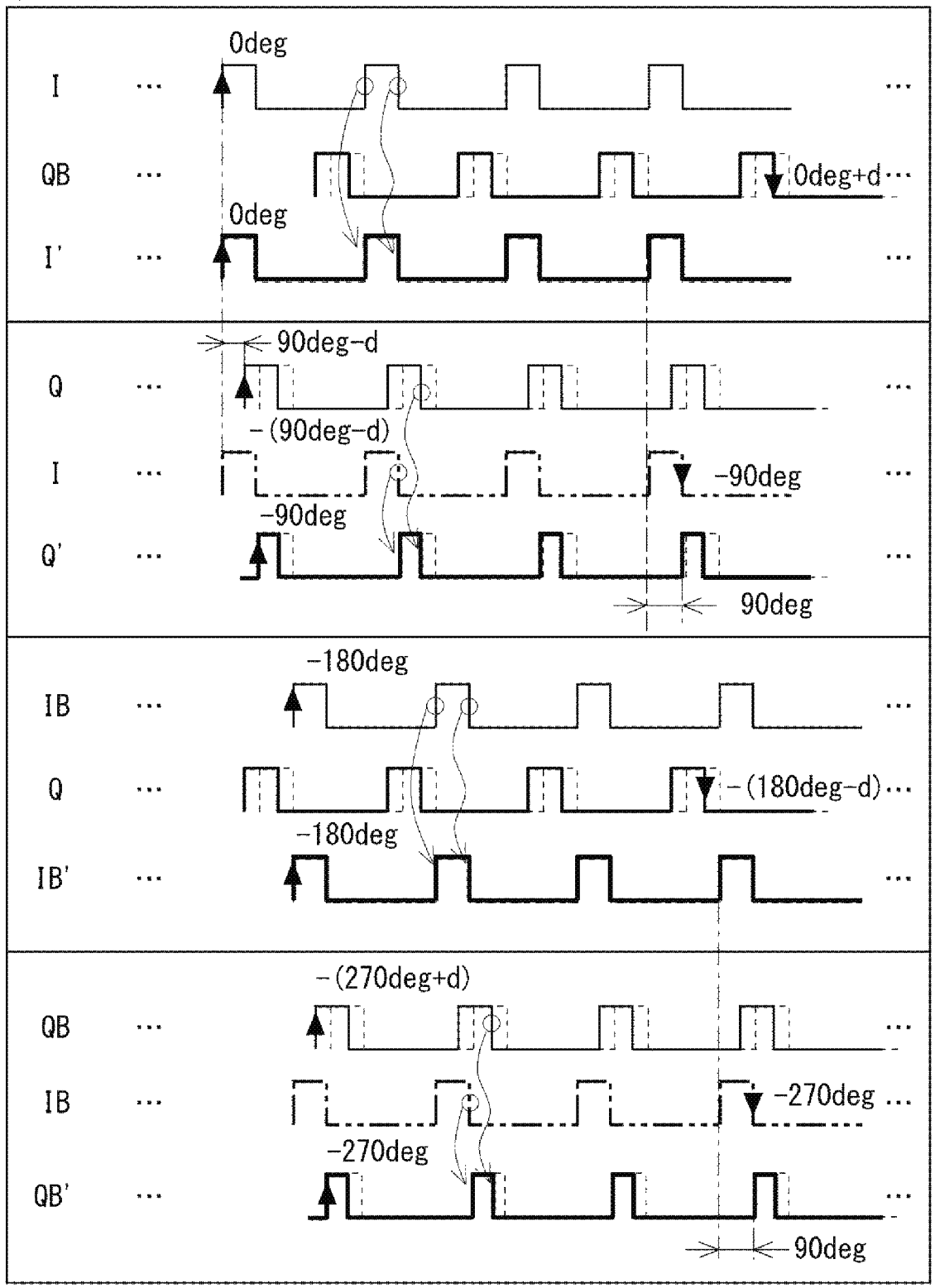
FIG. 30 is a timing chart illustrating input/output signals of the RT circuit in the high-frequency signal processing circuitry according to the first embodiment.

FIG. 28 to FIG. 30 are timing charts illustrating input/output signals of the RT circuit 30 in the high-frequency signal processing circuitry according to the first embodiment. FIG. 28 shows the case without phase error (case 1), FIG. 29 corresponds to FIG. 26 (case 2), and FIG. 30 corresponds to FIG. 27 (case 3). All indicate that the phase error d between the I signal and the Q signal and between the IB signal and the QB signal is cancelled between the I' signal and the Q' signal and between the IB' signal and the QB' signal.

<Supplement: Verification of Effect #1 by Simulation>

Figure 31:
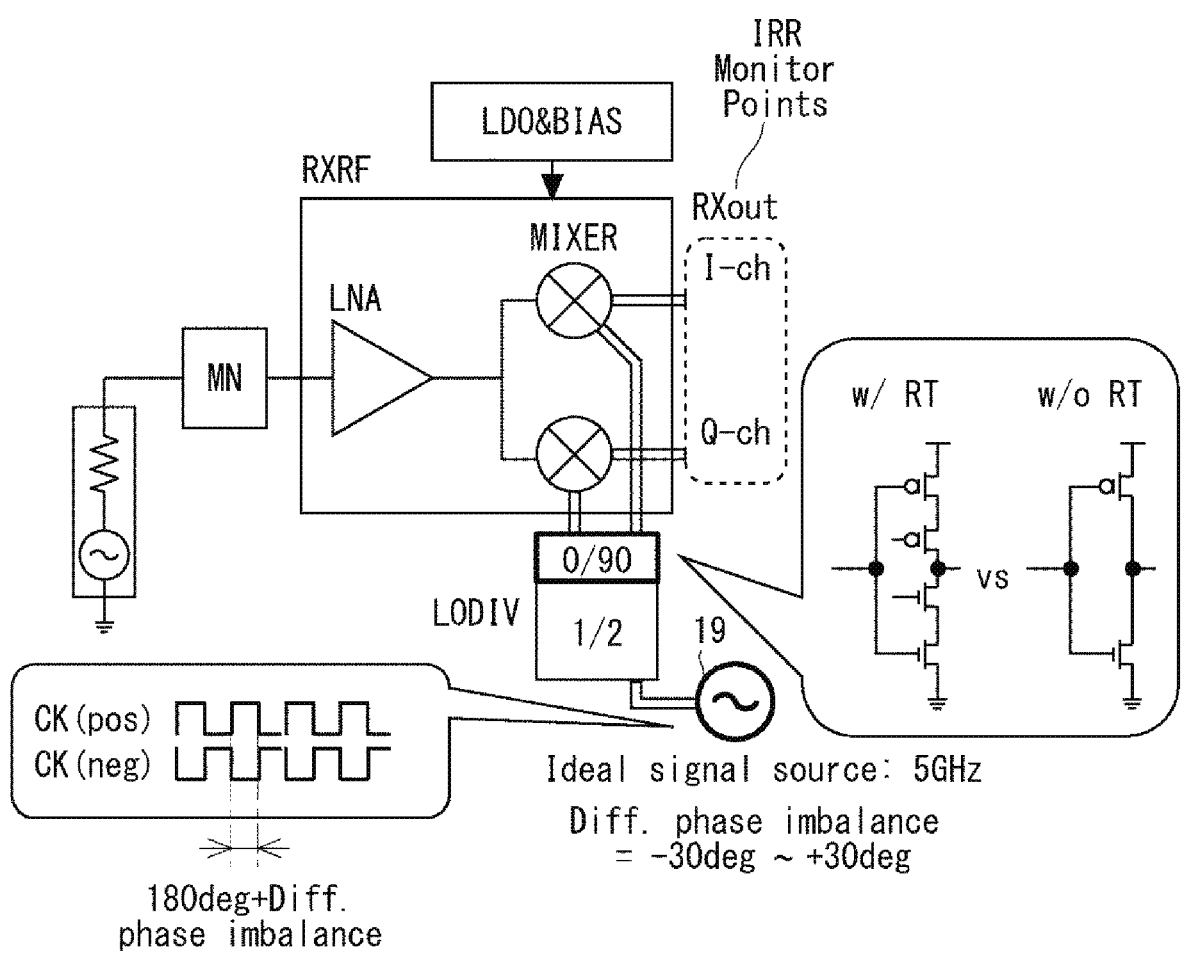
FIG. 31 is a block diagram illustrating a configuration used for simulation of the high-frequency signal processing circuitry according to the first embodiment.

Next, the IRR simulation results in the RX output in the cases with and without the retiming circuit 34 including the RT circuit 30 will be described. FIG. 31 is a block diagram illustrating a configuration used for simulation of the high-frequency signal processing circuitry according to the first embodiment. As shown in FIG. 31, the VCO 19 is assumed to be an ideal signal source that outputs at 5 GHz. The VCO differential phase error is −30 degrees to +30 degrees. The IRR monitor points are the RX outputs of the I and Q channels.

Figure 32:
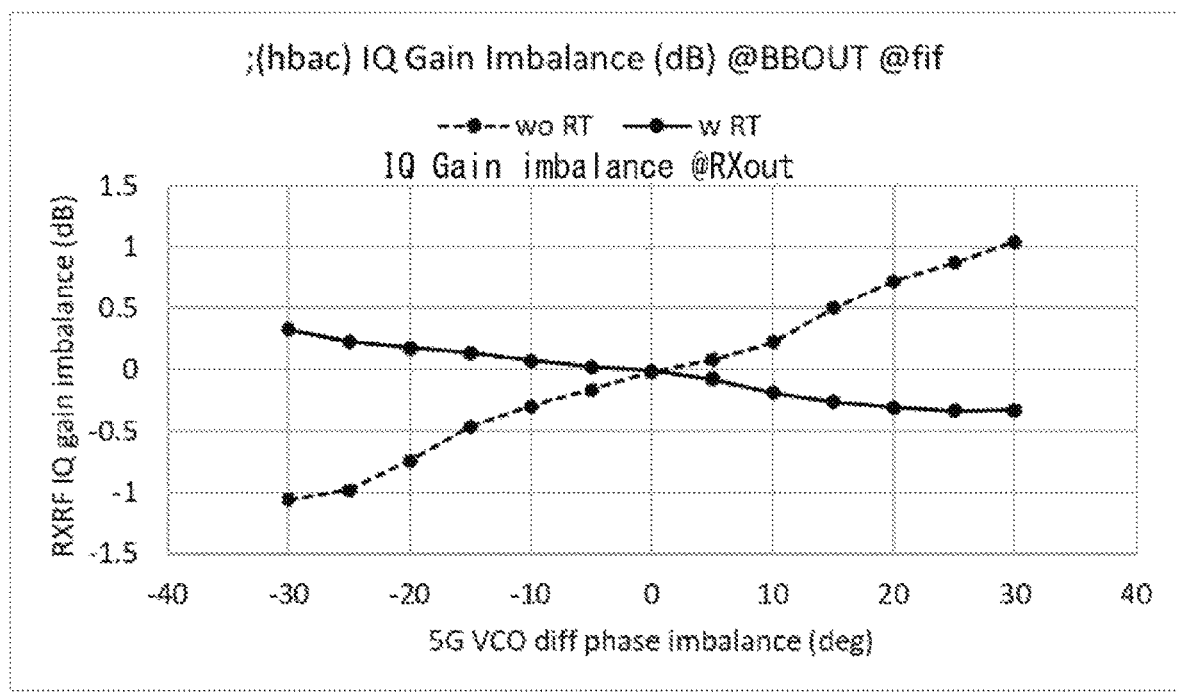
FIG. 32 is a diagram illustrating simulation results of the high-frequency signal processing circuitry according to the first embodiment.
Figure 33:
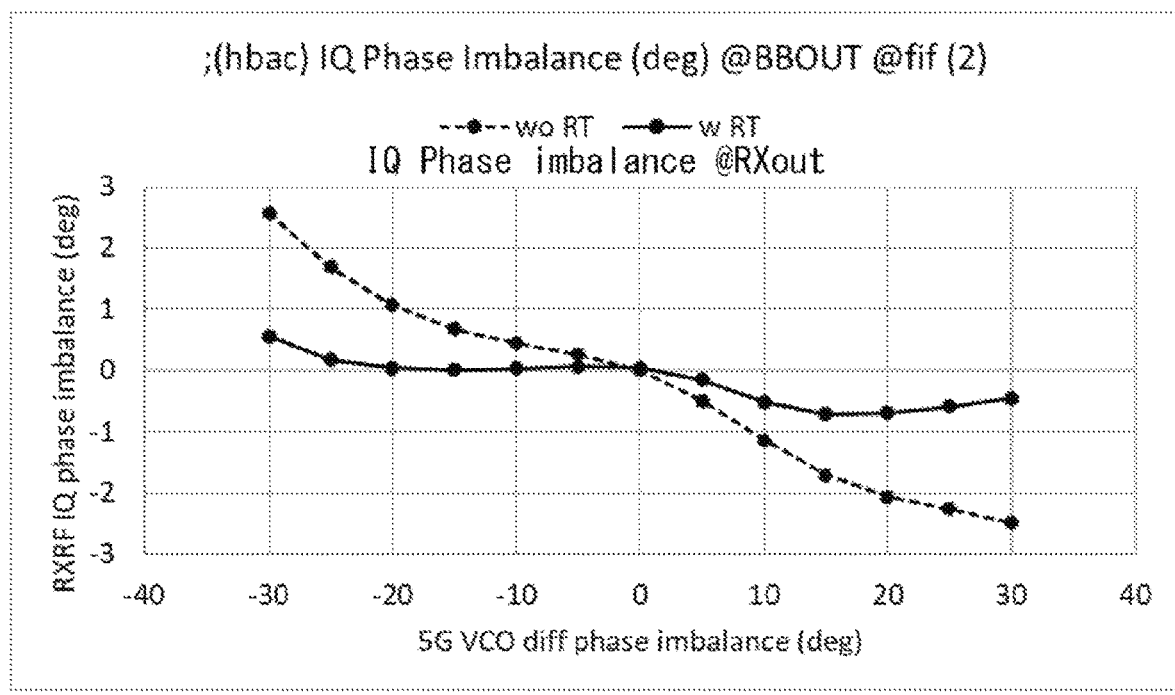
FIG. 33 is a diagram illustrating simulation results of the high-frequency signal processing circuitry according to the first embodiment.
Figure 34:
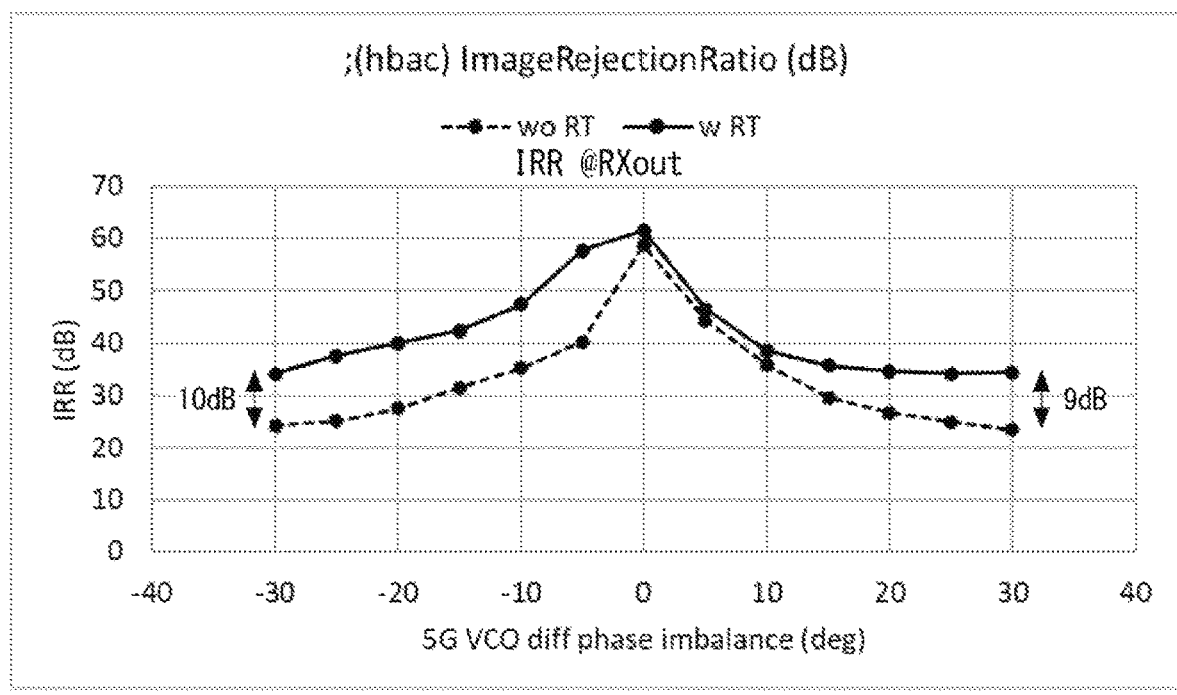
FIG. 34 is a diagram illustrating simulation results of the high-frequency signal processing circuitry according to the first embodiment.

FIG. 32 to FIG. 34 are diagrams illustrating simulation results of the high-frequency signal processing circuitry according to the first embodiment. As shown in FIG. 32, the phase error cancelled in principle is converted into an amplitude error. Also, as shown in FIG. 33, the phase error is improved to about ⅕ by the RT circuit 30. As shown in FIG. 34, even if a large IQ phase error is generated in the VCO 19, the retiming circuit 34 having the RT circuit 30 can increase the IRR by about 10 dB. In this way, even if the VCO differential phase error varies widely from −30 degrees to +30 degrees, the phase error is almost cancelled.

<Effect #2: Preconditions for Error>

Figure 35A:
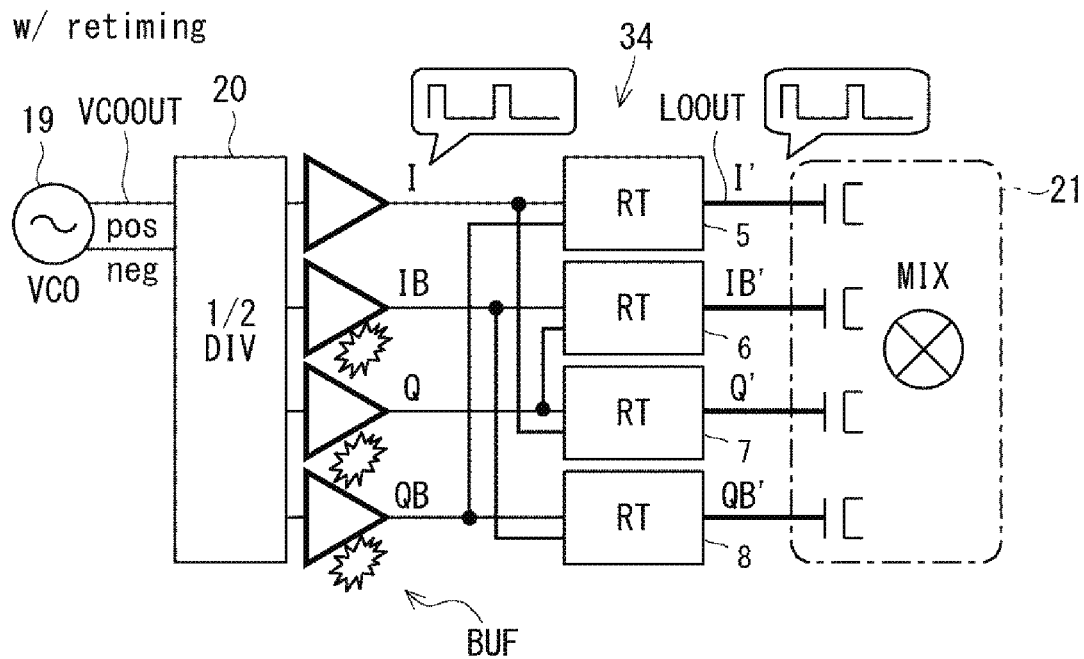
FIG. 35A and FIG. 35B are diagrams illustrating a configuration for describing the reduction of IQ imbalance error of IQ buffer in the high-frequency signal processing circuitry according to the first embodiment.
Figure 35B:
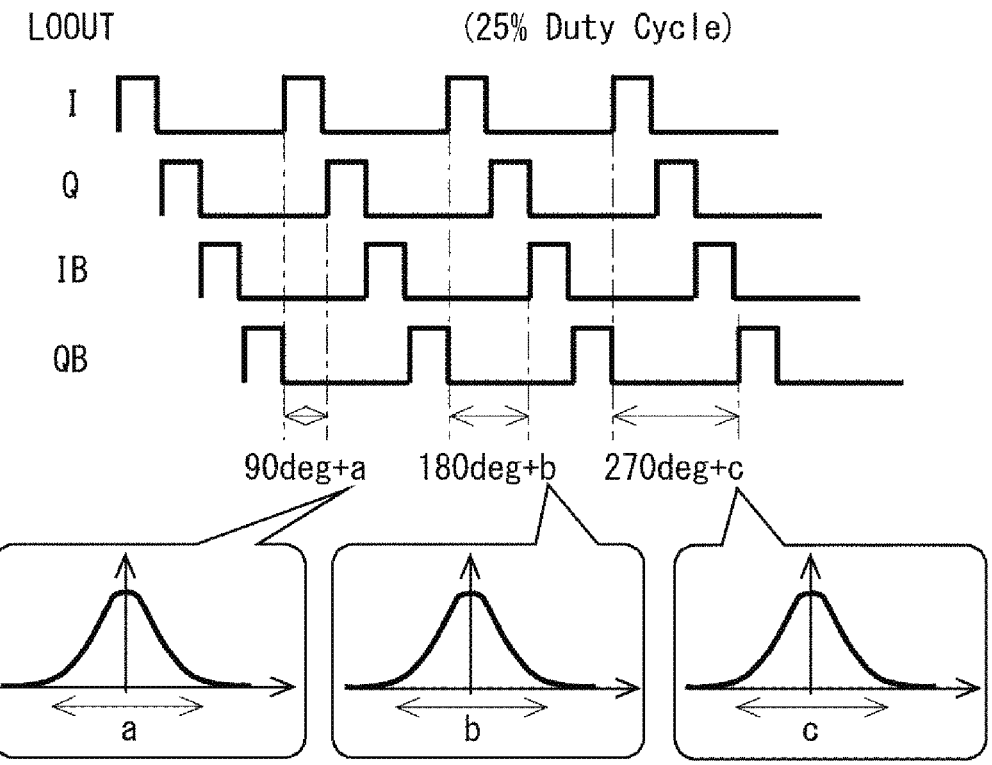

Next, the reduction of error due to the IQ imbalance of the IQ buffer will be described. FIG. 35A and FIG. 35B are diagrams illustrating a configuration for describing the reduction of IQ imbalance error of IQ buffer BUF in the high-frequency signal processing circuitry according to the first embodiment. As shown in FIG. 35A, four sets of buffers BUF are arranged before the retiming circuit 34 (after DIV 20).

It is assumed that the buffers BUF for the IB signal, the Q signal, and the QB signal give phase errors a, b, and c to the respective signals of the IB signal, the Q signal, and the QB signal with respect to the buffer BUF for the I signal as shown in FIG. 35B. In this case, the phase errors a, b, and c are assumed to be uncorrelated with each other and have normal distributions with similar standard deviation at a mean value of 0. Under this precondition, the effect of reducing the phase error in the output LOOUT of the retiming circuit 34 will be described below by using the expressions in FIG. 24. Note that it is assumed that there is no VCO differential imbalance in this case.

<Effect #2: Calculation Result of Input/Output Error of Retiming Circuit when Error is Generated>

First of all, a representative one will be shown from the many combinations. For example, the case where a phase error of 1 degree is generated in only the Q signal is considered. Namely, the phase error a is 1 (a=1) and the phase errors b and c are 0 (b=c=0). FIG. 36 is a diagram illustrating the relationship of phase errors of input and output of the RT circuit 30 in the high-frequency signal processing circuitry according to the first embodiment. As shown in FIG. 36, in this case, the IQ phase error of 0.5 degrees included at the input of the RT circuit 30 becomes 0 degrees at the output of the RT circuit 30.

FIG. 37 is a diagram illustrating calculation examples of combinations of phase errors in the high-frequency signal processing circuitry according to the first embodiment. As shown in FIG. 37, in the case where a phase error of +1 degree is generated in only one phase (Q) of the four phases, the conditions are a=1 and b=c=0. In this case, the mean IQ phase error on the input side is 0.5 and the mean IQ phase error on the output side is 0, indicating improvement. In the case where a phase error of −1 degree is generated in only one phase (Q) of the four phases, the conditions are a=−1 and b=c=0. In this case, the mean IQ phase error on the input side is −0.5 and the mean IQ phase error on the output side is 0, indicating improvement.

In the case where a phase error of +1 degree is generated in two adjacent phases (Q, QB) of the four phases, the conditions are a=c=1 and b=0. In this case, the mean IQ phase error on the input side is 1 and the mean IQ phase error on the output side is 0, indicating improvement. In the case where phase errors of +1 and −1 degrees are generated in two adjacent phases (Q, QB) of the four phases, the conditions are a=1, c=−1, and b=0. In this case, the mean IQ phase error on the input side is 0 and the mean IQ phase error on the output side is 0, indicating equivalence.

In the case where a phase error of +1 degree is generated in two nonadjacent phases (IB, QB) of the four phases, the conditions are b=c=1 and a=0. In this case, the mean IQ phase error on the input side is 0 and the mean IQ phase error on the output side is −0.5, indicating deterioration. However, it is half the amount of the maximum phase error on the input side. In the case where phase errors of +1 and −1 degrees are generated in two nonadjacent phases (IB, QB) of the four phases, the conditions are b=1, c=−1, and a=0. In this case, the mean IQ phase error on the input side is −1 and the mean IQ phase error on the output side is −0, indicating improvement.

Some calculation examples of suitable combinations of phase errors indicate deterioration. However, when looking at the maximum value of the error amount, it becomes 0.5 in the output for the phase error of 1 degree in the input. In other words, the amplitude becomes smaller. Furthermore, in order to consider random combinations, calculation results in Excel are shown below.

<Effect #2: Calculation Results of 1000 Sets in View of Normal Distribution Variation>

Figure 38A:
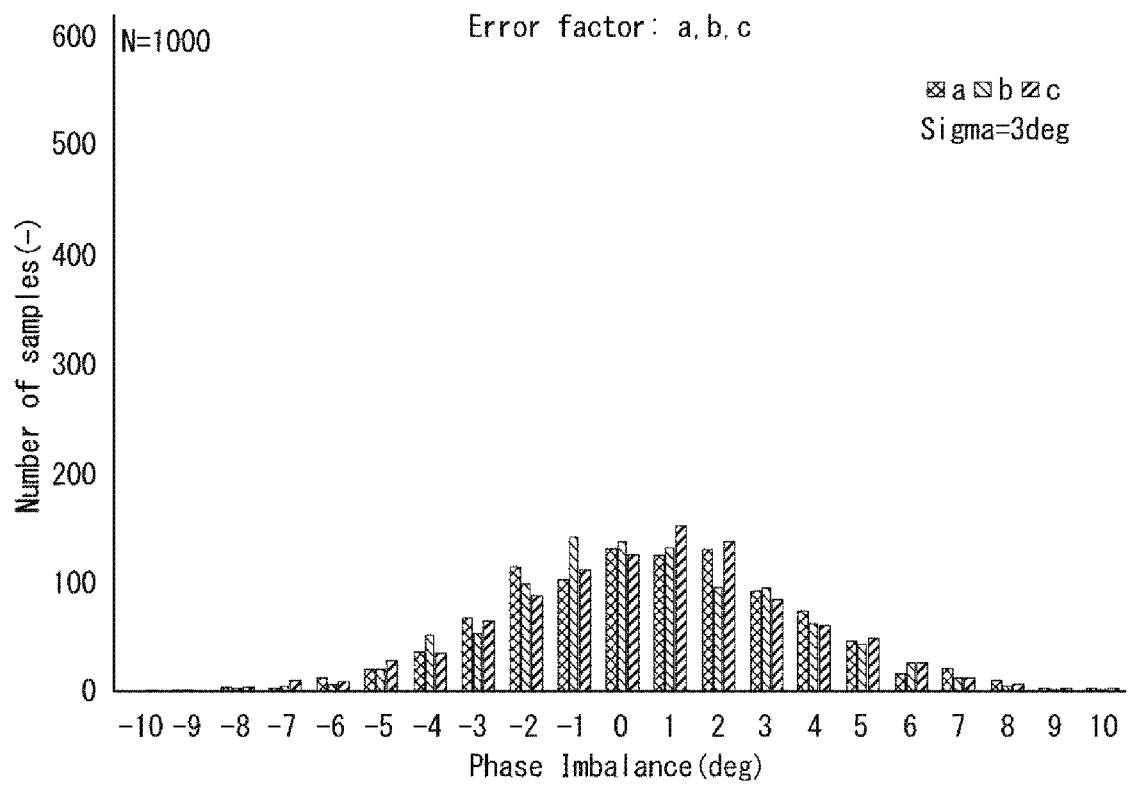
FIG. 38A and FIG. 38B are graphs illustrating calculation results of IQ phase errors of relay buffers in the high-frequency signal processing circuitry according to the first embodiment.
Figure 38B:
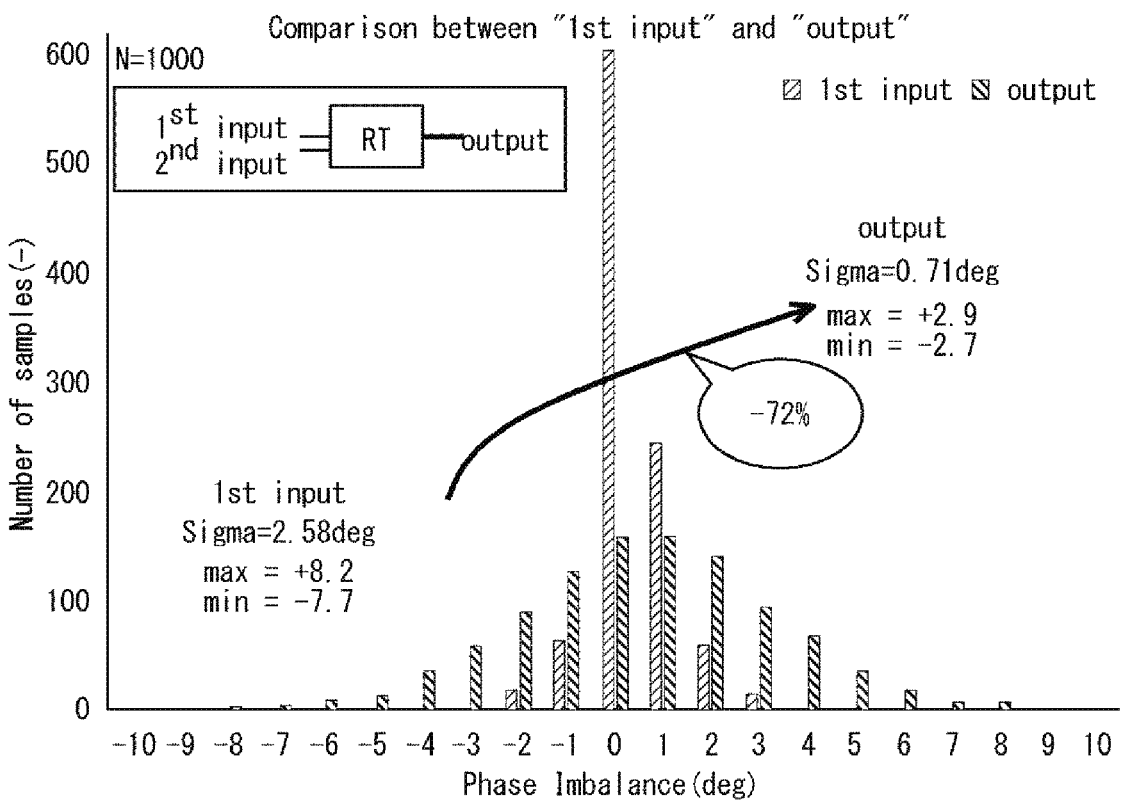

FIG. 38A and FIG. 38B are graphs illustrating calculation results of the IQ phase error of the relay buffer in the high-frequency signal processing circuitry according to the first embodiment. As shown in FIG. 38A and FIG. 38B, IQ phase errors are calculated for phase errors a, b, and c having a normal distribution with a standard deviation of 3 degrees. As a result, the standard deviation of the IQ phase error before the input to the RT circuit is about 2.58 degrees in 1000 combination calculations. In the output of the RT circuit 30, it is 0.71 degrees. In this calculation, the standard deviation value of the phase error decreases by 72% (in the output, the cancellation factor increases and the error is near 0 in many cases). Also, the maximum amplitude in the output of the RT circuit 30 is half the maximum amplitude in the input of the RT circuit 30 or less.

Figure 39:
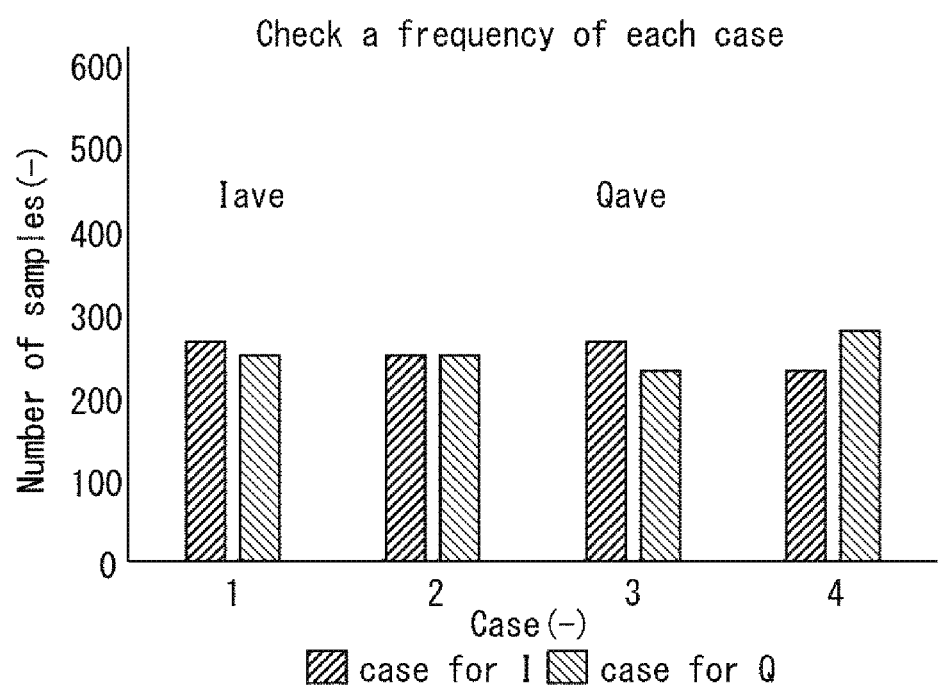
FIG. 39 is a graph illustrating selection frequency for each classified case in the high-frequency signal processing circuitry according to the first embodiment.

FIG. 39 is a graph illustrating selection frequency for each classified case in the high-frequency signal processing circuitry according to the first embodiment. As shown in FIG. 39, the selection frequency for each classified case is a number close to 250 in each of the four cases in the average phase errors Iave and Qave. Therefore, each four case is even.

<Supplement: Verification of Effect #2 by Simulation>

Figure 40:
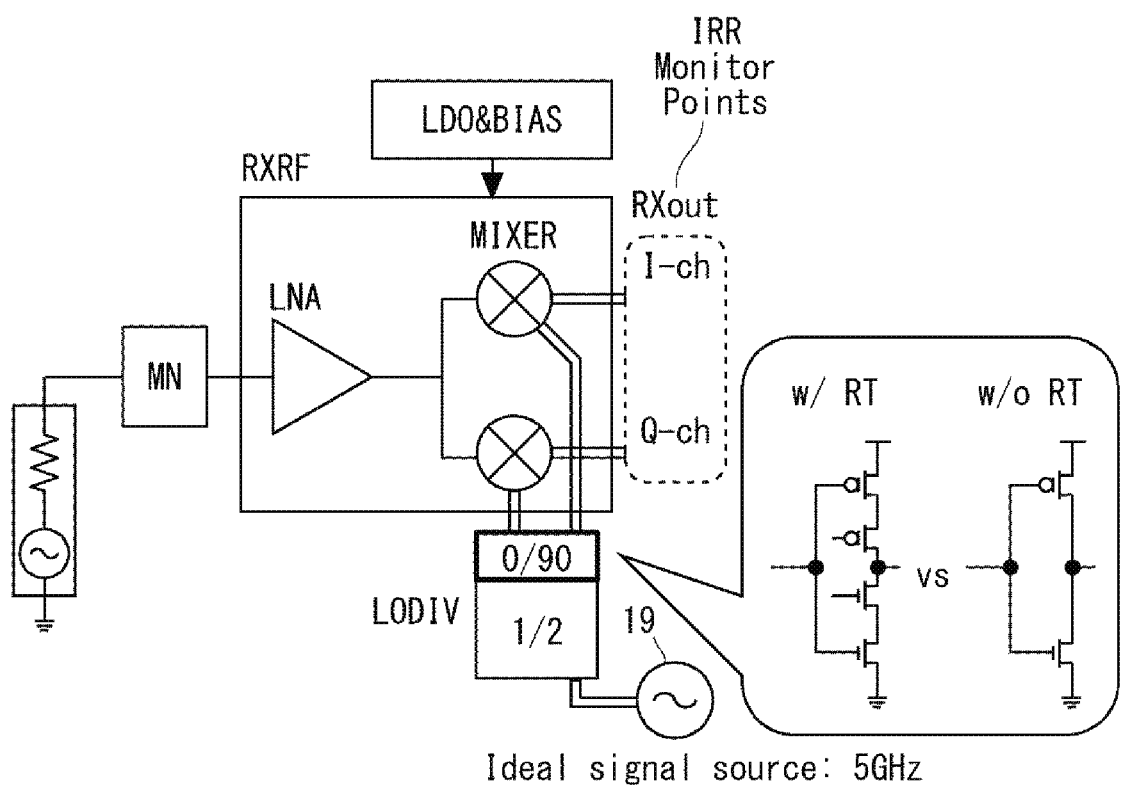
FIG. 40 is a block diagram illustrating a configuration used for simulation of the high-frequency signal processing circuitry according to the first embodiment.
Figure 41A:
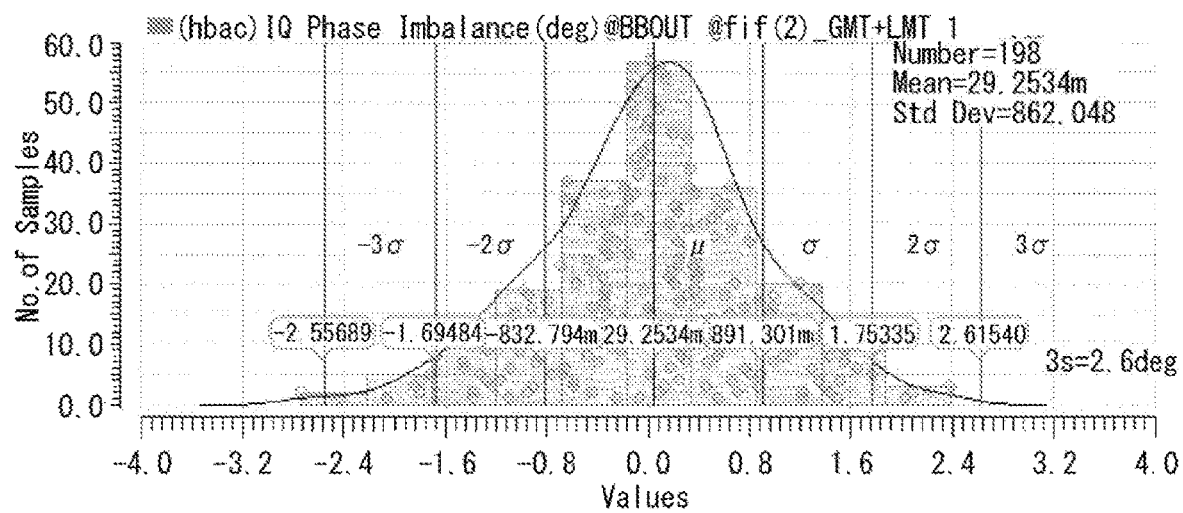
FIG. 41A and FIG. 41B are diagrams illustrating Monte Carlo simulation results of IQ phase errors in RX outputs in the cases with and without the RT circuit in the high-frequency signal processing circuitry according to the first embodiment.
Figure 41B:
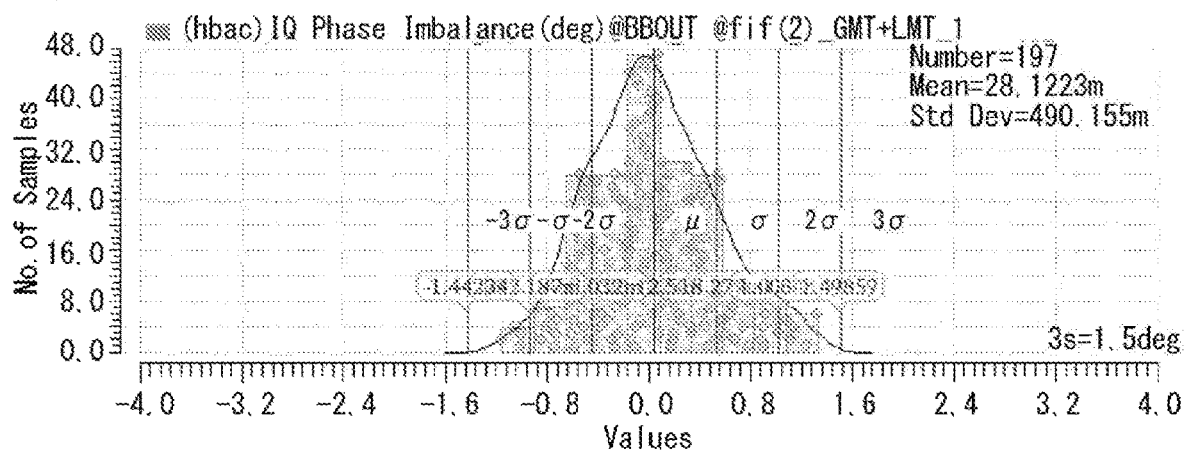

Next, Monte Carlo simulation results of the IQ phase error in the RX output in the cases with and without the retiming circuit 34 including the RT circuit 30 will be described. FIG. 40 is a block diagram illustrating a configuration used for simulation of the high-frequency signal processing circuitry according to the first embodiment. FIG. 41A and FIG. 41B are diagrams illustrating Monte Carlo simulation results of IQ phase errors in RX output in the cases with and without the RT circuit 30 in the high-frequency signal processing circuitry according to the first embodiment.

As shown in FIG. 40, the VCO 19 is assumed to be an ideal signal source that outputs at 5 GHz. The IRR monitor points are the RX outputs of the I and Q channels. As shown in FIG. 41A and FIG. 41B, the variation in phase error can be reduced by about 42% by providing the retiming circuit 34 including the RT circuit 30. Note that variation factors other than those assumed in the simulation calculation enter the actual retiming circuit 34. Therefore, it is conceivable that the effect of reducing the phase error in the actual retiming circuit 34 is lower than that of the simulation calculation.

With the retiming circuit 34 according to this embodiment, the output signal in which the phase error in the input signal is cancelled is output. Therefore, wireless communication quality can be improved. Further, the retiming circuit 34 can cancel any phase error occurring in any of the I signal, the IB signal, the Q signal, and the QB signal in the input signal. Therefore, extra configuration such as signal switching is unnecessary, and the size can be reduced.

The retiming circuit 34 can be composed of inverter circuits and MOS transistors. Therefore, the configuration and manufacturing process can be simplified, and the cost can be reduced.

Also, even if the input signal does not contain a phase error, it does not affect the input signal. Therefore, wireless communication quality can be maintained.

The first to thirteenth examples will be described below.

First Example

Figure 42:
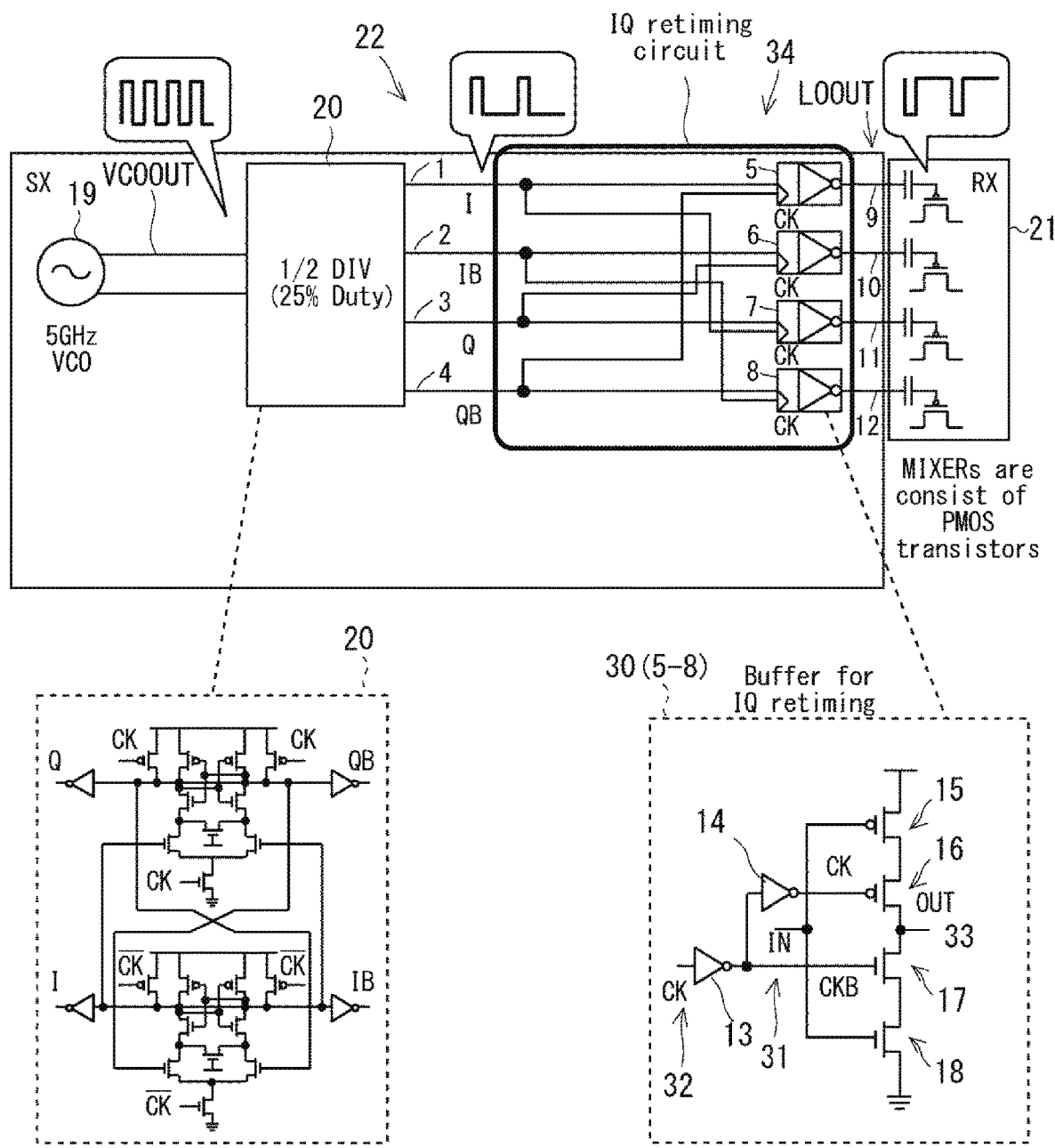
FIG. 42 is a block diagram illustrating a configuration of the first example in the high-frequency signal processing circuitry according to the first embodiment.

FIG. 42 is a block diagram illustrating a configuration of the first example in the high-frequency signal processing circuitry according to the first embodiment. As shown in FIG. 42, in the circuit of the LODIV 22 of the first example, the DIV 20 that has received the 5 GHz signal of the VCO 19 outputs 2.5 GHz signals having four phases with a 25% duty cycle (I signal, IB signal, Q signal, QB signal). These signals are input to the RT circuit 30 (retiming buffer) of the retiming circuit 34. At the same time, the four-phase signals described above are input to the clock terminal CK of the RT circuit 30. In this way, the waveforms of the I signal and the Q signal are synthesized. The retiming circuit 34 supplies the waveform synthesis output with a 75% duty cycle to the gate of the PMOS of the receiving mixer 21 as the LO signal. FIG. 42 shows a transistor-level circuit example of the DIV 20 and the mixer 21. The DIV 20 is described in, for example, Non-Patent Document 1.

In this example, the frequency of each input signal has an approximately 25% duty ratio. The output signal output from the terminal 33 of each RT circuit 30 (RT circuits 5 to 8) transitions from the second state to the first state in conjunction with the rise edge of the input signal input to the terminal 31 of each RT circuit 30 or the fall edge of the input signal input to the terminal 32. Then, it transitions from the first state to the second state in conjunction with the fall edge of the input signal input to the terminal 31 of each RT circuit 30.

Also, in this example, the terminal 31 of the RT circuit 30 is connected to the gate of the PMOS transistor 15 and the gate of the NMOS transistor 18. The terminal 32 is connected to the inverter circuit 13. The inverter circuit 13 is connected to the inverter circuit 14 and the gate of the NMOS transistor 17. The inverter circuit 14 is connected to the gate of the PMOS transistor 16. The drain of the PMOS transistor 15 is connected to the source of the PMOS transistor 16. The drain of the NMOS transistor 18 is connected to the source of the NMOS transistor 17. The drain of the PMOS transistor 16 and the drain of the NMOS transistor 17 are connected to the terminal 33. Also, the mixer 21 includes PMOS transistors.

Second Example

Figure 43:
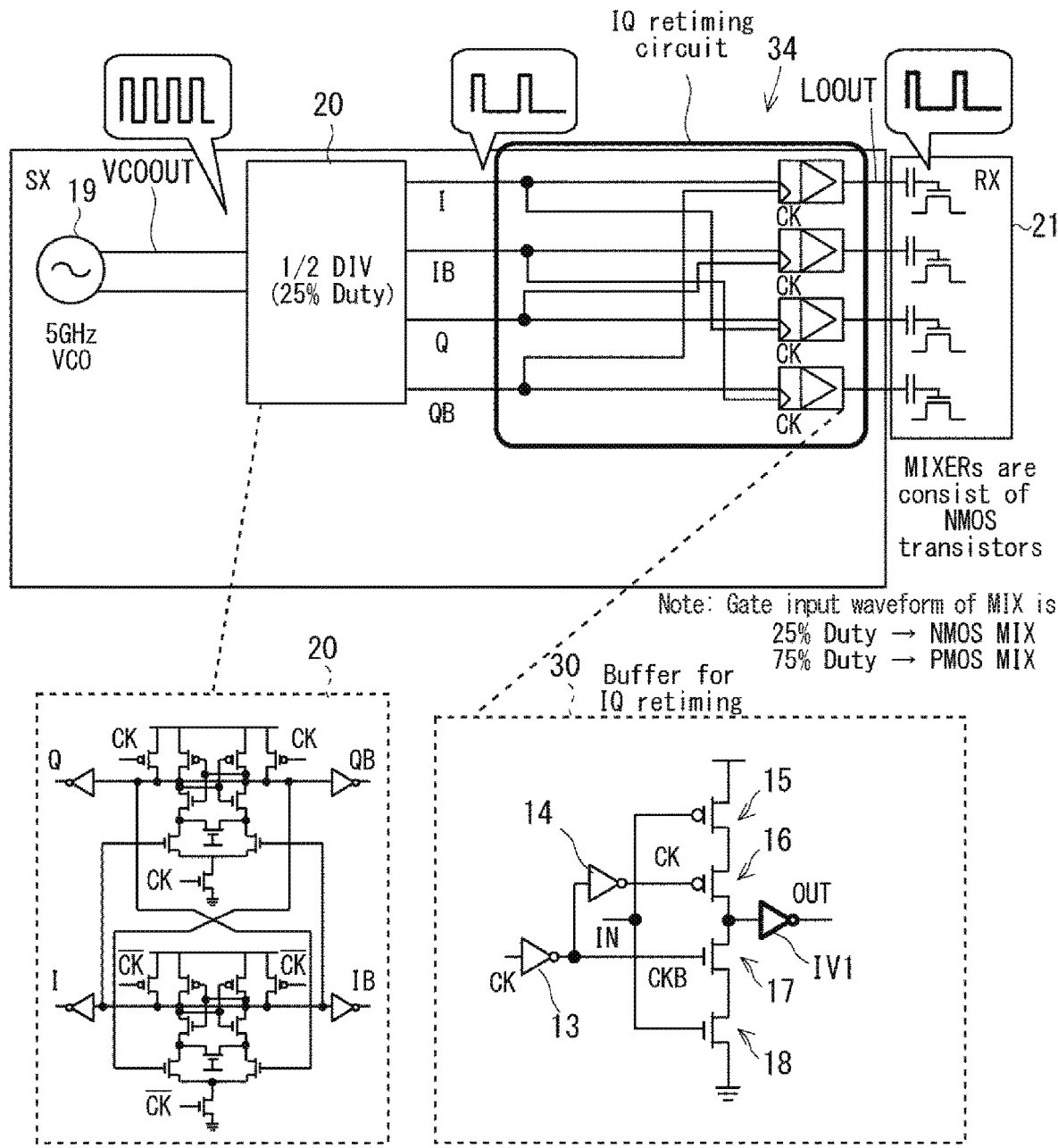
FIG. 43 is a block diagram illustrating a configuration of the second example in the high-frequency signal processing circuitry according to the first embodiment.

Next, as the second example, an example in which the circuit configuration of the mixer 21 of the first example is changed will be described. FIG. 43 is a block diagram illustrating the configuration of the second example in the high-frequency signal processing circuitry according to the first embodiment. As shown in FIG. 43, when changing the transistor of the LO signal input portion of the mixer 21 from the PMOS transistor to the NMOS transistor with respect to the configuration of FIG. 42, inverter circuits IV1 for logical inversion on odd-number stages (one stage in the drawing) are required between the RT circuit 30 and the mixer 21. In this way, a 25% duty cycle signal is supplied to the input of the mixer 21.

As described above, in this example, the RT circuit 30 further includes the inverter circuit IV1. Therefore, the drain of the PMOS transistor 16 and the drain of the NMOS transistor 17 are connected to the terminal 33 via the inverter circuit IV1.

Further, in this example, the output signal output from the terminal 33 of each RT circuit 30 transitions from the first state to the second state in conjunction with the rise edge of the input signal input to the terminal 31 of each RT circuit 30 or the fall edge of the input signal input to the terminal 32. Then, it transitions from the second state to the first state in conjunction with the fall edge of the input signal input to the terminal 31 of each RT circuit 30.

Third Example

Figure 44:
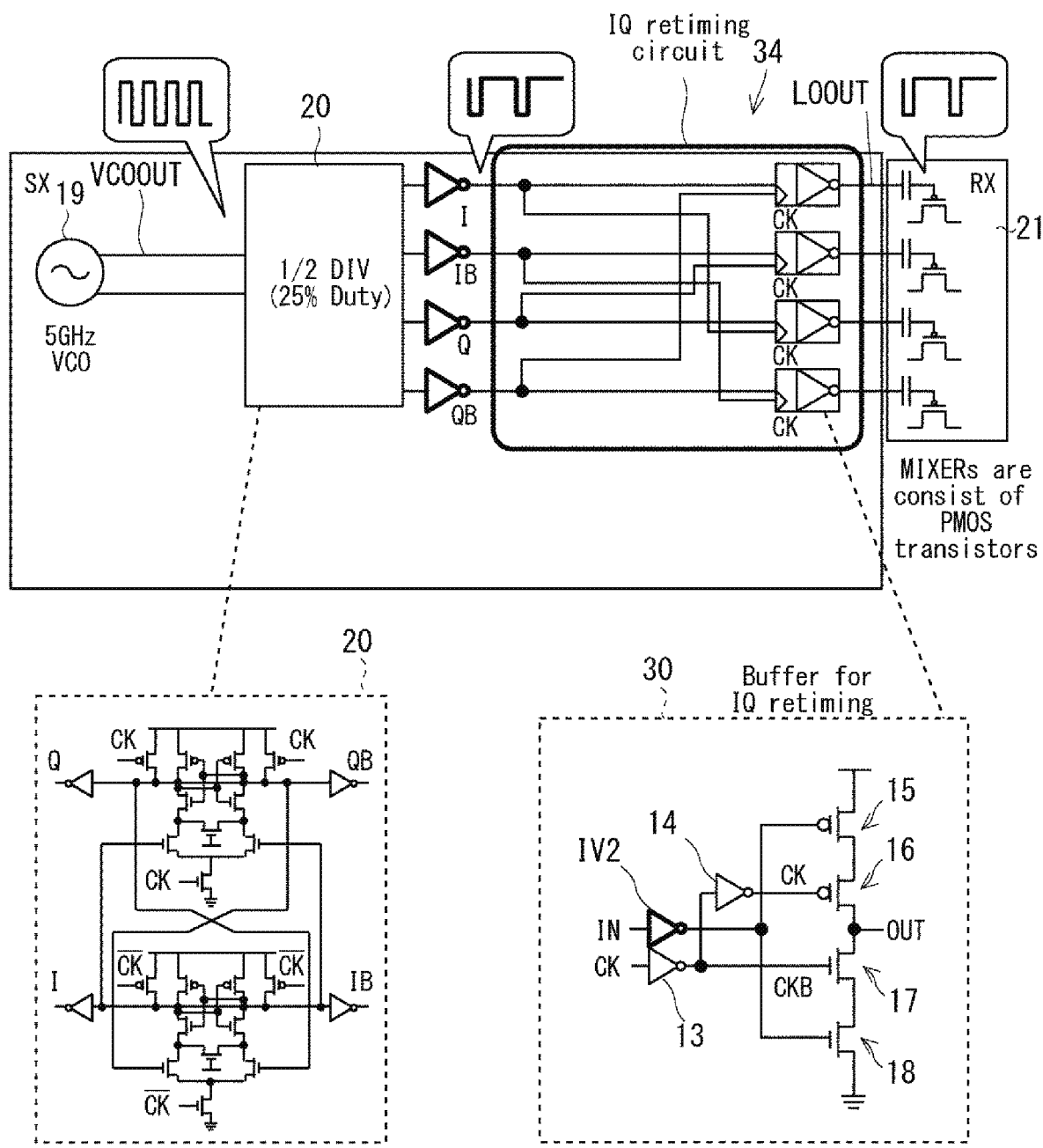
FIG. 44 is a block diagram illustrating a configuration of the third example in the high-frequency signal processing circuitry according to the first embodiment.

Next, as the third example, an example in which the duty cycle of the input signal of the retiming circuit 34 of the first example is 75% will be described. FIG. 44 is a block diagram illustrating the configuration of the third example in the high-frequency signal processing circuitry according to the first embodiment. The example in which the duty cycle of the input signal of the retiming circuit 34 is 75% is composed of the DIV 20 with a 25% duty cycle and inverters on odd-number stages. In this case, it is necessary to add inverters for logic inversion on odd-number stages to the input of the RT circuit 30 with respect to the configuration of FIG. 42.

Specifically, the RT circuit 30 further includes an inverter circuit IV2. The terminal 31 is connected to the gate of the PMOS transistor 15 and the gate of the NMOS transistor 18 via the inverter circuit IV2.

Further, in this example, the output signal output from the terminal 33 of each RT circuit 30 transitions from the second state to the first state in conjunction with the fall edge of the input signal input to the terminal 31 of each RT circuit 30 or the rise edge of the input signal input to the terminal 32. Then, it transitions from the first state to the second state in conjunction with the rise edge of the input signal input to the terminal 31 of each RT circuit 30.

Fourth Example

Figure 45:
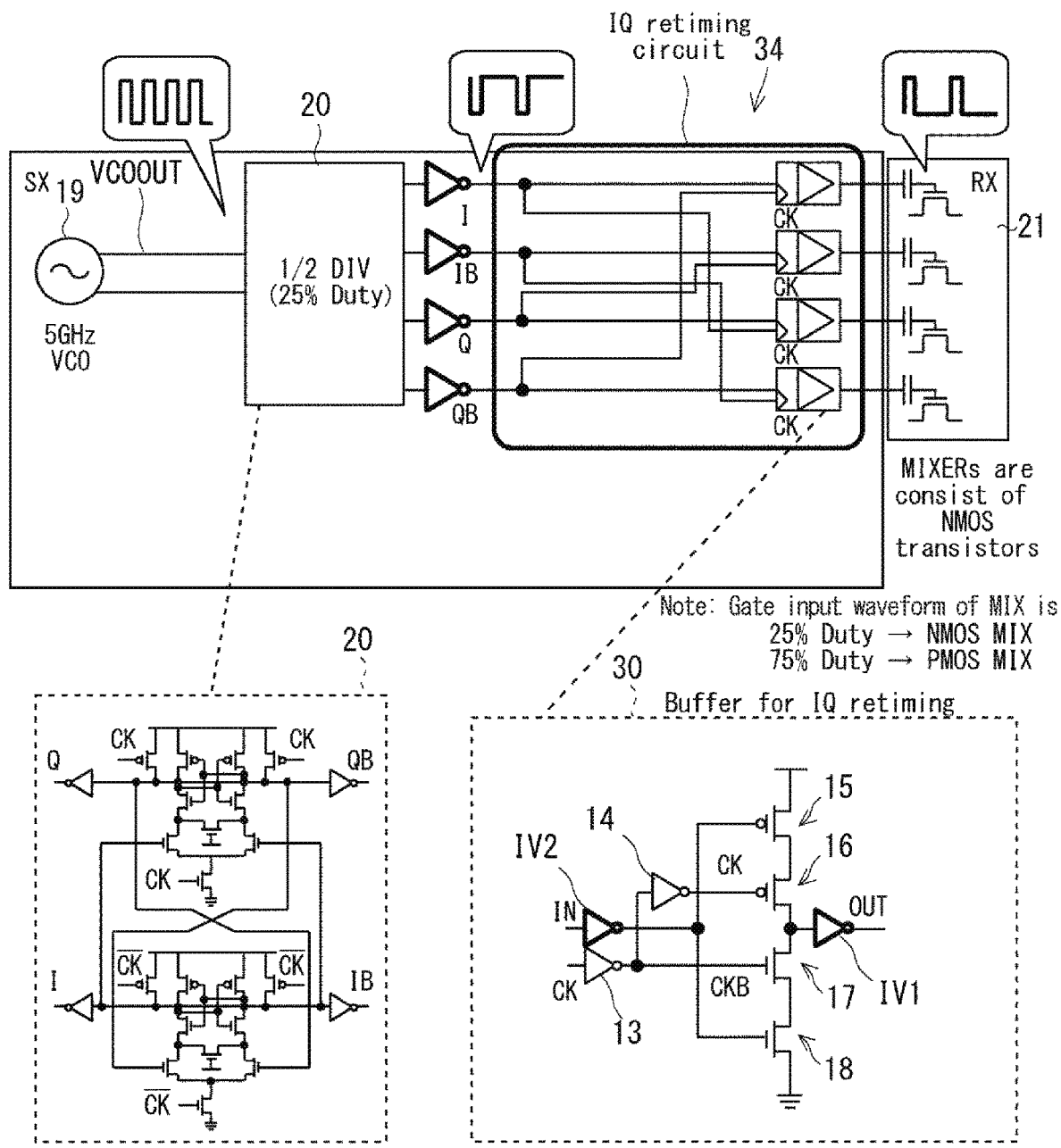
FIG. 45 is a block diagram illustrating a configuration of the fourth example in the high-frequency signal processing circuitry according to the first embodiment.

Next, as the fourth example, an example in which the duty cycle of the input signal of the retiming circuit 34 of the first example is 75% and the mixer 21 has an NMOS configuration will be described. FIG. 45 is a block diagram illustrating the configuration of the fourth example in the high-frequency signal processing circuitry according to the first embodiment. In this case, it is necessary to add inverters for logic inversion on odd-number stages to the input of the RT circuit 30 with respect to FIG. 43.

Specifically, the RT circuit 30 further includes the inverter circuit IV1 and the inverter circuit IV2. The terminal 31 is connected to the gate of the PMOS transistor 15 and the gate of the NMOS transistor 18 via the inverter circuit IV2. Also, the drain of the PMOS transistor 16 and the drain of the NMOS transistor 17 are connected to the terminal 33 via the inverter circuit IV1.

In this example, the output signal output from the terminal 33 of each RT circuit 30 transitions from the first state to the second state in conjunction with the fall edge of the input signal input to the terminal 31 of each RT circuit 30 or the rise edge of the input signal input to the terminal 32. Then, it transitions from the second state to the first state in conjunction with the rise edge of the input signal input to the terminal 31 of each RT circuit 30.

Fifth to Seventh Examples

Figure 46A:
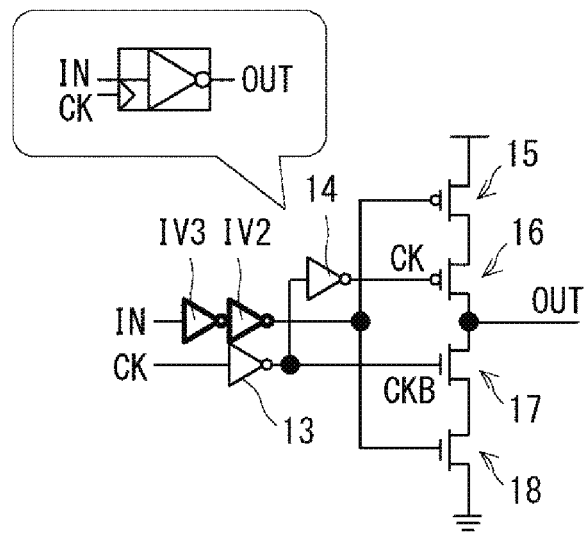
FIG. 46A to FIG. 46C are block diagrams illustrating configurations of the fifth to seventh examples in the high-frequency signal processing circuitry according to the first embodiment.
Figure 46B:
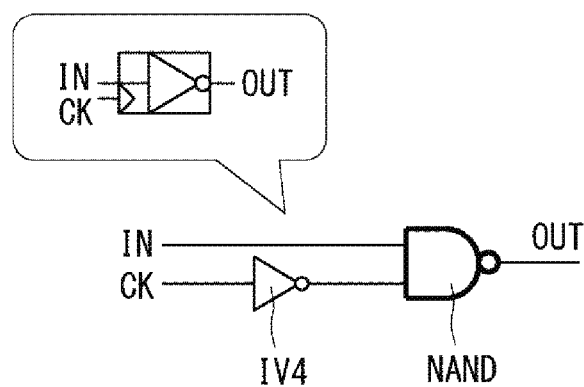
Figure 46C:
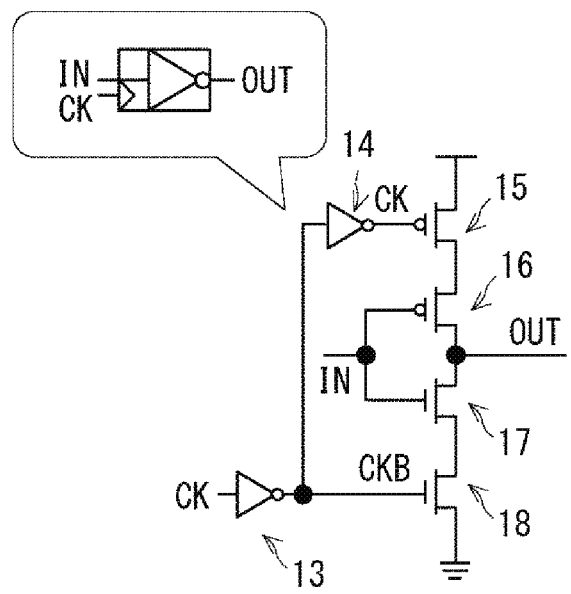

Next, as the fifth to seventh examples, the configuration examples of the RT circuit 30 will be described. FIG. 46A to FIG. 46C are block diagrams illustrating configurations of the fifth to seventh examples in the high-frequency signal processing circuitry according to the first embodiment. In the fifth example, as shown in FIG. 46A, an example in which inverters on even-number stages are inserted on the IN terminal side of the RT circuit 30 to adjust the timing up to the transistor input on the CK terminal side will be described. Specifically, the RT circuit 30 further includes the inverter circuit IV2 and an inverter circuit IV3. The terminal 31 is connected to the gate of the PMOS transistor 15 and the gate of the NMOS transistor 18 via the inverter circuit IV2 and the inverter circuit IV3.

In the sixth example, as shown in FIG. 46B, an example in which the core part of the RT circuit 30 is composed of a NAND logic circuit will be described. The RT circuit 30 has an inverter circuit IV4 and a NAND circuit. The terminal 31 is connected to one input terminal of the NAND circuit, and the terminal 32 is connected to the other input terminal of the NAND circuit via the inverter circuit IV4. The terminal 33 is connected to the output terminal of the NAND circuit. The function of the RT circuit 30 of the sixth example is equivalent to that of the first example. However, there is possibility that phase error variation characteristics may be inferior in the SIM verification.

In the seventh example, as shown in FIG. 46C, the MOS transistors connected to the terminal 31 (IN terminal) and the terminal 32 (CK terminal) of the RT circuit 30 are interchanged, and this configuration is similar to that of FIG. 7C.

Eighth Example

Figure 47:
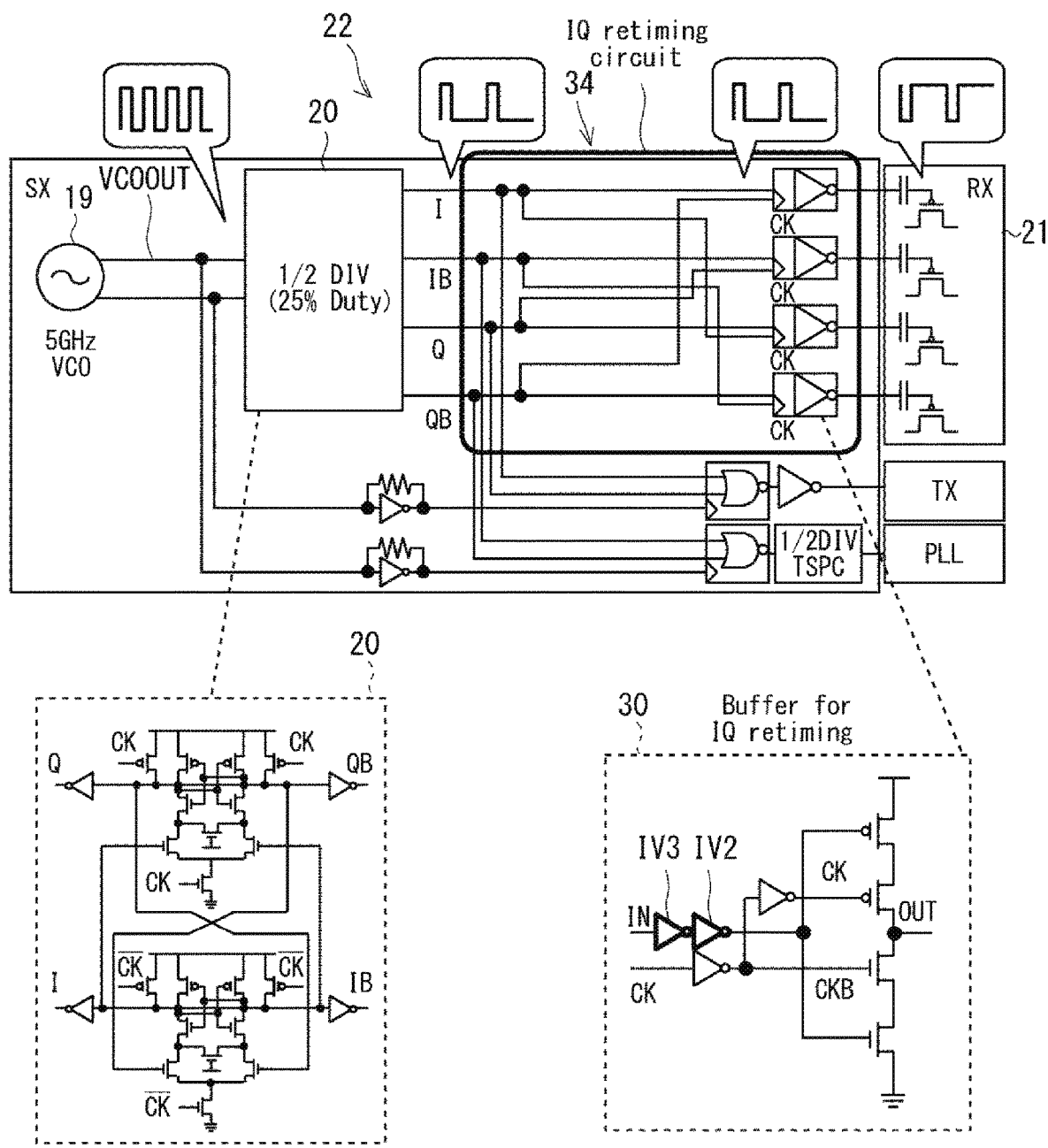
FIG. 47 is a block diagram illustrating a configuration of the eighth example in the high-frequency signal processing circuitry according to the first embodiment.

Next, as the eighth example, the detailed circuit configuration of the LODIV 22 will be described. FIG. 47 is a block diagram illustrating a configuration of the eighth example in the high-frequency signal processing circuitry according to the first embodiment. As shown in FIG. 47, in the configuration of the first example, the inverter circuits IV2 and IV3 on two stages are inserted on the IN terminal side in the RT circuit 30 for the purpose of relay buffer and timing adjustment. In this example, the function of supplying the signal to the transmitter TX and the PLL in addition to the signal supply path to the receiver circuit is also provided. Further, the LODIV 22, the retiming circuit 34, and the RX-mixer 21 are arranged close to each other in terms of layout as shown in FIG. 8C.

Ninth to Twelfth Examples

Next, as the ninth to twelfth examples, configuration examples in which an IQ phase adjustment function is added to the RT circuit 30 will be described. FIG. 48A to FIG. 48D are block diagrams illustrating configurations of the ninth to twelfth examples in the high-frequency signal processing circuitry according to the first embodiment. The configuration for finely adjusting the IQ phases shown in FIG. 48A to FIG. 48D is not indispensable. However, in a wireless communication system in which highly accurate orthogonality is required, a configuration for finely adjusting the IQ phase may be required. For example, in a Zero-IF receiver that handles 64 QAM modulation, a configuration for finely adjusting the IQ phase may be required. However, since the required variable range is narrow, it is possible to configure the phase adjustment function with a low current and a small area.

Figure 48A:
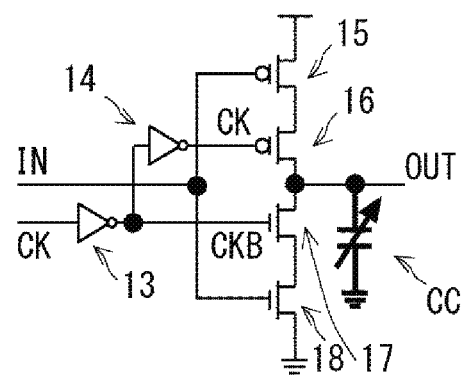
FIG. 48A to FIG. 48D are block diagrams illustrating configurations of the ninth to twelfth examples in the high-frequency signal processing circuitry according to the first embodiment.

FIG. 48A is an example in which a variable capacitor CC capable of independently adjusting the I signal and the Q signal is added to the output of the RT circuit 30. Specifically, the RT circuit 30 further includes the variable capacitor CC. The drain of the PMOS transistor 16 and the drain of the NMOS transistor 17 are connected to the terminal 33 via the variable capacitor CC. In this way, the phase of the I signal and the phase of the Q signal can be adjusted.

Figure 48B:
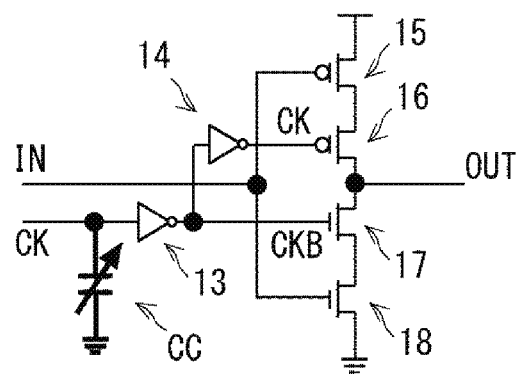

FIG. 48B is an example in which a variable capacitor CC capable of independently adjusting the I signal and the Q signal is added to the clock CK input terminal such that the phase of the I signal and the phase of the Q signal can be adjusted. Specifically, the terminal 32 is connected to the inverter circuit 13 via the variable capacitor CC.

Figure 48C:
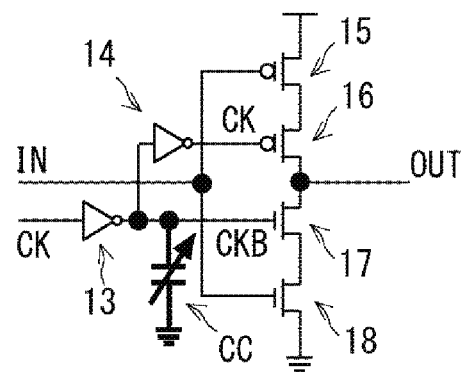

FIG. 48C is a modification of FIG. 48B. FIG. 48C is an example in which a variable capacitor CC capable of independently adjusting the I signal and the Q signal is added after the inverter circuit 13 after the clock CK input terminal. For example, as shown in FIG. 48C, the inverter circuit 13 is connected to the inverter circuit 14 and the variable capacitor CC, and the variable capacitor CC is connected to the gate of the NMOS transistor 17. Note that the variable capacitor CC may be arranged anywhere as long as the timing on the clock CK side can be adjusted.

Figure 48D:
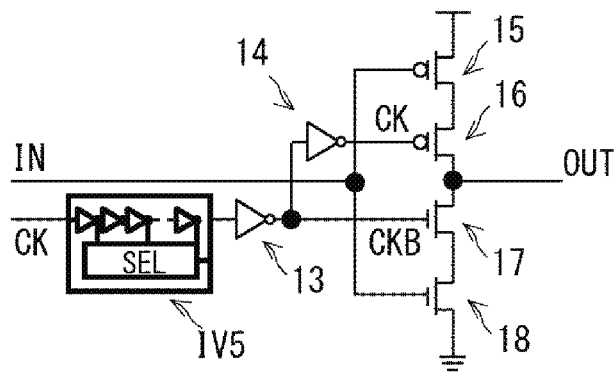

FIG. 48D is an example in which an inverter circuit group capable of switching the number of stages for extracting signals is added to the input of the clock CK terminal instead of the variable capacitor CC. Specifically, the RT circuit 30 further includes a variable stage number inverter circuit IV5 that adjusts the delay amount by switching the number of stages of a plurality of inverter circuits. The terminal 32 is connected to the inverter circuit 13 via the variable stage number inverter circuit IV5. The outlet is arranged to be the outputs on even number stages so as not to change the logic. The delay amount is adjusted by switching the number of stages of the inverters. In this way, it is possible to adjust the phase of the I signal and the phase of the Q signal.

Thirteenth Example

Figure 49:
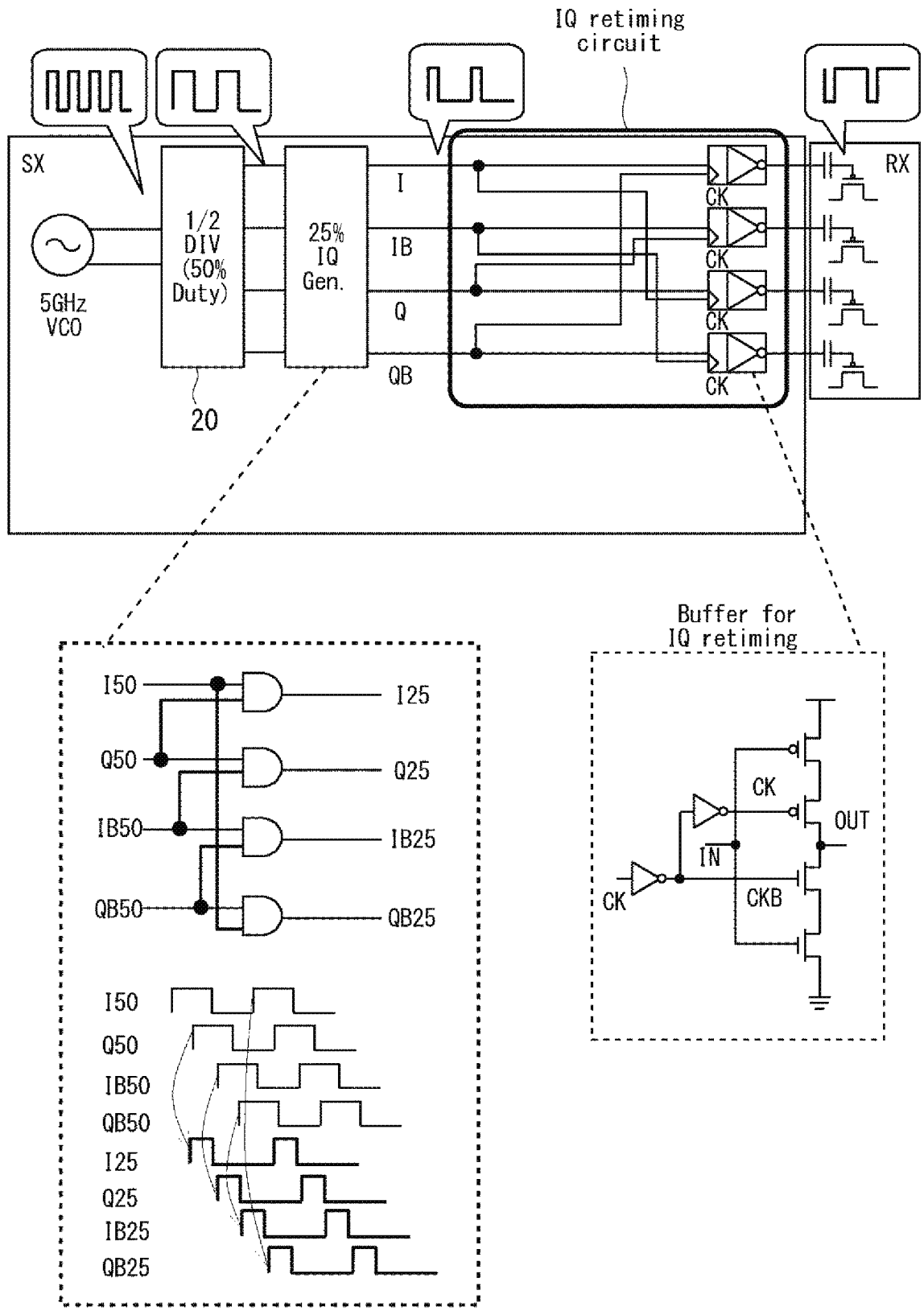
FIG. 49 is a block diagram illustrating a configuration of the thirteenth example in the high-frequency signal processing circuitry according to the first embodiment.

Next, as the thirteenth example, an example in which a 25% IQ generator is arranged after the DIV 17 with a 50% duty cycle output will be described. FIG. 49 is a block diagram illustrating a configuration of the thirteenth example in the high-frequency signal processing circuitry according to the first embodiment. As shown in FIG. 49, a 25% IQ generator (referred to also as Gen.) is arranged after the DIV 17 with a 50% duty cycle output in the configuration of the first example. The 25% IQ generator can be generally realized by the circuit that takes the logical product of the I signal and the Q signal, the logical product of the Q signal and the IB signal, the logical product of the IB signal and the QB signal, and the logical product of the QB signal and the I signal. Note that error factors may increase in the thirteen example more than the first example. Therefore, the thirteenth example may have the IQ phase error larger than that of the first example.

Second Embodiment

Figure 50:
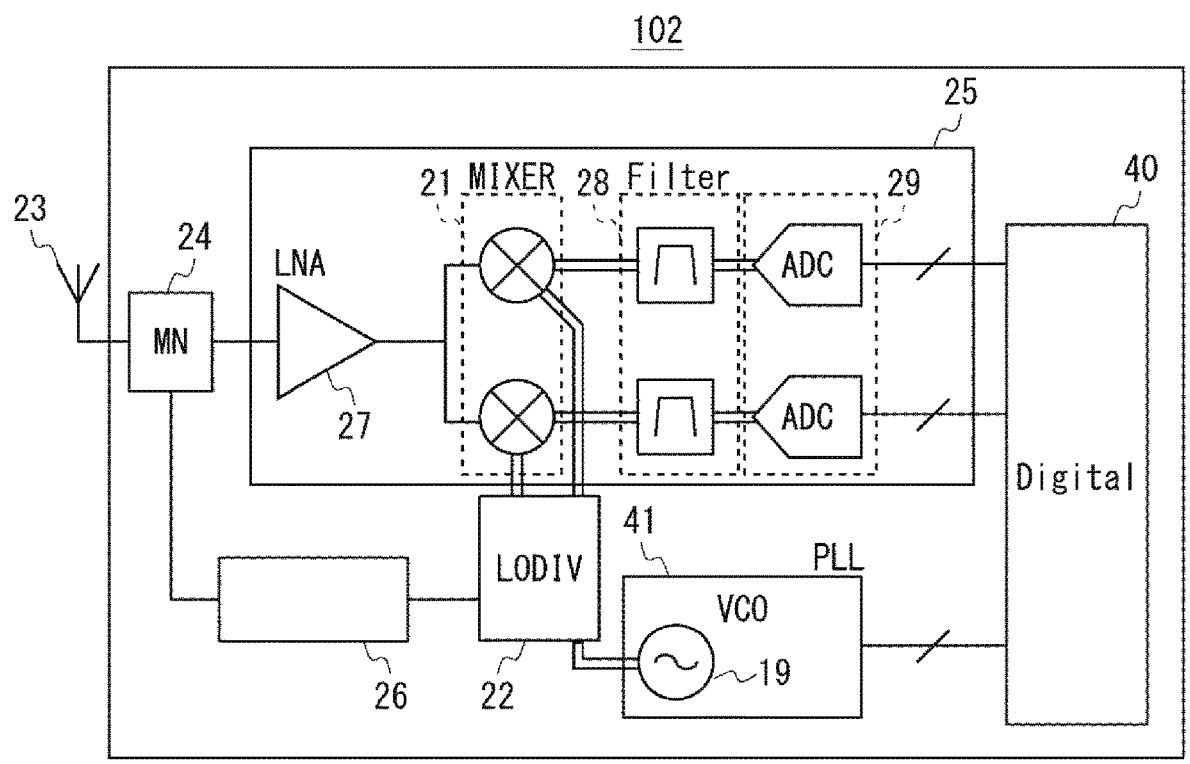
FIG. 50 is a block diagram illustrating a wireless communication device according to the second embodiment.

Next, the second embodiment will be described. This embodiment is an example of a wireless communication device including a high-frequency signal processing circuitry such as the retiming circuit 34 described above. FIG. 50 is a block diagram illustrating the wireless communication device according to the second embodiment. As shown in FIG. 50, a wireless communication device 102 includes the antenna impedance matching network 24, a receiver 25, a transmitter 26, a digital circuit 40, the PLL 41, and the LODIV 22. The receiver 25 includes the LNA 27, the mixer 21, the bandpass filter 28, and the ADC 29. The LODIV 22 includes the DIV 20 and a high-frequency signal processing circuitry such as the retiming circuit 34. As described above, the high frequency signal processing circuitry such as the retiming circuit 34 is connected between the DIV 20 and the mixer 21. In the wireless communication device 102 of this embodiment, it is preferable that the connection wiring length between the mixer 21 and the high-frequency signal processing circuitry such as the retiming circuit 34 is shorter than the connection wiring length between the transmitter 26 and the DIV 20.

According to this embodiment, since the wireless communication device 102 includes the high-frequency signal processing circuit described above, the wireless communication quality can be improved. Configurations and effects other than this are included in the description of the first embodiment.

In the foregoing, the invention made by the inventor of this application has been specifically described based on the embodiments, but it goes without saying that the present invention is not limited to the embodiments described above and can be modified in various ways within the range not departing from the gist thereof. Also, the combination of the configurations of the first and second embodiments is also within the range of the technical idea. Further, the following matters are also within the range of the technical idea of the embodiments.

(Additional Note 1)

A high-frequency signal processing circuitry comprising:
  a first input terminal, a second input terminal, a third input terminal, and a fourth input terminal;
  a first output terminal, a second output terminal, a third output terminal, and a fourth output terminal; and
  a first waveform synthesizer, a second waveform synthesizer, a third waveform synthesizer, and a fourth waveform synthesizer,
  wherein each waveform synthesizer includes:
    a first terminal and a second terminal to which input signals are input; and
    a third terminal from which an output signal obtained by synthesizing the plurality of input signals is output,
  wherein the first terminal of the first waveform synthesizer is connected to the first input terminal,
  wherein the second terminal of the first waveform synthesizer is connected to the fourth input terminal,
  wherein the third terminal of the first waveform synthesizer is connected to the first output terminal,
  wherein the first terminal of the second waveform synthesizer is connected to the second input terminal,
  wherein the second terminal of the second waveform synthesizer is connected to the third input terminal,
  wherein the third terminal of the second waveform synthesizer is connected to the second output terminal,
  wherein the first terminal of the third waveform synthesizer is connected to the third input terminal,
  wherein the second terminal of the third waveform synthesizer is connected to the first input terminal,
  wherein the third terminal of the third waveform synthesizer is connected to the third output terminal,
  wherein the first terminal of the fourth waveform synthesizer is connected to the fourth input terminal,
  wherein the second terminal of the fourth waveform synthesizer is connected to the second input terminal,
  wherein the third terminal of the fourth waveform synthesizer is connected to the fourth output terminal,
  wherein a first input signal, a second input signal, a third input signal, and a fourth input signal are input to the first input terminal, the second input terminal, the third input terminal, and the fourth input terminal, respectively,
  wherein a frequency of each input signal is equal to each other,
  wherein a phase of the second input signal, a phase of the third input signal, and a phase of the fourth input signal are a value delayed by 180 degrees, a value delayed by 90 degrees, and a value delayed by 270 degrees, respectively, with respect to a phase of the first input signal,
  wherein the output signal output from the third terminal of each waveform synthesizer is a digital signal that takes two states of a first state and a second state,
  wherein the state of the output signal transitions from one to the other in conjunction with the input signal input to the first terminal of each waveform synthesizer or the input signal input to the second terminal of each waveform synthesizer, and
  wherein the state of the output signal transitions from the other to the one in conjunction with the input signal input to the first terminal of each waveform synthesizer.

(Additional Note 2)

The high-frequency signal processing circuitry according to additional note 1,
  wherein the frequency of each input signal has an approximately 25% duty ratio,
  wherein the output signal output from the third terminal of each waveform synthesizer transitions from the second state to the first state in conjunction with a rise edge of the input signal input to the first terminal of each waveform synthesizer or a fall edge of the input signal input to the second terminal of each waveform synthesizer, and
  wherein the output signal output from the third terminal of each waveform synthesizer transitions from the first state to the second state in conjunction with a fall edge of the input signal input to the first terminal of each waveform synthesizer.

(Additional Note 3)

The high-frequency signal processing circuitry according to additional note 1,
  wherein the frequency of each input signal has an approximately 25% duty ratio,
  wherein the output signal output from the third terminal of each waveform synthesizer transitions from the first state to the second state in conjunction with a rise edge of the input signal input to the first terminal of each waveform synthesizer or a fall edge of the input signal input to the second terminal of each waveform synthesizer, and
  wherein the output signal output from the third terminal of each waveform synthesizer transitions from the second state to the first state in conjunction with a fall edge of the input signal input to the first terminal of each waveform synthesizer.

(Additional Note 4)

The high-frequency signal processing circuitry according to additional note 1,
  wherein the frequency of each input signal has an approximately 75% duty ratio,
  wherein the output signal output from the third terminal of each waveform synthesizer transitions from the second state to the first state in conjunction with a fall edge of the input signal input to the first terminal of each waveform synthesizer or a rise edge of the input signal input to the second terminal of each waveform synthesizer, and
  wherein the output signal output from the third terminal of each waveform synthesizer transitions from the first state to the second state in conjunction with a rise edge of the input signal input to the first terminal of each waveform synthesizer.

(Additional Note 5)

The high-frequency signal processing circuitry according to additional note 1,
wherein the frequency of each input signal has an approximately 75% duty ratio,
wherein the output signal output from the third terminal of each waveform synthesizer transitions from the first state to the second state in conjunction with a fall edge of the input signal input to the first terminal of each waveform synthesizer or a rise edge of the input signal input to the second terminal of each waveform synthesizer, and
wherein the output signal output from the third terminal of each waveform synthesizer transitions from the second state to the first state in conjunction with a rise edge of the input signal input to the first terminal of each waveform synthesizer.

(Additional Note 6)

The high-frequency signal processing circuitry according to additional note 1,
wherein the waveform synthesizer includes:
a first inverter circuit and a second inverter circuit; and
a first P-type MOS transistor, a second P-type MOS transistor, a first N-type MOS transistor, and a second N-type MOS transistor.

(Additional Note 7)

The high-frequency signal processing circuitry according to additional note 6,
wherein the first terminal is connected to a gate of the first P-type MOS transistor and a gate of the second N-type MOS transistor,
wherein the second terminal is connected to the first inverter circuit,
wherein the first inverter circuit is connected to the second inverter circuit and a gate of the first N-type MOS transistor,
wherein the second inverter circuit is connected to a gate of the second P-type MOS transistor,
wherein a drain of the first P-type MOS transistor is connected to a source of the second P-type MOS transistor,
wherein a drain of the second N-type MOS transistor is connected to a source of the first N-type MOS transistor, and
wherein a drain of the second P-type MOS transistor and a drain of the first N-type MOS transistor are connected to the third terminal.

(Additional Note 8)

The high-frequency signal processing circuitry according to additional note 7,
wherein the waveform synthesizer further includes a third inverter circuit, and
wherein the drain of the second P-type MOS transistor and the drain of the first N-type MOS transistor are connected to the third terminal via the third inverter circuit.

(Additional Note 9)

The high-frequency signal processing circuitry according to additional note 7,
wherein the waveform synthesizer further includes a fourth inverter circuit, and
wherein the first terminal is connected to the gate of the first P-type MOS transistor and the gate of the second N-type MOS transistor via the fourth inverter circuit.

(Additional Note 10)

The high-frequency signal processing circuitry according to additional note 7,
wherein the waveform synthesizer further includes a third inverter circuit and a fourth inverter circuit,
wherein the first terminal is connected to the gate of the first P-type MOS transistor and the gate of the second N-type MOS transistor via the fourth inverter circuit, and
wherein the drain of the second P-type MOS transistor and the drain of the first N-type MOS transistor are connected to the third terminal via the third inverter circuit.

(Additional Note 11)

The high-frequency signal processing circuitry according to additional note 7,
wherein the waveform synthesizer further includes a fourth inverter circuit and a fifth inverter circuit, and
wherein the first terminal is connected to the gate of the first P-type MOS transistor and the gate of the second N-type MOS transistor via the fourth inverter circuit and the fifth inverter circuit.

(Additional Note 12)

The high-frequency signal processing circuitry according to additional note 1,
wherein the waveform synthesizer further includes:
an inverter circuit; and
a NAND circuit,
wherein the first terminal is connected to one input terminal of the NAND circuit,
wherein the second terminal is connected to the other input terminal of the NAND circuit via the inverter circuit, and
wherein the third terminal is connected to an output terminal of the NAND circuit.

(Additional Note 13)

The high-frequency signal processing circuitry according to additional note 6,
wherein the first terminal is connected to a gate of the second P-type MOS transistor and a gate of the first N-type MOS transistor,
wherein the second terminal is connected to the first inverter circuit,
wherein the first inverter circuit is connected to the second inverter circuit and a gate of the second N-type MOS transistor,
wherein the second inverter circuit is connected to a gate of the first P-type MOS transistor,
wherein a drain of the first P-type MOS transistor is connected to a source of the second P-type MOS transistor,
wherein a drain of the second N-type MOS transistor is connected to a source of the first N-type MOS transistor, and
wherein a drain of the second P-type MOS transistor and a drain of the first N-type MOS transistor are connected to the third terminal.

(Additional Note 14)

The high-frequency signal processing circuitry according to additional note 7,
wherein the waveform synthesizer further includes a variable capacitor, and
wherein the drain of the second P-type MOS transistor and the drain of the first N-type MOS transistor are connected to the third terminal via the variable capacitor.

(Additional Note 15)

The high-frequency signal processing circuitry according to additional note 7,
wherein the waveform synthesizer further includes a variable capacitor, and
wherein the second terminal is connected to the first inverter circuit via the variable capacitor.

(Additional Note 16)

The high-frequency signal processing circuitry according to additional note 7,
wherein the waveform synthesizer further includes a variable capacitor,
wherein the first inverter circuit is connected to the second inverter circuit and the variable capacitor, and
wherein the variable capacitor is connected to the gate of the first N-type MOS transistor.

(Additional Note 17)

The high-frequency signal processing circuitry according to additional note 7,
wherein the waveform synthesizer further includes a variable stage number inverter circuit configured to adjust a delay amount by switching the number of stages of a plurality of inverter circuits, and
wherein the second terminal is connected to the first inverter circuit via the variable stage number inverter circuit.

(Additional Note 18)

The high-frequency signal processing circuitry according to additional note 2,
wherein a frequency of each input signal is generated by a generator configured to generate a 25% duty cycle output, the generator being arranged after a frequency divider of a 50% duty cycle output.

(Additional Note 19)

The high-frequency signal processing circuitry according to additional note 1,
wherein a value delayed by approximately 180 degrees, a value delayed by approximately 90 degrees, and a value delayed by approximately 270 degrees are a value including a phase error at the 180 degrees, a value including the phase error at the 90 degrees, and a value including the phase error at the 270 degrees, respectively, and
wherein at least one of the second input signal, the third input signal, and the fourth input signal is a value including the phase error.

(Additional Note 20)

A wireless communication device comprising:
an antenna impedance matching network;
a receiver;
a transmitter;
a digital circuit;
a PLL; and
an LO divider,
wherein at least either the receiver or the transmitter includes an LNA, a mixer, a filter, and an ADC, and
wherein the LO divider includes a frequency divider and the high-frequency signal processing circuitry according to additional note 1, the high-frequency signal processing circuitry being connected between the frequency divider and the mixer.

(Additional Note 21)

The wireless communication device according to additional note 20,
wherein a connection wiring length between the mixer and the high-frequency signal processing circuitry is shorter than a connection wiring length between the transmitter and the frequency divider.

What is claimed is:

1. A high-frequency signal processing circuitry comprising:
a first input terminal, a second input terminal, a third input terminal, and a fourth input terminal;
a first output terminal, a second output terminal, a third output terminal, and a fourth output terminal; and
a first waveform synthesizer, a second waveform synthesizer, a third waveform synthesizer, and a fourth waveform synthesizer,
wherein each waveform synthesizer includes:
a first terminal and a second terminal to which input signals are input; and
a third terminal from which an output signal obtained by synthesizing the plurality of input signals is output,
wherein the first terminal of the first waveform synthesizer is connected to the first input terminal,
wherein the second terminal of the first waveform synthesizer is connected to the fourth input terminal,
wherein the third terminal of the first waveform synthesizer is connected to the first output terminal,
wherein the first terminal of the second waveform synthesizer is connected to the second input terminal,
wherein the second terminal of the second waveform synthesizer is connected to the third input terminal,
wherein the third terminal of the second waveform synthesizer is connected to the second output terminal,
wherein the first terminal of the third waveform synthesizer is connected to the third input terminal,
wherein the second terminal of the third waveform synthesizer is connected to the first input terminal,
wherein the third terminal of the third waveform synthesizer is connected to the third output terminal,
wherein the first terminal of the fourth waveform synthesizer is connected to the fourth input terminal,
wherein the second terminal of the fourth waveform synthesizer is connected to the second input terminal,
wherein the third terminal of the fourth waveform synthesizer is connected to the fourth output terminal,
wherein a first input signal, a second input signal, a third input signal, and a fourth input signal are input to the first input terminal, the second input terminal, the third input terminal, and the fourth input terminal, respectively,
wherein a frequency of each input signal is equal to each other,
wherein a phase of the second input signal, a phase of the third input signal, and a phase of the fourth input signal are a value delayed by 180 degrees or approximately 180 degrees, a value delayed by 90 degrees or approximately 90 degrees, and a value delayed by 270 degrees or approximately 270 degrees, respectively, with respect to a phase of the first input signal,
wherein the output signal output from the third terminal of each waveform synthesizer is a digital signal that takes two states of a first state and a second state,
wherein the state of the output signal transitions from one to the other in conjunction with the input signal input to the first terminal of each waveform synthesizer or the input signal input to the second terminal of each waveform synthesizer, and
wherein the state of the output signal transitions from the other to the one in conjunction with the input signal input to the first terminal of each waveform synthesizer.

2. The high-frequency signal processing circuitry according to claim 1,
wherein the frequency of each input signal has an approximately 25% duty ratio,
wherein the output signal output from the third terminal of each waveform synthesizer transitions from the second state to the first state in conjunction with a rise edge of the input signal input to the first terminal of each waveform synthesizer or a fall edge of the input signal input to the second terminal of each waveform synthesizer, and
wherein the output signal output from the third terminal of each waveform synthesizer transitions from the first state to the second state in conjunction with a fall edge of the input signal input to the first terminal of each waveform synthesizer.

3. The high-frequency signal processing circuitry according to claim 1,
wherein the frequency of each input signal has an approximately 25% duty ratio,
wherein the output signal output from the third terminal of each waveform synthesizer transitions from the first state to the second state in conjunction with a rise edge of the input signal input to the first terminal of each waveform synthesizer or a fall edge of the input signal input to the second terminal of each waveform synthesizer, and
wherein the output signal output from the third terminal of each waveform synthesizer transitions from the second state to the first state in conjunction with the fall edge of the input signal input to the first terminal of each waveform synthesizer.

4. The high-frequency signal processing circuitry according to claim 1,
wherein the frequency of each input signal has an approximately 75% duty ratio,
wherein the output signal output from the third terminal of each waveform synthesizer transitions from the second state to the first state in conjunction with a fall edge of the input signal input to the first terminal of each waveform synthesizer or a rise edge of the input signal input to the second terminal of each waveform synthesizer, and
wherein the output signal output from the third terminal of each waveform synthesizer transitions from the first state to the second state in conjunction with a rise edge of the input signal input to the first terminal of each waveform synthesizer.

5. The high-frequency signal processing circuitry according to claim 1,
wherein the frequency of each input signal has an approximately 75% duty ratio,
wherein the output signal output from the third terminal of each waveform synthesizer transitions from the first state to the second state in conjunction with a fall edge of the input signal input to the first terminal of each waveform synthesizer or a rise edge of the input signal input to the second terminal of each waveform synthesizer, and
wherein the output signal output from the third terminal of each waveform synthesizer transitions from the second state to the first state in conjunction with a rise edge of the input signal input to the first terminal of each waveform synthesizer.

6. The high-frequency signal processing circuitry according to claim 1,
wherein the waveform synthesizer includes:
a first inverter circuit and a second inverter circuit; and
a first P-type MOS transistor, a second P-type MOS transistor, a first N-type MOS transistor, and a second N-type MOS transistor.

7. The high-frequency signal processing circuitry according to claim 6,
wherein the first terminal is connected to a gate of the first P-type MOS transistor and a gate of the second N-type MOS transistor,
wherein the second terminal is connected to the first inverter circuit,
wherein the first inverter circuit is connected to the second inverter circuit and a gate of the first N-type MOS transistor,
wherein the second inverter circuit is connected to a gate of the second P-type MOS transistor,
wherein a drain of the first P-type MOS transistor is connected to a source of the second P-type MOS transistor,
wherein a drain of the second N-type MOS transistor is connected to a source of the first N-type MOS transistor, and
wherein a drain of the second P-type MOS transistor and a drain of the first N-type MOS transistor are connected to the third terminal.

8. The high-frequency signal processing circuitry according to claim 7,
wherein the waveform synthesizer further includes a third inverter circuit, and
wherein the drain of the second P-type MOS transistor and the drain of the first N-type MOS transistor are connected to the third terminal via the third inverter circuit.

9. The high-frequency signal processing circuitry according to claim 7,
wherein the waveform synthesizer further includes a fourth inverter circuit, and
wherein the first terminal is connected to the gate of the first P-type MOS transistor and the gate of the second N-type MOS transistor via the fourth inverter circuit.

10. The high-frequency signal processing circuitry according to claim 7,
wherein the waveform synthesizer further includes a third inverter circuit and a fourth inverter circuit,
wherein the first terminal is connected to the gate of the first P-type MOS transistor and the gate of the second N-type MOS transistor via the fourth inverter circuit, and
wherein the drain of the second P-type MOS transistor and the drain of the first N-type MOS transistor are connected to the third terminal via the third inverter circuit.

11. The high-frequency signal processing circuitry according to claim 7,
wherein the waveform synthesizer further includes a fourth inverter circuit and a fifth inverter circuit, and
wherein the first terminal is connected to the gate of the first P-type MOS transistor and the gate of the second N-type MOS transistor via the fourth inverter circuit and the fifth inverter circuit.

12. The high-frequency signal processing circuitry according to claim 1,
wherein the waveform synthesizer further includes:
an inverter circuit; and
a NAND circuit,
wherein the first terminal is connected to one input terminal of the NAND circuit, wherein the second terminal is connected to the other input terminal of the NAND circuit via the inverter circuit, and
wherein the third terminal is connected to an output terminal of the NAND circuit.

13. The high-frequency signal processing circuitry according to claim 6,
wherein the first terminal is connected to a gate of the second P-type MOS transistor and a gate of the first N-type MOS transistor,
wherein the second terminal is connected to the first inverter circuit,
wherein the first inverter circuit is connected to the second inverter circuit and a gate of the second N-type MOS transistor,
wherein the second inverter circuit is connected to a gate of the first P-type MOS transistor,
wherein a drain of the first P-type MOS transistor is connected to a source of the second P-type MOS transistor,
wherein a drain of the second N-type MOS transistor is connected to a source of the first N-type MOS transistor, and
wherein a drain of the second P-type MOS transistor and a drain of the first N-type MOS transistor are connected to the third terminal.

14. The high-frequency signal processing circuitry according to claim 7,
wherein the waveform synthesizer further includes a variable capacitor, and
wherein the drain of the second P-type MOS transistor and the drain of the first N-type MOS transistor are connected to the third terminal via the variable capacitor.

15. The high-frequency signal processing circuitry according to claim 7,
wherein the waveform synthesizer further includes a variable capacitor, and
wherein the second terminal is connected to the first inverter circuit via the variable capacitor.

16. The high-frequency signal processing circuitry according to claim 7,
wherein the waveform synthesizer further includes a variable capacitor,
wherein the first inverter circuit is connected to the second inverter circuit and the variable capacitor, and
wherein the variable capacitor is connected to the gate of the first N-type MOS transistor.

17. The high-frequency signal processing circuitry according to claim 1,
wherein the value delayed by approximately 180 degrees, the value delayed by approximately 90 degrees, and the value delayed by approximately 270 degrees are a value including a phase error at the 180 degrees, a value including the phase error at the 90 degrees, and a value including the phase error at the 270 degrees, respectively, and
wherein at least one of the second input signal, the third input signal, and the fourth input signal is a value including the phase error.

18. A high-frequency signal processing circuitry comprising:
a first input terminal, a second input terminal, a third input terminal, and a fourth input terminal;
a first output terminal, a second output terminal, a third output terminal, and a fourth output terminal; and
a first waveform synthesizer, a second waveform synthesizer, a third waveform synthesizer, and a fourth waveform synthesizer,
wherein each waveform synthesizer includes:
a first terminal and a second terminal to which input signals are input; and
a third terminal from which an output signal obtained by synthesizing the plurality of input signals is output,
wherein the first terminal of the first waveform synthesizer is connected to the first input terminal,
wherein the second terminal of the first waveform synthesizer is connected to the fourth input terminal,
wherein the third terminal of the first waveform synthesizer is connected to the first output terminal,
wherein the first terminal of the second waveform synthesizer is connected to the second input terminal,
wherein the second terminal of the second waveform synthesizer is connected to the third input terminal,
wherein the third terminal of the second waveform synthesizer is connected to the second output terminal,
wherein the first terminal of the third waveform synthesizer is connected to the third input terminal,
wherein the second terminal of the third waveform synthesizer is connected to the first input terminal,
wherein the third terminal of the third waveform synthesizer is connected to the third output terminal,
wherein the first terminal of the fourth waveform synthesizer is connected to the fourth input terminal,
wherein the second terminal of the fourth waveform synthesizer is connected to the second input terminal,
wherein the third terminal of the fourth waveform synthesizer is connected to the fourth output terminal,
wherein a first input signal, a second input signal, a third input signal, and a fourth input signal are input to the first input terminal, the second input terminal, the third input terminal, and the fourth input terminal, respectively,
wherein a frequency of each input signal is equal to each other,
wherein a phase of the second input signal, a phase of the third input signal, and a phase of the fourth input signal are a value delayed by 180 degrees, a value delayed by 90 degrees, and a value delayed by 270 degrees, respectively, with respect to a phase of the first input signal,
wherein the output signal output from the third terminal of each waveform synthesizer is a digital signal that takes two states of a first state and a second state,
wherein the state of the output signal transitions from one to the other in conjunction with the input signal input to the first terminal of each waveform synthesizer or the input signal input to the second terminal of each waveform synthesizer, and
wherein the state of the output signal transitions from the other to the one in conjunction with the input signal input to the first terminal of each waveform synthesizer.

19. A wireless communication device comprising:
an antenna impedance matching network;
a receiver;
a transmitter;
a digital circuit;
a PLL; and
an LO divider,
wherein at least either the receiver or the transmitter includes an LNA, a mixer, a filter, and an ADC, and wherein the LO divider includes a frequency divider and the high-frequency signal processing circuitry according to claim 1, the high-frequency signal processing circuitry being connected between the frequency divider and the mixer.

20. The wireless communication device according to claim 19,
wherein a connection wiring length between the mixer and the high-frequency signal processing circuitry is shorter than a connection wiring length between the transmitter and the frequency divider.

\* \* \* \* \*